(12) United States Patent
Xu et al.

(10) Patent No.: US 12,211,176 B2
(45) Date of Patent: Jan. 28, 2025

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Liang Xu, Shanghai (CN); Juan Feng, Shanghai (CN); Jun Xiang, Shanghai (CN); Na Zhang, Shanghai (CN); Yang Hu, Shanghai (CN); Yan'ge Ma, Shanghai (CN); Kai Cui, Shanghai (CN); Le Yang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 389 days.

(21) Appl. No.: 17/645,037

(22) Filed: Dec. 17, 2021

(65) Prior Publication Data

US 2022/0114801 A1   Apr. 14, 2022

Related U.S. Application Data

(63) Continuation of application No. PCT/CN2020/096658, filed on Jun. 17, 2020.

(30) Foreign Application Priority Data

Jun. 17, 2019  (CN) .......................... 201910522844.5
Aug. 20, 2019  (CN) .......................... 201910769736.8
Aug. 20, 2019  (CN) .......................... 201910770611.7

(51) Int. Cl.
*G06V 10/44*  (2022.01)
*G06T 5/10*  (2006.01)
(Continued)

(52) U.S. Cl.
CPC .................. *G06T 5/10* (2013.01); *G06T 5/70* (2024.01); *G06V 10/44* (2022.01);
(Continued)

(58) Field of Classification Search
CPC ...................................................... G06V 10/44
See application file for complete search history.

(56) References Cited

U.S. PATENT DOCUMENTS 9,792,491 B1 * 10/2017 Ramaswamy ....... G06V 40/167
10,380,735 B2 *  8/2019 Wiemker .............. G06T 7/0012
(Continued)

FOREIGN PATENT DOCUMENTS

CN       103886571 A      6/2014
CN       104181598 A     12/2014
(Continued)

OTHER PUBLICATIONS

Benedictor A. Nguchu et al., Iris Features-based Heart Disease Diagnosis by Computer Vision, Ninth International Conference on Digital Image Processing, 10420: 104203X-1-104203X-19, 2017.
(Continued)

*Primary Examiner* — Di Xiao
(74) *Attorney, Agent, or Firm* — METIS IP LLC

(57) ABSTRACT

The present disclosure relates to systems and methods for image processing. The system may obtain at least one image of an object. For each of the at least one image, the system may determine a recognition result of the image. The recognition result may include an image type of the image, a type of a lesion in the image, a region of the lesion in the image, and/or an image feature of the image. Further, the system may process the at least one image of the object based on at least one recognition result corresponding to the at least one image.

20 Claims, 20 Drawing Sheets

(51) Int. Cl.
*G06T 5/70* (2024.01)
*G06V 10/46* (2022.01)

(52) U.S. Cl.
CPC .. *G06T 2207/10072* (2013.01); *G06V 10/473* (2022.01); *G06V 2201/03* (2022.01)

(56) References Cited

U.S. PATENT DOCUMENTS

| | | | |
|---|---|---|---|
| 2006/0177125 | A1 | 8/2006 | Chan et al. |
| 2010/0087807 | A1* | 4/2010 | Da Silva ............ A61B 18/0218 606/22 |
| 2012/0043963 | A1* | 2/2012 | Rapoport ............. A61B 5/0073 324/307 |
| 2012/0257164 | A1 | 10/2012 | Zee et al. |
| 2013/0016890 | A1* | 1/2013 | Lee ........................ G06T 5/90 382/128 |
| 2015/0269766 | A1 | 9/2015 | Kobayashi |
| 2019/0011996 | A1 | 1/2019 | Sabina et al. |
| 2019/0096060 | A1 | 3/2019 | Zhang et al. |
| 2019/0137388 | A1* | 5/2019 | Mallery ................ G01J 3/0297 |
| 2019/0349518 | A1* | 11/2019 | Abdulwaheed ........ G06V 20/10 |

FOREIGN PATENT DOCUMENTS

| | | |
|---|---|---|
| CN | 107316291 A | 11/2017 |
| CN | 107909624 A | 4/2018 |
| CN | 108242049 A | 7/2018 |
| CN | 108596887 A | 9/2018 |
| CN | 108615237 A | 10/2018 |
| CN | 108665456 A | 10/2018 |
| CN | 109308728 A | 2/2019 |
| CN | 109447966 A | 3/2019 |
| CN | 109523495 A | 3/2019 |
| CN | 109615602 A | 4/2019 |
| CN | 109671054 A | 4/2019 |
| CN | 109754387 A | 5/2019 |
| CN | 110223289 A | 9/2019 |
| CN | 110473297 A | 11/2019 |
| CN | 110490857 A | 11/2019 |

OTHER PUBLICATIONS

The Extended European Search Report in European Application No. 20825934.1 mailed on Jun. 30, 2022, 7 pages.
International Search Report in PCT/CN2020/096658 mailed on Sep. 10, 2020, 4 pages.
Written Opinion in PCT/CN2020/09665B mailed on Sep. 10, 2020, 5 pages.
First Office Action in Chinese Application No. 201910522844.5 mailed on Nov. 4, 2020, 24 pages.
First Office Action in Chinese Application No. 201910770611.7 mailed on Dec. 25, 2020, 15 pages.
First Office Action in Chinese Application No. 201910769736.8 mailed on Jul. 27, 2021, 10 pages.
Li, Bin, Study of 3D Visualization Techniques in 3D Conformal Radiotherapy Treatment Planning, China Doctoral Dissertations Full-text Database Information Technology Series, 2007, 122 pages.

* cited by examiner

FIG. 22A  FIG. 22B
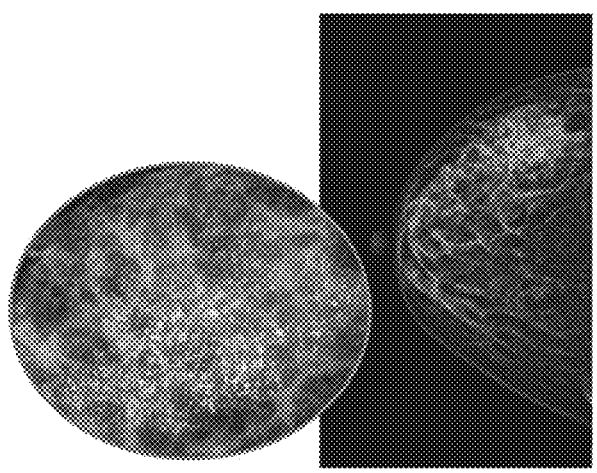
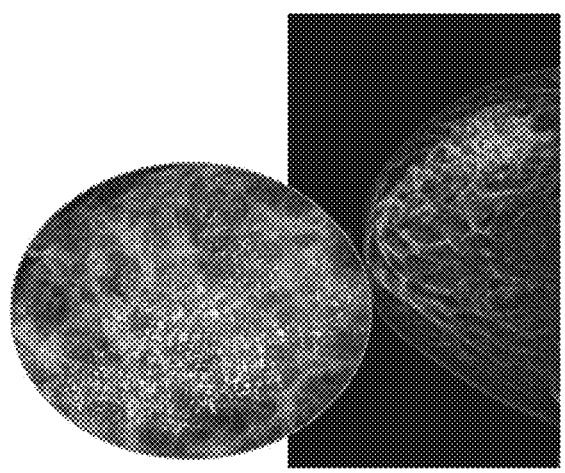
FIG. 23A  FIG. 23B

SYSTEMS AND METHODS FOR IMAGE PROCESSING

CROSS-REFERENCE TO RELATED APPLICATIONS

This application is a Continuation of International Application No. PCT/CN2020/096658, filed on Jun. 17, 2020, which claims priority to Chinese Patent Application No. 201910522844.5 filed on Jun. 17, 2019, Chinese Patent Application No. 201910769736.8 filed on Aug. 20, 2019, and Chinese Patent Application No. 201910770611.7 filed on Aug. 20, 2019, the contents of each of which are incorporated herein by reference in their entirety.

TECHNICAL FIELD

The present disclosure generally relates to medical image processing technology, and in particular, to systems and methods for image processing.

BACKGROUND

Medical images (e.g., a three-dimensional (3D) tomographic image) obtained by medical imaging (e.g., digital breast tomosynthesis (DBT)) may be used in disease diagnosis and/or treatment (e.g., a recognition of a tumor). However, in some situations, some useful information (e.g., an overall distribution of an lesion, an indication associated with an lesion region) cannot be accurately and efficiently obtained from the originally acquired medical images. For example, in order to obtain the overall distribution of the lesion, an additional imaging (e.g., full-field digital mammography (FFDM)) needs to be performed, which may cause unnecessary radiation for a patient. Therefore, it is desirable to provide systems and methods for image processing to obtain useful information, thereby improving the efficiency and accuracy of medical analysis and/or diagnosis.

SUMMARY

An aspect of the present disclosure relates to a system for image processing. The system may include at least one storage device including a set of instructions and at least one processor in communication with the at least one storage device. When executing the set of instructions, the at least one processor may be directed to perform operations. The operations may include obtaining at least one image of an object; determining, for each of the at least one image, a recognition result of the image. The recognition result may include an image type of the image, a type of a lesion in the image, a region of the lesion in the image, and/or an image feature of the image. The operations may further include processing the at least one image of the object based on at least one recognition result corresponding to the at least one image.

In some embodiments, the recognition result may include the image type of the image. When the image type of the image is a three-dimensional (3D) tomographic image, the processing the at least one image of the object based on the at least one recognition result corresponding to the at least one image may include for each of the at least one image, determining a target image of the object by preprocessing the image; determining a target gradient image corresponding to the target image; determining, in the target gradient image, a plurality of first positions satisfying a predetermined gradient condition along a predetermined direction; determining, in the target image, a plurality of second positions corresponding to the plurality of first positions; and generating an initial two-dimensional (2D) image of the object based on gray values of the plurality of second positions in the target image. Further, the processing the at least one image of the object based on the at least one recognition result corresponding to the at least one image may include generating a target 2D image of the object based on at least one initial 2D image of the object corresponding to the at least one image.

In some embodiments, the determining the target image of the object by preprocessing the image may include generating at least one high-frequency image by enhancing high-frequency information in the image and generating the target image of the object based on the at least one high-frequency image and a low-frequency image corresponding to low-frequency information in the image.

In some embodiments, the generating the at least one high-frequency image by enhancing the high-frequency information in the image may include generating a plurality of first frequency band images by decomposing the image based on a first predetermined frequency band. The plurality of first frequency band images may include a low-frequency image and at least one initial high-frequency image. Further, the generating the at least one high-frequency image by enhancing the high-frequency information in the image may include generating the at least one high-frequency image by enhancing the at least one initial high-frequency image in the plurality of first frequency band images.

In some embodiments, the determining the target gradient image corresponding to the target image may include generating an initial gradient image by performing a gradient transformation on the target image and determining the target gradient image by performing a convolution processing on the initial gradient image.

In some embodiments, the generating the target 2D image of the object based on the at least one initial 2D image of the object may include generating the target 2D image of the object by projecting the at least one initial 2D image along the predetermined direction.

In some embodiments, the generating the target 2D image of the object based on the at least one initial 2D image of the object may include generating a first projected image of the object by projecting the at least one initial 2D image along the predetermined direction based on a maximum density projection algorithm; generating a second projected image of the object by projecting the at least one initial 2D image along the predetermined direction based on an average projection algorithm; and generating the target 2D image of the object by weighting the first projected image and the second projected image based on a first predetermined weight of the first projected image and a second predetermined weight of the second projected image.

In some embodiments, the generating the target 2D image of the object based on the at least one initial 2D image of the object may include generating a preliminary target 2D image of the object by combining the at least one initial 2D image and generating the target 2D image of the object by weighting the preliminary target 2D image and a 2D projected image based on a third predetermined weight of the preliminary target 2D image and a fourth predetermined weight of the 2D projected image.

In some embodiments, the operations may further include generating a plurality of second frequency band images by decomposing the target 2D image based on a second predetermined frequency band. The plurality of second frequency band images may include a low-frequency 2D image and a high-frequency 2D image. The operations may further include generating a high frequency enhanced image by enhancing the high-frequency 2D image in the second frequency band image and correcting the target 2D image based on the high frequency enhanced image.

In some embodiments, the processing the at least one image of the object based on the at least one recognition result may include, for each of the at least one image, determining a processing operation based on the type of the lesion in the image in the image or the image feature of the image and processing the image based on the processing operation. The processing operation may include a noise reduction, an enhancement, an organization balance, a thickness balance, and/or a look-up table (LUT) transformation.

In some embodiments, the operations may further include providing prompt information associated with the recognition result of the image in the processed image, the prompt information including at least one of highlighting the recognition result, zooming in the recognition result, circling the recognition result, or prompting the recognition result using a prompt indicator.

A further aspect of the present disclosure relates to a method for image processing. The method may be implemented on a computing device including at least one processor, at least one storage medium, and a communication platform connected to a network. The method may include obtaining at least one image of an object; determining, for each of the at least one image, a recognition result of the image. The recognition result may include an image type of the image, a type of a lesion in the image, a region of the lesion in the image, and/or an image feature of the image. The method may further include processing the at least one image of the object based on at least one recognition result corresponding to the at least one image.

A still further aspect of the present disclosure relates to a non-transitory computer readable medium including executable instructions. When the executable instructions are executed by at least one processor, the executable instructions may direct the at least one processor to perform a method. The method may include obtaining at least one image of an object; determining, for each of the at least one image, a recognition result of the image. The recognition result may include an image type of the image, a type of a lesion in the image, a region of the lesion in the image, and/or an image feature of the image. The method may further include processing the at least one image of the object based on at least one recognition result corresponding to the at least one image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIGS. 22A-22B are exemplary comparison images illustrating effects of image processing methods according to some embodiments of the present disclosure; and FIGS. 23A-23B are exemplary comparison images illustrating effects of image processing methods according to some other embodiments of the present disclosure.

DETAILED DESCRIPTION

Figure 1:
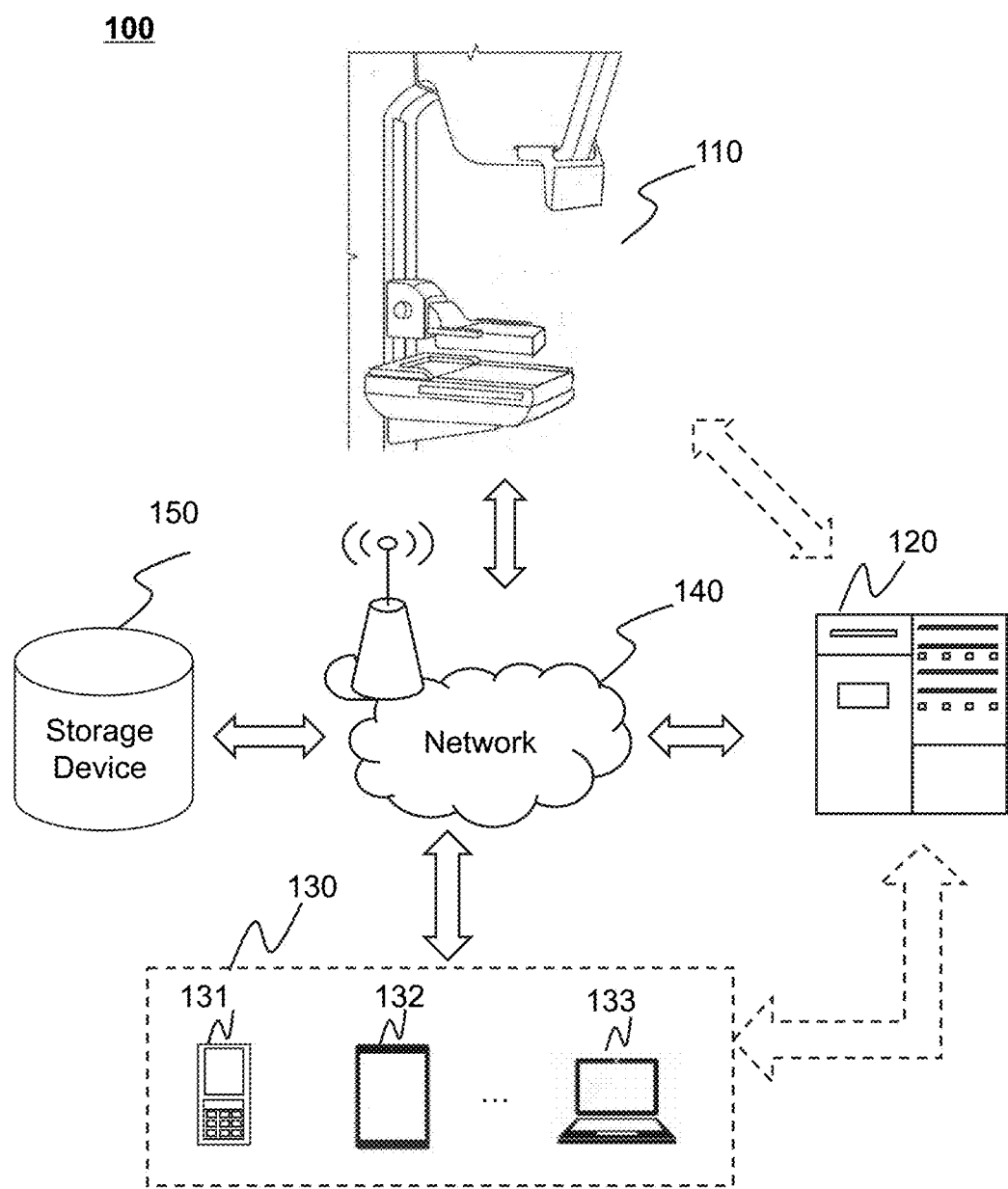
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections, or assemblies of different levels in ascending order. However, the terms may be displaced by another expression if they achieve the same purpose.

Generally, the words "module," "unit," or "block," as used herein, refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 illustrated in FIG. 2 and/or the central processing unit (CPU) 340 illustrated FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are systems and methods for non-invasive biomedical imaging/treatment, such as for disease diagnostic, disease therapy, or research purposes. In some embodiments, the systems may include an imaging system. The imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include, for example, a digital breast tomosynthesis (DBT) system, a computed tomography (CT) system, an ultrasound imaging system, an X-ray imaging system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, or the like, or any combination thereof. The multi-modality system may include, for example, an X-ray imaging-magnetic resonance imaging (X-ray-MRI) system, a positron emission tomography-X-ray imaging (PET-X-ray) system, a single-photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, etc. In some embodiments, the medical system may include a treatment system. The treatment system may include a treatment plan system (TPS), image-guided radiotherapy (IGRT), etc. The IGRT may include a treatment device and an imaging device. The treatment device may include a linear accelerator, a cyclotron, a synchrotron, etc., configured to perform radiotherapy on a subject. The treatment device may include an accelerator of species of particles including, for example, photons, electrons, protons, or heavy ions. The imaging device may include a DBT scanner, a CT scanner (e.g., cone beam computed tomography (CBCT) scanner), an MRI scanner, a digital radiology (DR) scanner, an electronic portal imaging device (EPID), etc. It should be noted that the medical system described below is merely provided for illustration purposes, and not intended to limit the scope of the present disclosure.

In the present disclosure, the object may include a biological object and/or a non-biological object. The biological object may be a human being, an animal, a plant, or a specific portion, organ, and/or tissue thereof. For example, the object may include a head, a neck, a thorax, a heart, a stomach, a blood vessel, a soft tissue, a tumor, a nodule, or the like, or any combination thereof. In some embodiments, the object may be a man-made composition of organic and/or inorganic matters that are with or without life. The term "object" or "subject" are used interchangeably in the present disclosure.

In the present disclosure, a representation of an object (e.g., a patient, a subject, or a portion thereof) in an image may be referred to "object" for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

An aspect of the present disclosure relates to systems and methods for image processing. The systems may obtain at least one image of an object (e.g., a patient or a portion thereof). For each of the at least one image, the systems may determine a recognition result of the image. The recognition result may include an image type (e.g., a 2D image, a 3D image, a 3D tomographic image) of the image, a type of a lesion in the image, a region of the lesion in the image, an image feature of the image, or the like, or a combination thereof. Further, the systems may process the at least one image of the object based on at least one recognition result corresponding to the at least one image. For example, when the recognition result indicates that the image type of the image is a 3D tomographic image, the systems may generate a 2D image of the object which can reflect an overall distribution of a lesion, by processing the at least one image of the object. As another example, the systems may determine a processing operation (e.g., an enhancement) based on the type of the lesion in the image or the image feature of the image and process the image based on the processing operation.

According to the systems and methods of the present disclosure, the originally acquired image may be processed based on the recognition result of the image, accordingly, the processed image can reflect more useful information. For example, a 2D image of the object which reflects an overall distribution of a lesion may be generated by processing the 3D tomographic image, which can avoid additional radiation on a patient. As another example, the processing operation determined based on the type of the lesion in the image or the image feature of the image can improve the image quality of the region of the lesion in the image of the object, which can improve the efficiency and accuracy of subsequent medical diagnosis.

FIG. 1 is a schematic diagram illustrating an exemplary medical system according to some embodiments of the present disclosure. As illustrated, the medical system 100 may include a scanning device 110, a processing device 120, a terminal device 130, a network 140, and a storage device 150. The components of the medical system 100 may be connected in one or more of various ways. Mere by way of example, as illustrated in FIG. 1, the scanning device 110 may be connected to the processing device 120 through the network 140. As another example, the scanning device 110 may be connected to the processing device 120 directly (as indicated by the bi-directional arrow in dotted lines linking the scanning device 110 and the processing device 120). As a further example, the storage device 150 may be connected to the processing device 120 directly or through the network 140. As still a further example, the terminal device 130 may be connected to the processing device 120 directly (as indicated by the bi-directional arrow in dotted lines linking the terminal device 130 and the processing device 120) or through the network 140.

The scanning device 110 may be configured to acquire imaging data relating to at least one part of a subject. The scanning device 110 may scan the subject or a portion thereof that is located within its detection region and generate imaging data relating to the subject or the portion thereof. The imaging data relating to at least one part of a subject may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. In some embodiments, the scanning device 110 may include a single modality imaging device. For example, the scanning device 110 may include a DBT device, a computed tomography (CT) device, a cone beam computed tomography (CBCT) device, a digital subtraction angiography (DSA), a positron emission tomography (PET) device, a single-photon emission computed tomography (SPECT) device, a magnetic resonance imaging (MRI) device (also referred to as an MR device, an MR scanner), an ultrasonography scanner, a digital radiography (DR) scanner, or the like, or any combination thereof. In some embodiments, the scanning device 110 may include a multi-modality imaging device. Exemplary multi-modality imaging devices may include a PET-CT device, a PET-MR device, or the like, or a combination thereof. For illustration purposes, the present disclosure is described with reference to a DBT device.

The processing device 120 may process data and/or information obtained from the scanning device 110, the terminal device 130, and/or the storage device 150. For example, the processing device 120 may obtain at least one image of an object form the scanning device 110. Further, for each of the at least one image, the processing device 120 may determine a recognition result (e.g., an image type, a type of a lesion, a region of the lesion) of the image and process the at least one image of the object based on at least one recognition result corresponding to the at least one image. In some embodiments, the processing device 120 may include a central processing unit (CPU), a digital signal processor (DSP), a system on a chip (SoC), a microcontroller unit (MCU), or the like, or any combination thereof. In some embodiments, the processing device 120 may include a computer, a user console, a single server or a server group, etc. The server group may be centralized or distributed. In some embodiments, the processing device 120 may be local or remote. For example, the processing device 120 may access information and/or data stored in the scanning device 110, the terminal device 130, and/or the storage device 150 via the network 140. As another example, the processing device 120 may be directly connected to the scanning device 110, the terminal device 130, and/or the storage device 150 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 or a portion of the processing device 120 may be integrated into the scanning device 110. In some embodiments, the processing device 120 may be implemented by a computing device 200 including one or more components as described in FIG. 2.

The terminal device 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the smart mobile device may include a mobile phone, a personal digital assistant (PDA), a gaming device, a navigation device, a point of sale (POS) device, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 130 may be part of the processing device 120.

The network 140 may include any suitable network that can facilitate the exchange of information and/or data for the medical system 100. In some embodiments, one or more components (e.g., the scanning device 110, the processing device 120, the storage device 150, the terminal device 130) of the medical system 100 may communicate information and/or data with one or more other components of the medical system 100 via the network 140. For example, the processing device 120 may obtain the at least one image of the object from the scanning device 110 via the network 140. As another example, the terminal device 130 may receive at least one processed image from the processing device 120 via the network 140. The network 140 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 140 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 140 may include one or more network access points. For example, the network 140 may include wired and/or wireless network access points, such as base stations and/or internet exchange points, through which one or more components of the medical system 100 may be connected to the network 140 to exchange data and/or information.

The storage device 150 may store data, instructions, and/or any other information. In some embodiments, the storage device 150 may store data obtained from the scanning device 110, the terminal device 130, and/or the processing device 120. In some embodiments, the storage device 150 may store data and/or instructions that the processing device 120 may execute or use to perform exemplary methods described in the present disclosure. In some embodiments, the storage device 150 may include a mass storage device, a removable storage device, a volatile read-and-write memory, a read-only memory (ROM), or the like, or a combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be implemented on a cloud platform as described elsewhere in the disclosure.

In some embodiments, the storage device 150 may be connected to the network 140 to communicate with one or more components (e.g., the scanning device 110, the processing device 120, the terminal device 130) of the medical system 100. One or more components of the medical system 100 may access the data or instructions stored in the storage device 150 via the network 140. In some embodiments, the storage device 150 may be directly connected to or communicate with one or more components of the medical system 100. In some embodiments, the storage device 150 may be part of the processing device 120 or the terminal device 130.

It should be noted that the above description of the medical system 100 is merely provided for the purposes of illustration, and not intended to limit the scope of the present disclosure. For persons having ordinary skills in the art, multiple variations and modifications may be made under the teachings of the present disclosure. For example, the medical system 100 may include one or more additional components and/or one or more components of the medical system 100 described above may be omitted. Additionally or alternatively, two or more components of the medical system 100 may be integrated into a single component. A component of the medical system 100 may be implemented on two or more sub-components.

Figure 2:
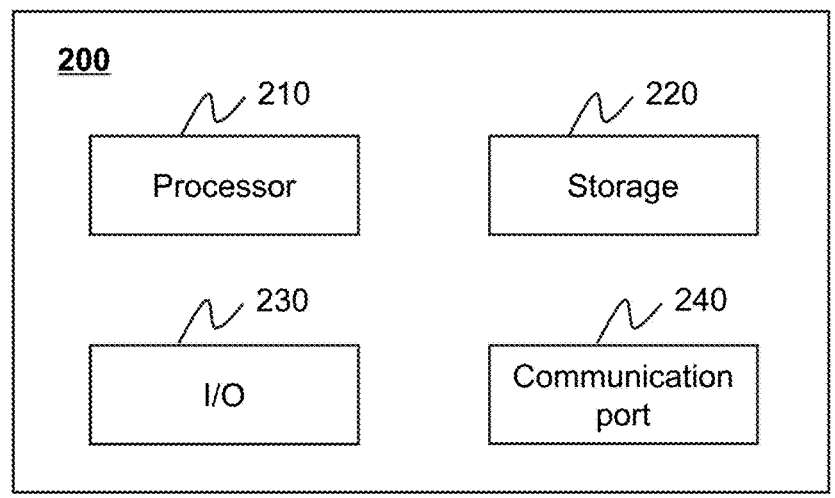
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the medical system 100 as described herein. For example, the processing device 120 and/or the terminal device 130 may be implemented on the computing device 200, respectively, via its hardware, software program, firmware, or a combination thereof. Although only one such computing device is shown, for convenience, the computer functions relating to the medical system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, data structures, procedures, modules, and functions, which perform particular functions described herein.

In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operations A and B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanning device 110, the storage device 150, the terminal device 130, and/or any other component of the medical system 100. In some embodiments, the storage 220 may include a mass storage device, a removable storage device, a volatile read-and-write memory, a read-only memory (ROM), or the like, or a combination thereof. In some embodiments, the storage 220 may store one or more programs and/or instructions to perform exemplary methods described in the present disclosure. For example, the storage 220 may store a program for the processing device 120 to execute to process the at least one image of the object.

The I/O 230 may input and/or output signals, data, information, etc. In some embodiments, the I/O 230 may enable a user interaction with the processing device 120. In some embodiments, the I/O 230 may include an input device and an output device. The input device may include alphanumeric and other keys that may be input via a keyboard, a touch screen (e.g., with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 140) to facilitate data communications. The communication port 240 may establish connections between the processing device 120 and one or more components (e.g., the scanning device 110, the storage device 150, and/or the terminal device 130) of the medical system 100. The connection may be a wired connection, a wireless connection, any other communication connection that can enable data transmission and/or reception, and/or a combination of these connections. The wired connection may include, for example, an electrical cable, an optical cable, a telephone wire, or the like, or a combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
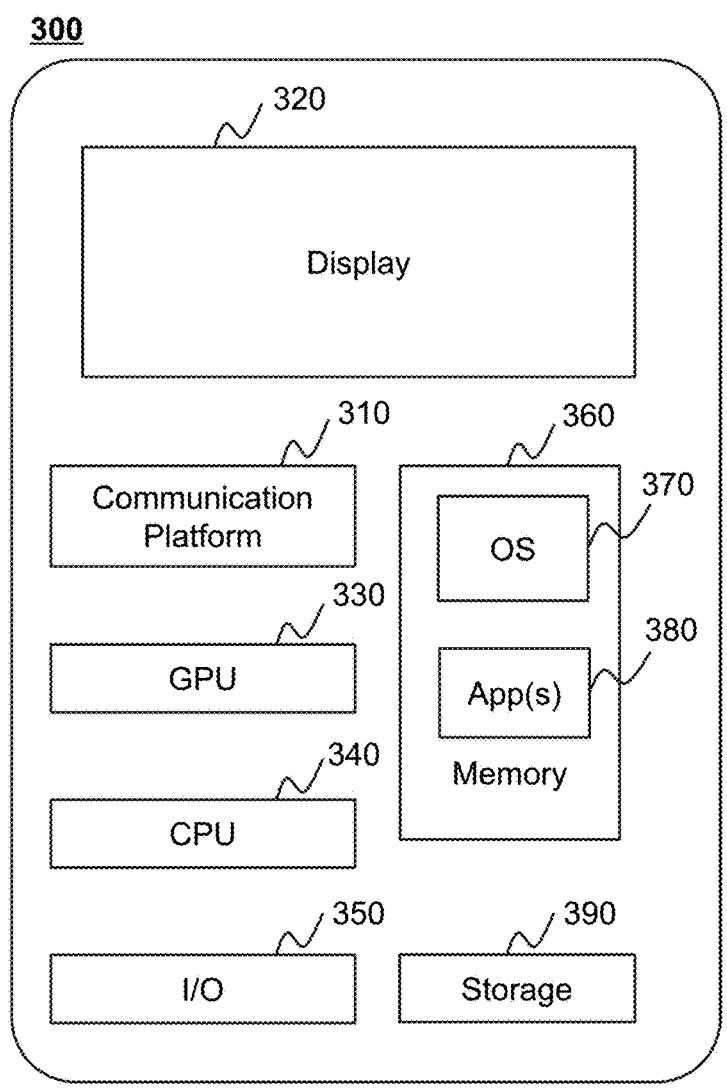
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, one or more components (e.g., the terminal device 130, the processing device 120) of the medical system 100 may be implemented on one or more components of the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to the medical system 100. User interactions with the information stream may be achieved via the I/O 350 and provided to the processing device 120 and/or other components of the medical system 100 via the network 140.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 4:
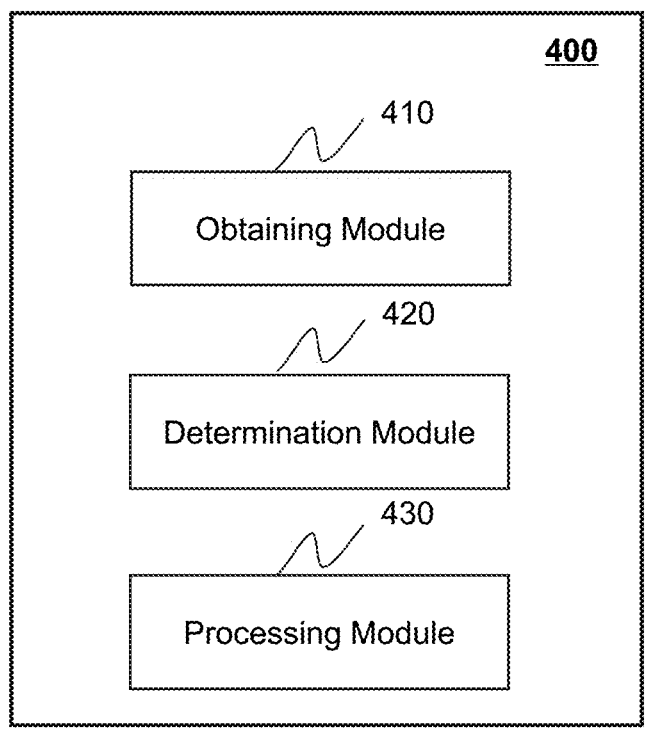
FIG. 4 is a block diagram illustrating an exemplary processing device according to some embodiments of the present disclosure.

FIG. 4 is a block diagram illustrating an exemplary processing device according to some embodiments of the present disclosure. The processing device 120 may be implemented on the computing device 200 (e.g., the processor 210) illustrated in FIG. 2 or the mobile device 300 illustrated in FIG. 3. The processing device 120 may include an obtaining module 410, a determination module 420, and a processing module 430.

The obtaining module 410 may be configured to obtain at least one image of an object. More descriptions regarding the obtaining of the at least one image of the object may be found elsewhere in the present disclosure (e.g., operation 510 and the description thereof).

The determination module 420 may be configured to, for each of the at least one image, determine a recognition result of the image. More descriptions regarding the determining of the recognition result of the image may be found elsewhere in the present disclosure (e.g., operation 520 and the description thereof).

The processing module 430 may be configured to process the at least one image of the object based on at least one recognition result corresponding to the at least one image.

In some embodiments, when the at least one recognition result corresponding to the at least one image indicates that image type of the at least one image is a 3D tomographic image, for each of the at least one image, the processing module 430 may determine a target image of the object by preprocessing the image and determine a target gradient image corresponding to the target image. The processing module 430 may determine, in the target gradient image, a plurality of first positions satisfying a predetermined gradient condition along a predetermined direction. Further, the processing module 430 may determine a plurality of second positions corresponding to the plurality of first positions in the target image. According to gray values of the plurality of second positions in the target image, the processing module 430 may generate an initial 2D image of the object. Finally, the processing module 430 may generate a target 2D image of the object based on at least one initial 2D image of the object corresponding to the at least one image.

In some embodiments, for each of the at least one image, the processing module 430 may determine a processing operation based on the type of the lesion in the image and/or the image feature of the image. Further, the processing module 430 may process the image based on the processing operation. More descriptions regarding the processing of the at least one image of the object may be found elsewhere in the present disclosure (e.g., operation 530 and the description thereof).

The modules in the processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined into a single module, and any one of the modules may be divided into two or more units. In some embodiments, the processing device 120 may include one or more additional modules. For example, the obtaining module 410 and the determination module 420 may be combined as a single module which may both obtain at least one image of an object and determine a recognition result of each of the at least one image. As another example, the processing device 120 may also include a transmission module (not shown) configured to transmit signals (e.g., electrical signals, electromagnetic signals) to one or more components (e.g., the scanning device 110, the terminal device 130, the storage device 150) of the medical system 100. As a further example, the processing device 120 may include a storage module (not shown) used to store information and/or data (e.g., the at least one image of the object, the recognition result of each of the at least one image, the processed image) associated with the image processing.

Figure 5:
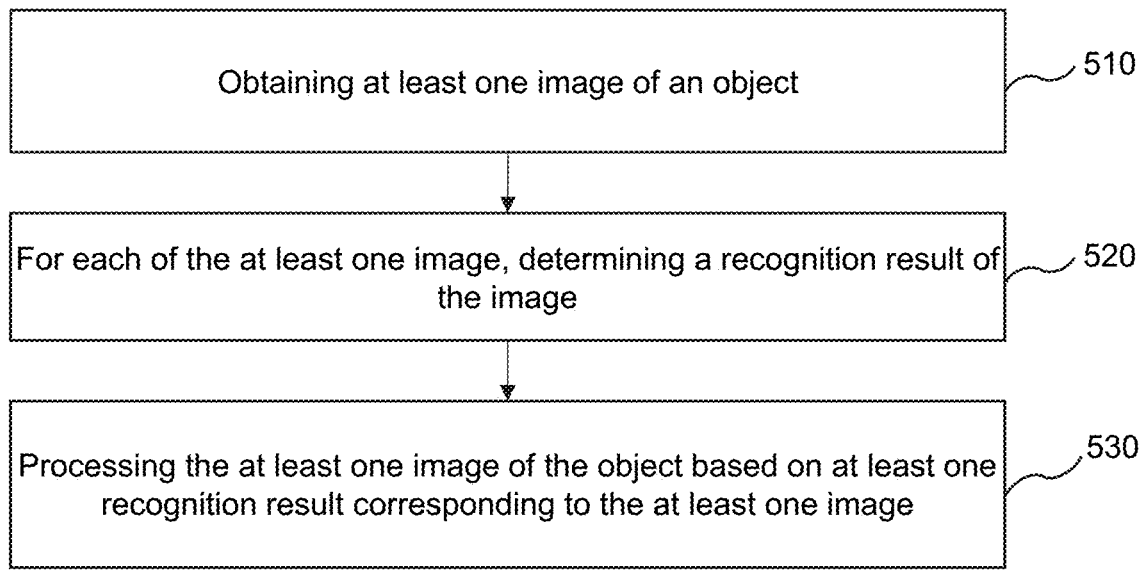
FIG. 5 is a flowchart illustrating an exemplary process for image processing according to some embodiments of the present disclosure.

FIG. 5 is a flowchart illustrating an exemplary process for image processing according to some embodiments of the present disclosure. In some embodiments, process 500 may be executed by the medical system 100. For example, the process 500 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) (e.g., the interface circuits of the processor 210) may obtain at least one image of an object (also referred to as a "target object" or a "scanning object").

In some embodiments, the at least one image may include a 2D image, a 3D image, a 4D image, or the like, or a combination thereof. In some embodiments, the at least one image may include a DBT image, a CT image (e.g., a cone beam CT (CBCT) image, a fan beam CT (FBCT) image), an MR image, a PET image, an X-ray image, a fluoroscopy image, an ultrasound image, a radiotherapy radiographic image, a SPECT Image, or the like, or a combination thereof.

In some embodiments, the processing device 120 may direct the scanning device 110 to perform a scan (e.g., a DBT scan) on the object (e.g., a patient) and determine the at least one image based on scanning data obtained from the scanning device 110. In some embodiments, the at least one image may be previously determined and stored in a storage device (e.g., the storage device 150, the storage device 220, and/or the storage 390). The processing device 120 may obtain the at least one image from the storage device via a network (e.g., the network 140).

In 520, for each of the at least one image, the processing device 120 (e.g., the determination module 420) (e.g., the processing circuits of the processor 210) may determine a recognition result of the image.

The recognition result may include an image type of the image, a type of a lesion in the image, a region of the lesion in the image, an image feature of the image, or the like, or a combination thereof. The image type of the image may include an image size, an image dimension (e.g., a 2D image, a 3D image), an image category (e.g., a DBT image, a CT image, a CBCT image), or the like, or a combination thereof. Detailed descriptions regarding the type and/or the region of the lesion may be found elsewhere in the present disclosure (e.g., FIG. 16 and the description thereof).

In some embodiments, the processing device 120 may determine the recognition result of the image by using a recognition model (e.g., a machine learning model). For example, the processing device 120 may determine the image type of the image by using an image type recognition model. As another example, the processing device 120 may determine the type of the lesion in the image by using a lesion type recognition model. As a further example, the processing device 120 may determine the region of the lesion in the image by using a lesion region recognition model. As a still further example, the processing device 120 may extract the image feature of the image from the image by using a feature extraction model. More descriptions of the recognition result of the image may be found elsewhere in the present disclosure (e.g., FIGS. 16-19 and the descriptions thereof).

In 530, the processing device 120 (e.g., the processing module 430) (e.g., the processing circuits of the processor 210) may process the at least one image of the object based on at least one recognition result corresponding to the at least one image.

In some embodiments, when the at least one recognition result corresponding to the at least one image indicates that the image type of the at least one image is a 3D tomographic image, for each of the at least one image, the processing device 120 may determine a target image of the object by preprocessing the image and determine a target gradient image corresponding to the target image. The processing device 120 may determine, in the target gradient image, a plurality of first positions satisfying a predetermined gradient condition along a predetermined direction. Further, the processing device 120 may determine a plurality of second positions corresponding to the plurality of first positions in the target image. According to gray values of the plurality of second positions in the target image, the processing device 120 may generate an initial 2D image of the object. Finally, the processing device 120 may generate a target 2D image of the object based on at least one initial 2D image of the object corresponding to the at least one image. More descriptions regarding generating the target 2D image may be found elsewhere in the present disclosure (e.g., FIG. 6, FIG. 7A, FIG. 9, FIG. 10, FIG. 12, FIG. 13, FIG. 14, and the descriptions thereof).

In some embodiments, for each of the at least one image, the processing device 120 may determine a processing operation based on the type of the lesion in the image and/or the image feature of the image. The processing operation may include a noise reduction, an enhancement, an organization balance, a thickness balance, a look-up table (LUT) transformation, or the like, or a combination thereof. Further, the processing device 120 may process the image based on the processing operation. More descriptions regarding processing the image based on the processing operation may be found elsewhere in the present disclosure (e.g., FIG. 16, FIG. 19, and the descriptions thereof).

In some embodiments, the processing device 120 may also provide prompt information associated with the recognition result of the image in the processed image. The prompt information may include highlighting the recognition result, zooming in the recognition result, circling the recognition result, prompting the recognition result using a prompt indicator, or the like, or a combination thereof. More descriptions of the prompt information may be found elsewhere in the present disclosure (e.g., FIG. 16 and the description thereof).

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the process 500 may include an additional transmitting operation in which the processing device 120 may transmit the processed image to the terminal device 130. As another example, the process 500 may include an additional storing operation in which the processing device 120 may store information and/or data (e.g., the at least one image of the object, the recognition result of each of the at least one image, the processed image) associated with the image processing in a storage device (e.g., the storage device 150, the storage 220, the storage 390) disclosed elsewhere in the present disclosure.

Figure 6:
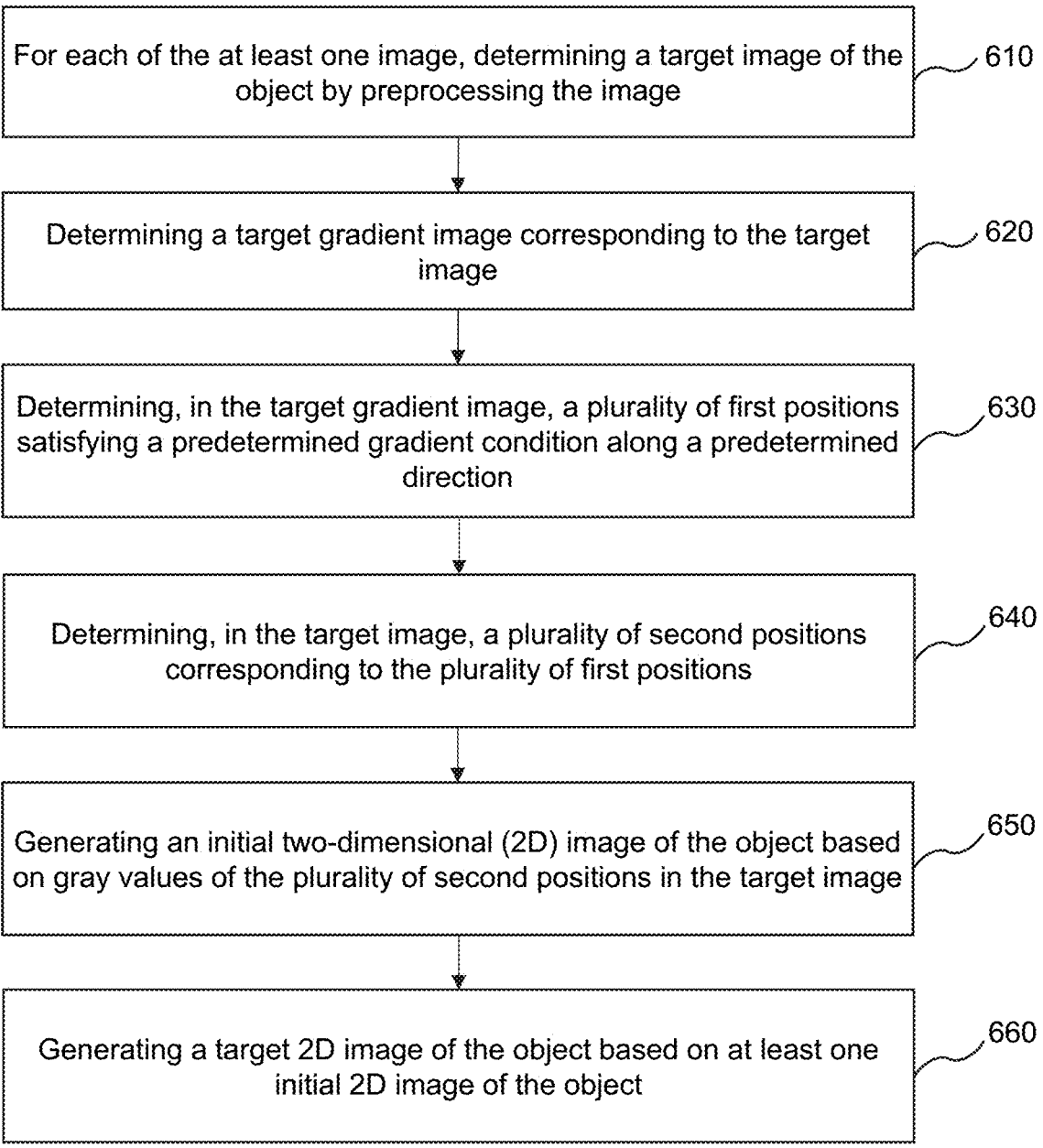
FIG. 6 is a flowchart illustrating an exemplary process for processing at least one image of an object according to some embodiments of the present disclosure.

FIG. 6 is a flowchart illustrating an exemplary process for processing at least one image of an object according to some embodiments of the present disclosure. In some embodiments, process 600 may be executed by the medical system 100. For example, the process 600 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, as described in connection with operation 520, when the at least one recognition result corresponding to the at least one image indicates that the image type of the at least one image is a 3D tomographic image, for each of the at least one image, the processing device 120 (e.g., the processing module 430) (e.g., the processing circuits of the processor 210) may determine a target image (also referred to as a "target 3D tomographic image") of the object by preprocessing the image.

In some embodiments, the processing device 120 may generate at least one high-frequency image (also referred to as a "target high-frequency image") by enhancing high-frequency information in the image. For example, the processing device 120 may generate a plurality of first frequency band images by decomposing the image based on a first predetermined frequency band. The plurality of first frequency band images may include a low-frequency image and at least one initial high-frequency image. The processing device 120 may generate the at least one high-frequency image by enhancing the at least one initial high-frequency image in the first frequency band image. Further, the processing device 120 may generate the target image of the object based on the at least one high-frequency image and a low-frequency image corresponding to low-frequency information in the image. More descriptions regarding determining the target image may be found elsewhere in the present disclosure (e.g., FIG. 13 and the description thereof).

In 620, the processing device 120 (e.g., the processing module 430) (e.g., the processing circuits of the processor 210) may determine a target gradient image (also referred to as a "target 3D gradient image") corresponding to the target image.

In some embodiments, the processing device 120 may generate an initial gradient image (also referred to as an "initial 3D gradient image") by performing a gradient transformation on the target image. Further, the processing device 120 may determine the target gradient image based on the initial gradient image. For example, the processing device 120 may designate the initial gradient image as the target gradient image. As another example, the processing device 120 may determine the target gradient image by performing a convolution processing (also referred to as a "3D convolution") on the initial gradient image. More descriptions regarding determining the target gradient image may be found elsewhere in the present disclosure (e.g., FIG. 7A, FIG. 12, and the descriptions thereof).

In 630, the processing device 120 (e.g., the processing module 430) (e.g., the processing circuits of the processor 210) may determine, in the target gradient image, a plurality of first positions satisfying a predetermined gradient condition along a predetermined direction (also referred to as a "selected direction").

Figure 7A:
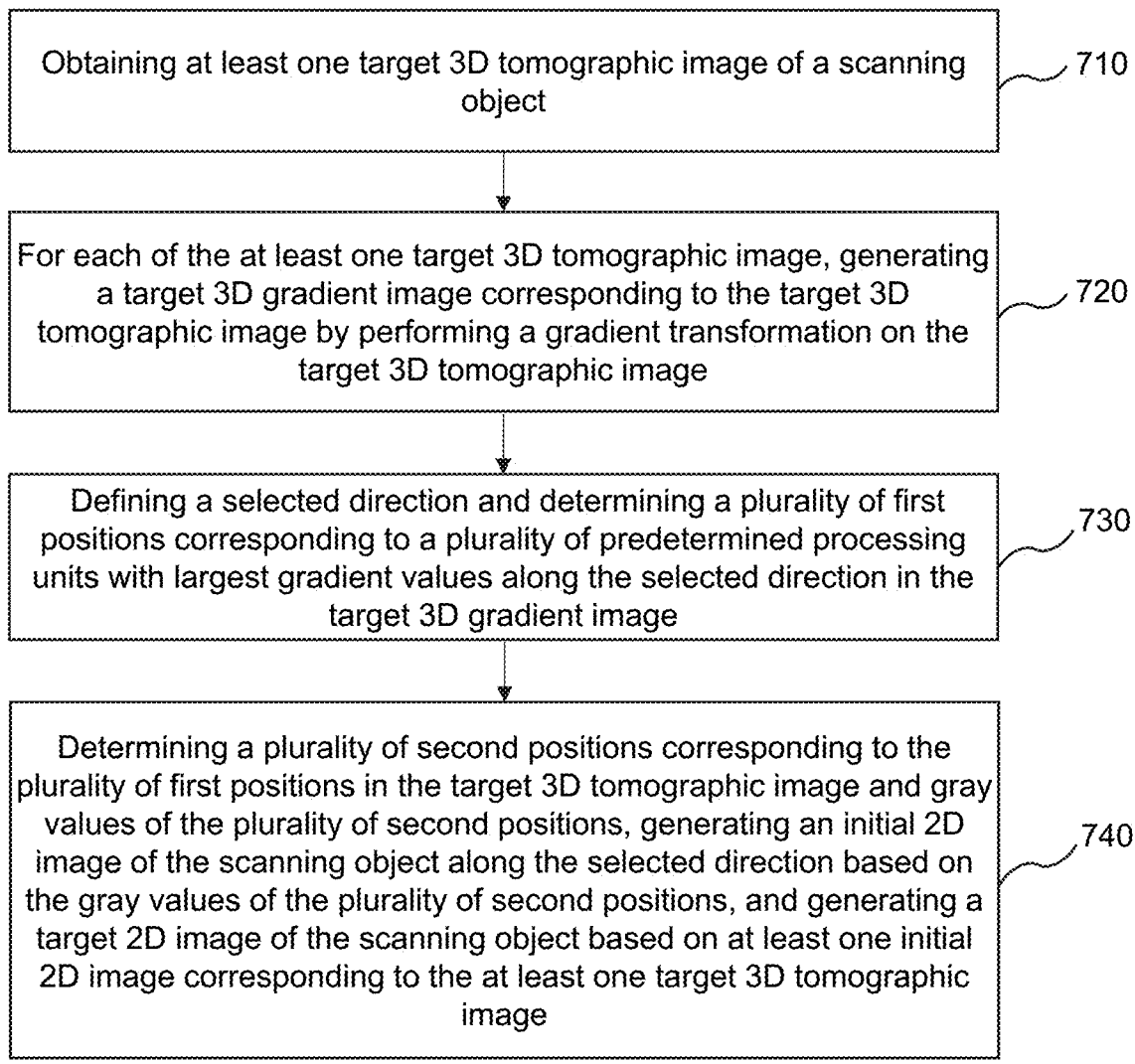
FIG. 7A is a flowchart illustrating an exemplary process for image processing according to some embodiments of the present disclosure.

In some embodiments, for each of a plurality of positions (e.g., a position of a pixel, a position of a predetermined processing unit illustrated in FIG. 7A) in the target gradient image, the processing device 120 may determine whether a gradient value of the position is larger than a gradient threshold along the predetermined direction. The gradient threshold may be a default setting of the medical system 100 or may be adjustable under different situations. In response to determining that the gradient value of the position is larger than the gradient threshold, the processing device 120 may determine that the position satisfies the predetermined gradient condition and designate the position as a first position. Additionally or alternatively, the processing device 120 may determine whether the gradient value of the position is a largest gradient value among gradient values of positions along the predetermined direction. In response to determining that the gradient value of the position is the largest gradient value, the processing device 120 may determine that the position satisfies the predetermined gradient condition and designate the position as a first position. More descriptions regarding determining the plurality of first positions may be found elsewhere in the present disclosure (e.g., FIG. 7A, FIG. 8, and the descriptions thereof).

In 640, the processing device 120 (e.g., the processing module 430) (e.g., the processing circuits of the processor 210) may determine, in the target image, a plurality of second positions corresponding to the plurality of first positions. More descriptions regarding determining the plurality of second positions may be found elsewhere in the present disclosure (e.g., FIG. 7A and the description thereof).

In 650, the processing device 120 (e.g., the processing module 430) (e.g., the processing circuits of the processor 210) may generate an initial 2D image of the object based on gray values of the plurality of second positions in the target image. For example, it is assumed that the target is a 3D cuboid image and the predetermined direction is a vertical direction (i.e., z direction)) of the target image, the processing device 120 may determine the initial 2D image by projecting the gray values of the plurality of second positions to a bottom plane or a top plane of the 3D cuboid image along the predetermined direction. More descriptions regarding generating the initial 2D image may be found elsewhere in the present disclosure (e.g., FIG. 7A and the description thereof).

In 660, the processing device 120 (e.g., the processing module 430) (e.g., the processing circuits of the processor 210) may generate a target 2D image of the object based on at least one initial 2D image of the object corresponding to the at least one image.

In some embodiments, when a count of the at least one initial 2D image (i.e., a count of the at least one image) is 1, the processing device 120 may designate the initial 2D image of the object as the target 2D image of the object.

In some embodiments, when the count of the at least one initial 2D image (i.e., the count of the at least one image) is larger than 1, the processing device 120 may generate the target 2D image of the object by combining the at least one initial 2D image. For example, it is assumed that the target images are 3D cuboid images arranged along the vertical direction, the initial 2D images corresponding to the target images are 2D images each of which is determined by projecting gray values of second positions described above to a bottom plane or a top plane of a corresponding target image, accordingly, the processing device 120 may generate the target 2D image of the object by projecting the initial 2D images to a bottom plane of a target image located at the bottom or a top plane of a target image located at the top along the predetermined direction.

In some embodiments, when the count of the at least one initial 2D image (i.e., the count of the at least one image) is larger than 1, the processing device 120 may generate a first projected image (also referred to as a "maximum density projection image") of the object by projecting the at least one initial 2D image along the predetermined direction based on a maximum density projection algorithm. The processing device 120 may generate a second projected image (also referred to as an "average projection image") of the object by projecting the at least one initial 2D image along the predetermined direction based on an average projection algorithm. Further, the processing device 120 may generate the target 2D image of the object by weighting the first projected image and the second projected image based on a first predetermined weight of the first projected image and a second predetermined weight of the second projected image. More descriptions regarding generating the target 2D image may be found elsewhere in the present disclosure (e.g., FIG. 10 and the description thereof).

In some embodiments, the processing device 120 may generate a preliminary target 2D image of the object by combining the at least one initial 2D image. Further, the processing device 120 may generate the target 2D image of the object by weighting the preliminary target 2D image and a 2D projected image based on a third predetermined weight of the preliminary target 2D image and a fourth predetermined weight of the 2D projected image. The 2D projected image of the object may be generated by performing a projection operation on imaging data associated with the at least one image along the predetermined direction. More descriptions regarding generating the target 2D image by weighting the preliminary target 2D image and the 2D projected image may be found elsewhere in the present disclosure (e.g., FIG. 9, FIG. 12, and the descriptions thereof).

In some embodiments, after generating the target 2D image, the processing device 120 may generate a plurality of second frequency band images by decomposing the target 2D image based on a second predetermined frequency band. The plurality of second frequency band images may include a low-frequency 2D image (also referred to as a "low-frequency image") and a high-frequency 2D image (also referred to as a "high-frequency image"). The processing device 120 may generate a high frequency enhanced image by enhancing the high-frequency 2D image. Further, the processing device 120 may correct the target 2D image based on the high frequency enhanced image. More descriptions regarding correcting the target 2D image may be found elsewhere in the present disclosure (e.g., FIG. 13 and the description thereof).

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 620 and operation 630 may be unnecessary and the processing device 120 may determine the plurality of second positions satisfying the predetermined gradient condition directly based on gradient information of the image (or the target image).

Embodiment 1

FIG. 7A is a flowchart illustrating an exemplary process for image processing according to some embodiments of the present disclosure. In some embodiments, process 700 may be executed by the medical system 100. For example, the process 700 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing device 1500 (e.g., one or more modules illustrated in FIG. 15) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7A and described below is not intended to be limiting.

In 710, at least one target 3D tomographic image of a scanning object may be obtained. In some embodiments, the at least one target 3D tomographic image may be obtained by the processing device 120 (e.g., the obtaining module 410 illustrated in FIG. 4) (e.g., the interface circuits of the processor 210) or the image processing device 1500 (e.g., a target 3D tomographic image obtaining module 1510 illustrated in FIG. 15).

The target 3D tomographic image may refer to a 3D tomographic image that is used to extract a 2D image. In some embodiments, the target 3D tomographic image may be formed by stacking a plurality of 2D tomographic images. In some embodiments, the 3D tomographic image may be obtained by scanning the scanning object or obtained from an external storage medium. Merely by way of example, the target 3D tomographic image may be obtained from a breast image processing system (e.g., a DBT system), a CT image processing system, a CBCT image processing system, or the like, or a combination thereof. It should be noted that the target 3D tomographic image also may be obtained from a multi-modality imaging system.

In some embodiments, the at least one target 3D tomographic image may be image(s) of a scanning part (e.g., a specific organ, a specific tissue) of the scanning object. If a count of the at least one target 3D tomographic image is 1, the entire scanning part of the scanning object may be contained in the target 3D tomographic image. If the count of the at least one target 3D tomographic image is larger than 1, each of the at least one target 3D tomographic image may correspond to a portion of the scanning part of scanning object. In some embodiments, an image processing speed can be improved by using multiple target 3D tomographic images, thereby increasing the efficiency of generating a target 2D image. Detailed descriptions regarding the at least one target 3D tomographic image may be found elsewhere in the present disclosure (e.g., FIG. 7B and the description thereof).

In 720, for each of the at least one target 3D tomographic image, a target 3D gradient image corresponding to the target 3D tomographic image may be generated by performing a gradient transformation on the target 3D tomographic image. In some embodiments, the target 3D gradient image may be generated by the processing device 120 (e.g., the processing module 430 illustrated in FIG. 4) (e.g., the processing circuits of the processor 210) or the image processing device 1500 (e.g., a target 3D gradient image generation module 1520 illustrated in FIG. 15).

Since a target 2D image which is intended to be obtained based on the at least one 3D tomographic image needs to reflect an overall distribution of tissues in the scanning part of the scanning object, it is desirable to retain, in the target 2D image, as much tissue structure information as possible in the 3D tomographic image. Considering that edges of tissue structures such as a lesion and a vasculature are obviously different from surrounding tissues, positions of the tissue structures in the 3D tomographic image may be accurately identified based on the difference. Then the target 2D image may be obtained based on gray values of the positions, accordingly, the tissue structure information may be retained in the target 2D image.

In some embodiments, in order to increase the amount of the tissue structure information retained in target 2D image, a gradient transformation may be performed on the target 3D tomographic image to enhancement edge features of the tissue structures. In some embodiments, the gradient transformation may be performed according to formula (1) below:

$$\sqrt{\left(\frac{\partial V(x,y,z)}{\partial x}\right)^2 + \left(\frac{\partial V(x,y,z)}{\partial y}\right)^2 + a\left(\frac{\partial V(x,y,z)}{\partial z}\right)^2}, \quad (1)$$

where V(x,y,z) refers to the target 3D tomographic image and a refers to a constant coefficient which may be a default setting of the medical system 100 or may be adjustable under different situations.

Further, the target 3D gradient image corresponding to the target 3D tomographic image may be generated based on the result of the gradient transformation. For example, the result of the gradient transformation may be designated as the target 3D gradient image. As another example, the target 3D gradient image may be generated by further processing the result of the gradient transformation. It can be understood that pixels with large gradients in the target 3D gradient image correspond to positions where the edge features in the target 3D tomographic image are obvious.

In 730, a selected direction may be defined and a plurality of first positions corresponding to a plurality of predetermined processing units with largest gradient values along the selected direction in the target 3D gradient image may be determined. In some embodiments, the plurality of first positions may be determined by the processing device 120 (e.g., the processing module 430 illustrated in FIG. 4) (e.g., the processing circuits of the processor 210) or the image processing device 1500 (e.g., a position determination module 1530 illustrated in FIG. 15).

The predetermined processing unit may refer to a smallest unit for image processing. For example, the predetermined processing unit may include one pixel or a predetermined count of pixels. That is, the predetermined processing unit may include a region corresponding to one pixel or a region corresponding to the predetermined count of pixels. The predetermined count may be a default setting of the medical system 100 or may be adjustable under different situations. In some embodiments, the selected direction may be a preset projection direction or a direction of a normal vector of the target 2D image. For example, the selected direction may include a vertical axis direction, a coronal axis direction, a sagittal axis direction, etc.

As described in connection with operation 720, the pixels with relatively large gradients in the target 3D gradient image correspond to the positions where the edge features in the target 3D tomographic image are obvious, which are intended to be retained in the target 2D image. In some embodiments, the plurality of first positions corresponding to the plurality of predetermined processing units with the largest gradient values along the selected direction may be found in the target 3D gradient image based on gradient values of processing units in the target 3D gradient image. It can be understood that the first positions are the positions with a large amount of edge information in the target 3D gradient image. More descriptions regarding determining the first positions may be found elsewhere in the present disclosure (e.g., FIG. 8 and the description thereof).

In 740, a plurality of second positions corresponding to the plurality of first positions may be determined in the target 3D tomographic image, gray values of the plurality of second positions may be determined, and an initial 2D image of the scanning object along the selected direction may be generated based on the gray values of the plurality of second positions. Further, a target 2D image of the scanning object may be generated based on at least one initial 2D image corresponding to the at least one target 3D tomographic image. The target 2D image may refer to a 2D image that includes an overall distribution of tissues in the scanning part of the scanning object. In some embodiments, operation 740 may be performed by the processing device 120 (e.g., the processing module 430 illustrated in FIG. 4) (e.g., the processing circuits of the processor 210) or the image processing device 1500 (e.g., a target 2D image generation module 1540 illustrated in FIG. 15).

Since the target 3D gradient image is determined by performing a gradient transformation on the target 3D tomographic image, dimensions and sizes of the target 3D tomographic image and the target 3D gradient image corresponding to the target 3D tomographic image are exactly the same. Accordingly, there are positions (i.e., the plurality of second positions) in the target 3D tomographic image corresponding to the plurality of first positions with the largest gradient values along the selected direction in the target 3D gradient image, which correspond to large amount of edge information in the target 3D tomographic image. Then gray values of the plurality of second positions can be determined based on 3D coordinate information of the plurality of second positions and an initial 2D image can be generated by arranging the gray values based on the 3D coordinate information, wherein the initial 2D image retains relatively more edge features.

In some embodiments, when a count of the at least one target 3D tomographic image (i.e., a count of the at least one initial 2D image) is 1, the initial 2D image of the scanning object may be designated as the target 2D image of the scanning object. If the count of the at least one target 3D tomographic image (i.e., the count of the at least one initial 2D image) is larger than 1, the target 2D image of the scanning object may be generated by combining the at least one initial 2D image. For example, it is assumed that the target 3D tomographic images are 3D cuboid images arranged along the vertical direction and the selected direction is the vertical direction, the target 2D image of the scanning object may be generated by projecting the at least one initial 2D image to a bottom plane of a target image located at the bottom or a top plane of a target image located at the top along the selected direction.

Figure 7B:
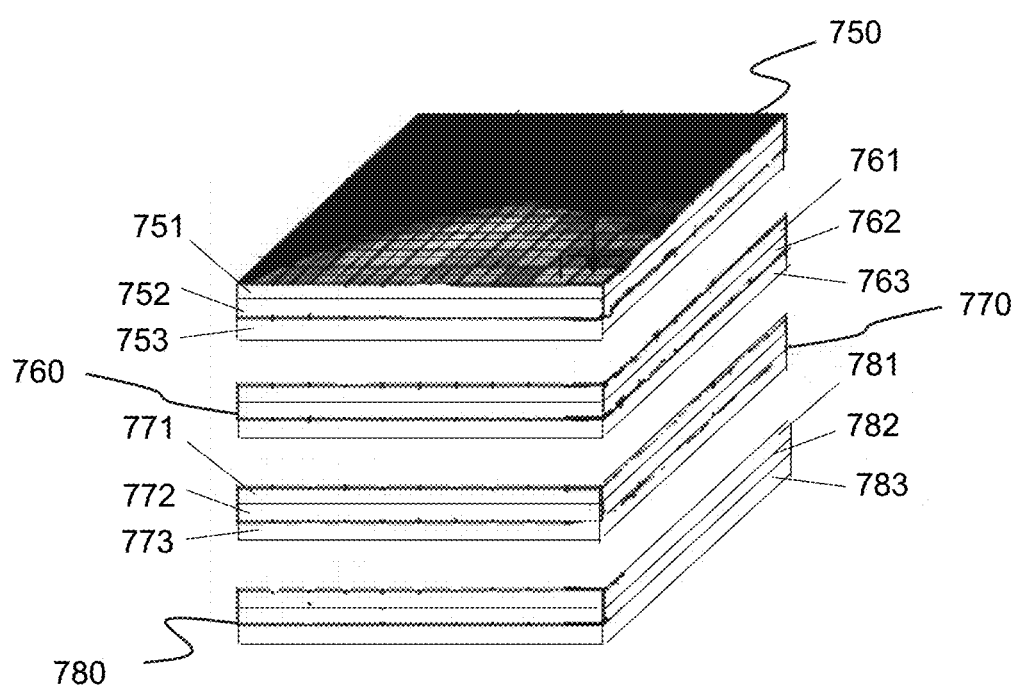
FIG. 7B is a schematic diagram illustrating exemplary target 3D tomographic images of a scanning object according to some embodiments of the present disclosure.

In some embodiments, in order to improve the efficiency of image processing, a complete 3D tomographic image of the scanning object may be divided into a plurality of sub 3D tomographic images (i.e., the at least one target 3D tomographic image, which can be called "a plurality of target 3D tomographic images" since the count of the at least one target 3D tomographic image is larger than 1). For example, as illustrated in FIG. 7B, the complete 3D tomographic image may be divided into a plurality of sub 3D tomographic images along the vertical direction. For each of the plurality of target 3D tomographic images, an initial 2D image corresponding to the target 3D tomographic image may be generated. Further, a target 2D image may be generated by synthesizing a plurality of initial 2D images corresponding to the plurality of target 3D tomographic images. Accordingly, the generated target 2D image can cover the entire scanning object. Specifically, the target 2D image may be generated by projecting the plurality of initial 2D images along the selected direction by using a projection algorithm or a combination of a plurality of projection algorithms.

According to the process 700, the gradient transformation is performed on the target 3D tomographic image to generate the target 3D gradient image corresponding to the target 3D tomographic image, which enhances the edge features in the target 3D tomographic image, thereby improving a retention probability of the edges of the tissue structures such as the lesion and the vasculature in the target 3D tomographic image during the image processing. Then a selected direction may be defined and a plurality of first positions corresponding to a plurality of predetermined processing units with largest gradient values in the target 3D gradient image may be determined along the selected direction. Further, a plurality of second positions corresponding to the plurality of first positions may be determined in the target 3D tomographic image, gray values of the plurality of second positions may be determined, and an initial 2D image of the scanning object along the selected direction may be generated based on the gray values of the plurality of second positions. Further, a target 2D image of the scanning object may be generated based on at least one initial 2D image corresponding to the at least one target 3D tomographic image. Accordingly, a 2D image (i.e., the target 2D image) reflecting the overall distribution of tissues in the scanning part of the scanning object can be obtained from the at least one target 3D tomographic image, which can reduce scanning time and radiation dose received by the scanning object, thereby improving the efficiency of obtaining the target 2D image. In addition, due to the gradient transformation and the retention of the gray values of the second positions, for the target 2D image, the amount of information contents of the tissue structures such as the lesion and the vasculature can be ensured, thereby improving the image quality of the target 2D image.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in order to improve image detail information, the target 2D image may be further processed, for example, a weighting operation may be performed on the target 2D image and a 2D projected image obtained based on imaging data associated with the at least one target 3D tomographic image. In this situation, the target 2D image can be considered as a "preliminary target 2D image," more descriptions may be found in FIG. 9 and the description thereof (embodiment 2).

FIG. 7B is a schematic diagram illustrating exemplary target 3D tomographic images of a scanning object according to some embodiments of the present disclosure.

As illustrated in FIG. 7B, for a specific scanning part (e.g., a breast) of a scanning object, a plurality of fault layers (e.g., 751, 752, 753, 761, 762, 763, 771, 772, 773, 781, 782, 783) of the scanning object may be obtained by scanning the scanning object from top to bottom using a scanning device (e.g., the scanning device 110). Then at least two of the plurality of fault layers may be stacked to formed a target 3D tomographic image of the scanning object. For example, fault layers 751, 752, and 753 may be stacked to formed a target 3D tomographic image 750; fault layers 761, 762, and 763 may be stacked to formed a target 3D tomographic image 760; fault layers 771, 772, and 773 may be stacked to formed a target 3D tomographic image 770; fault layers 781, 782, and 783 may be stacked to formed a target 3D tomographic image 780.

As described in connection with operation 710, if the count of the at least one target 3D tomographic image is larger than 1, each of the at least one target 3D tomographic image may correspond to a portion of the scanning part of scanning object. As illustrated in FIG. 7B, the target 3D tomographic image 750 may correspond to an upper quarter of the scanning part (e.g., the breast) of the scanning object; the target 3D tomographic image 780 may correspond to a lower quarter of the scanning part (e.g., the breast) of the scanning object.

Figure 8A:
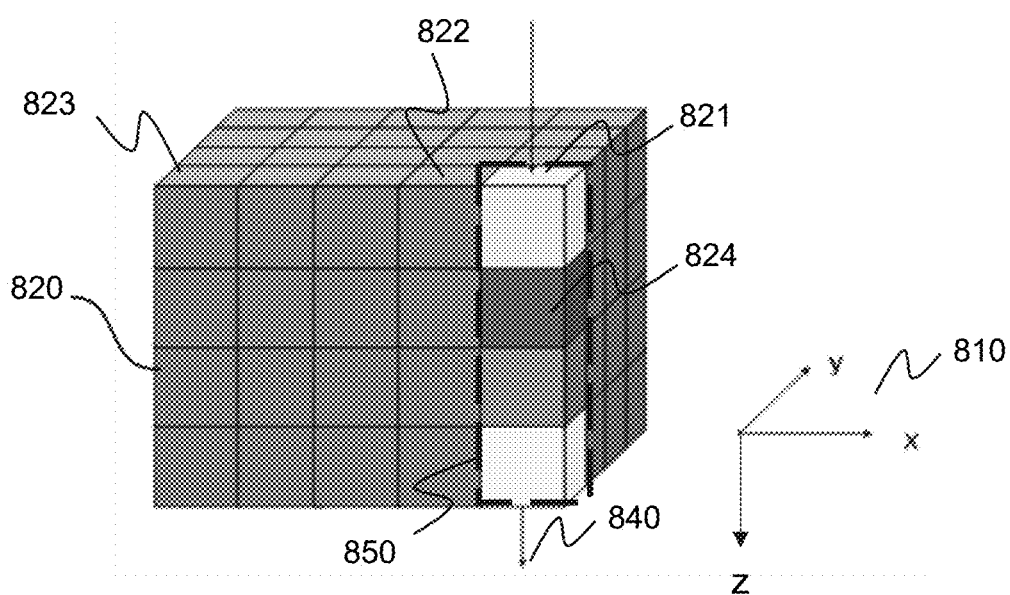
FIG. 8A is a schematic diagram illustrating exemplary operations for determining a plurality of first positions in a target 3D gradient image according to some embodiments of the present disclosure.
Figure 8B:
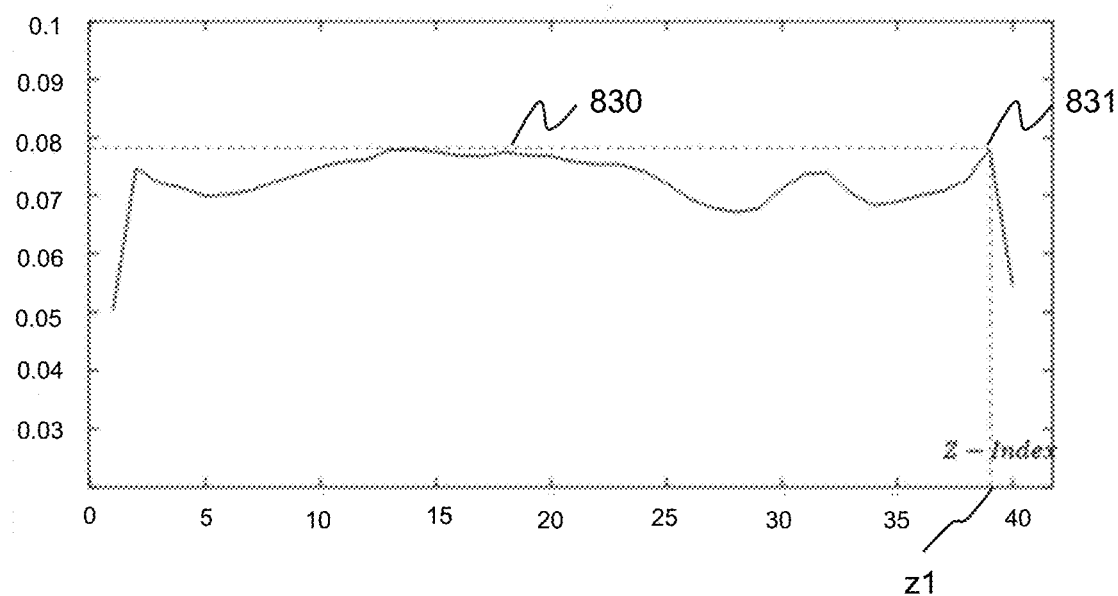
FIG. 8B is a schematic diagram illustrating an exemplary gradient value curve of the target 3D gradient image according to some embodiments of the present disclosure.

FIG. 8A is a schematic diagram illustrating exemplary operations for determining a plurality of first positions in a target 3D gradient image according to some embodiments of the present disclosure. FIG. 8B is a schematic diagram illustrating an exemplary gradient value curve of the target 3D gradient image according to some embodiments of the present disclosure.

As illustrated in FIG. 8A, 820 refers to a target 3D gradient image and 840 refers to a selected direction (which is parallel to z-axis). It is assumed that a predetermined processing unit is a "pixel," take a column 850 along the selected direction 840 as an example, a first position 824 with the largest gradient value along the selected direction 840 may be determined according to a gradient value curve 830 illustrated in FIG. 8B. As illustrated in FIG. 8B, an abscissa of the gradient value curve 830 indicates z coordinate values of positions of predetermined processing units in the column 850; an ordinate of the gradient value curve 830 indicates pixel values (i.e., gray values, which indicate gradient values) of the predetermined processing units (which are pixels) in the column 850. Accordingly, a maximum ordinate value 831 (i.e., z1) of the gradient value curve 830 indicates a maximum value (i.e., a largest gradient value) among the gradient values of the predetermined processing units in the column 850, then the coordinate of the first position 824 with the largest gradient value may be determined in the coordinate system 810. Further, in a similar manner, other columns along the selected direction 840 may be determined and first positions with largest gradient values in the columns can be determined.

Embodiment 2

Figure 9:
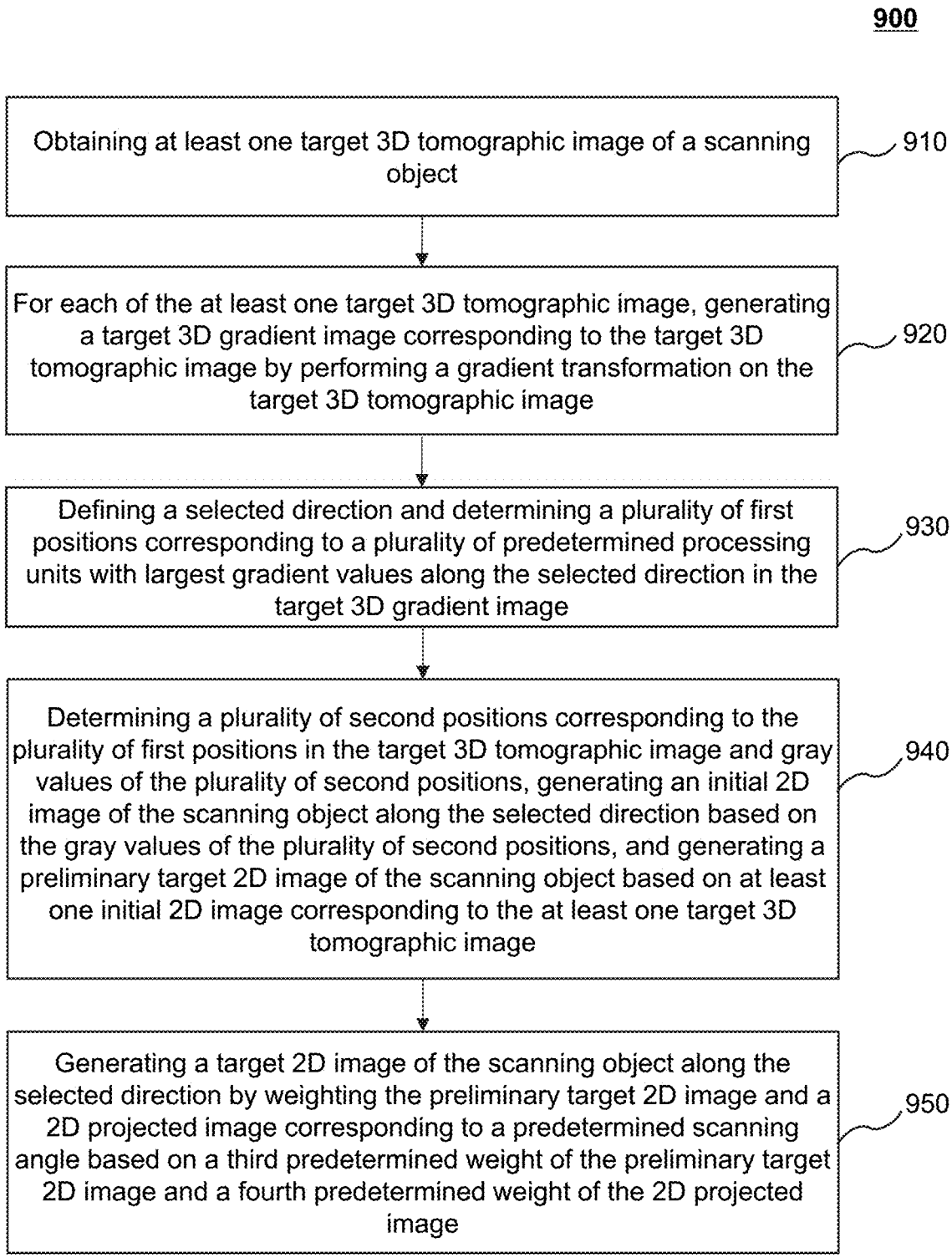
FIG. 9 is a flowchart illustrating an exemplary process for image processing according to some embodiments of the present disclosure.

FIG. 9 is a flowchart illustrating an exemplary process for image processing according to some embodiments of the present disclosure. In some embodiments, process 900 may be executed by the medical system 100. For example, the process 900 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing device 1500 (e.g., one or more modules illustrated in FIG. 15) may execute the set of instructions and may accordingly be directed to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 910, at least one target 3D tomographic image of a scanning object may be obtained. More descriptions regarding the obtaining of the at least one target 3D tomographic image may be found elsewhere in the present disclosure (e.g., operation 710 and the description thereof).

In 920, for each of the at least one target 3D tomographic image, a target 3D gradient image corresponding to the target 3D tomographic image may be generated by performing a gradient transformation on the target 3D tomographic image. More descriptions regarding the generating of the target 3D gradient image may be found elsewhere in the present disclosure (e.g., operation 720 and the description thereof).

In 930, a selected direction may be defined and a plurality of first positions corresponding to a plurality of predetermined processing units with largest gradient values along the selected direction in the target 3D gradient image may be determined. More descriptions regarding the determining of the plurality of first positions may be found elsewhere in the present disclosure (e.g., operation 730 and the description thereof).

In 940, a plurality of second positions corresponding to the plurality of first positions may be determined in the target 3D tomographic image, gray values of the plurality of second positions may be determined, and an initial 2D image of the scanning object along the selected direction may be generated based on the gray values of the plurality of second positions. More descriptions regarding the generating of the initial 2D image may be found elsewhere in the present disclosure (e.g., operation 740 and the description thereof). Further, a preliminary target 2D image of the scanning object may be generated based on at least one initial 2D image corresponding to the at least one target 3D tomographic image. The preliminary target 2D image may refer to a 2D image that includes an overall distribution of tissues in the scanning part of the scanning object.

In 950, a target 2D image of the scanning object along the selected direction may be generated by weighting the preliminary target 2D image and a 2D projected image corresponding to a predetermined scanning angle based on a third predetermined weight of the preliminary target 2D image and a fourth predetermined weight of the 2D projected image. In some embodiments, the target 2D image may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In some embodiments, the 2D projected image may refer to a 2D image obtained by projecting 3D scanning data (also referred to as "imaging data") (e.g., scanning data used to obtain the at least one target 3D tomographic image) of the scanning object along the predetermined scanning angle. In some embodiments, the predetermined scanning angle may be the same as or substantially the same as an angle of the selected direction. In some embodiments, when the scanning object is a breast, the 3D scanning data may be scanning data obtained during a DBT scan performed on the scanning object. In some embodiments, the third predetermined weight and/or the fourth predetermined weight may be default settings of the medical system 100 or may be adjustable under different situations (e.g., determined according to clinical needs). For example, if it is intended to obtain a target 2D image in which a lesion (e.g., a calcified tissue) has a relatively strong contrast, the third predetermined weight may be set as a relatively large value; if it is intended to obtain a target 2D image with a relatively soft display, the fourth predetermined weight may be set as a relatively large value.

As described above, the preliminary target 2D image reflects an overall distribution of tissues in the scanning part of the scanning object, in which edges of tissue structures such as a lesion and a vasculature are highlighted but detail information is partially lost. While the 2D projected image corresponding to the predetermined scanning angle is a low-dose image, which retains some detail information although there may be some noises. In addition, a projection position and a projection geometric relationship of the 2D projected image are the same as those of the preliminary target 2D image. Accordingly, the weighting of the 2D projected image and the preliminary target 2D image can enhance detail information in the final target 2D image.

In some embodiments, the preliminary target 2D image and the 2D projected image may be weighted according to formula (2) below:

$$\text{Volume} = W_3 * I_{PRE} + W_4 * I_{PRO} \tag{2},$$

where Volume refers to the target 2D image, $I_{PRE}$ refers to the preliminary target 2D image, $I_{PRO}$ refers to the 2D projected image, $W_3$ refers to the third predetermined weight of the preliminary target 2D image, $W_4$ refers to the fourth predetermined weight of the 2D projected image, and a sum of $W_3$ and $W_4$ is 1.

According to the process 900, the gradient transformation is performed on the target 3D tomographic image to generate the target 3D gradient image corresponding to the target 3D tomographic image, which enhances the edge features in the target 3D tomographic image, thereby improving a retention probability of the edges of the tissue structures such as the lesion and the vasculature in the target 3D tomographic image during the image processing. Then a selected direction may be defined and a plurality of first positions corresponding to a plurality of predetermined processing units with largest gradient values in the target 3D gradient image may be determined along the selected direction. Further, a plurality of second positions corresponding to the plurality of first positions may be determined in the target 3D tomographic image, gray values of the plurality of second positions may be determined, and an initial 2D image of the scanning object along the selected direction may be generated based on the gray values of the plurality of second positions. Further, a preliminary target 2D image of the scanning object may be generated based on at least one initial 2D image corresponding to the at least one target 3D tomographic image. Accordingly, a 2D image (i.e., the preliminary target 2D image) reflecting the overall distribution of tissues in the scanning part of the scanning object can be obtained from the at least one target 3D tomographic image, which can reduce scanning time and radiation dose received by the scanning object, thereby improving the efficiency of obtaining the preliminary target 2D image. In addition, due to the gradient transformation and the retention of the gray values of the second positions, for the preliminary target 2D image, the amount of information contents of the tissue structures such as the lesion and the vasculature can be ensured. The target 2D image of the scanning object along the selected direction may be generated by weighting the preliminary target 2D image and the 2D projected image corresponding to a predetermined scanning angle, which enhances detailed information of the target 2D image, thereby improving the image quality of the target 2D image.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Embodiment 3

Figure 10:
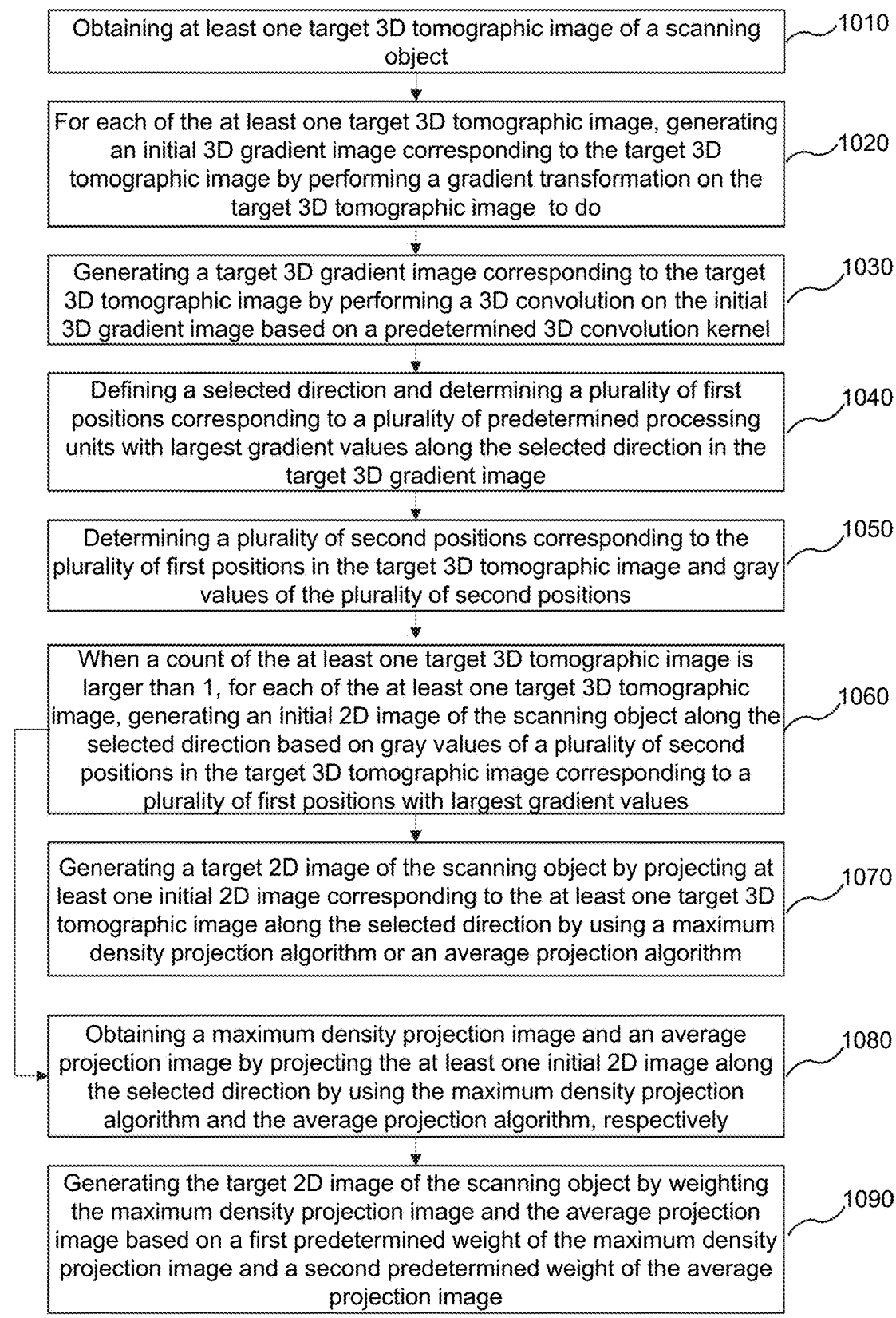
FIG. 10 is a flowchart illustrating an exemplary process for image processing according to some embodiments of the present disclosure.

FIG. 10 is a flowchart illustrating an exemplary process for image processing according to some embodiments of the present disclosure. In some embodiments, process 1000 may be executed by the medical system 100. For example, the process 1000 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing device 1500 (e.g., one or more modules illustrated in FIG. 15) may execute the set of instructions and may accordingly be directed to perform the process 1000. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting.

In 1010, at least one target 3D tomographic image of a scanning object may be obtained. More descriptions regarding the obtaining of the at least one target 3D tomographic image may be found elsewhere in the present disclosure (e.g., operation 710 and the description thereof).

In 1020, for each of the at least one target 3D tomographic image, an initial 3D gradient image corresponding to the target 3D tomographic image may be generated by performing a gradient transformation on the target 3D tomographic image. In some embodiments, the gradient transformation may be performed by the processing device 120 (e.g., the processing module 430 illustrated in FIG. 4) (e.g., the processing circuits of the processor 210) or the image processing device 1500 (e.g., the target 3D gradient image generation module 1520 illustrated in FIG. 15).

In some embodiments, the initial 3D gradient image may be generated by performing the gradient transformation according to formula (1) on the target 3D tomographic image.

In 1030, a target 3D gradient image corresponding to the target 3D tomographic image may be generated by performing a 3D convolution on the initial 3D gradient image based on a predetermined 3D convolution kernel. In some embodiments, the 3D convolution may be performed by the processing device 120 (e.g., the processing module 430 illustrated in FIG. 4) (e.g., the processing circuits of the processor 210) or the image processing device 1500 (e.g., the target 3D gradient image generation module 1520 illustrated in FIG. 15). The predetermined 3D convolution kernel may be a default setting of the medical system 100 or may be adjustable under different situations.

Generally, the target 3D tomographic image includes a plurality of fault layers and in the initial 3D gradient image, only information within the plurality of fault layers is enhanced. However, lesion(s) usually cross two or more fault layers. Therefore, in order to further enhance edge features of the lesion(s) and improve the amount of information characterizing the lesion(s) in the target 2D image, the 3D convolution is performed on the initial 3D gradient image, which can increase an interlayer correlation in the initial 3D gradient image.

In 1040, a selected direction may be defined and a plurality of first positions corresponding to a plurality of predetermined processing units with largest gradient values along the selected direction in the target 3D gradient image may be determined. More descriptions regarding the determining of the plurality of first positions may be found elsewhere in the present disclosure (e.g., operation 730 and the description thereof).

In 1050, a plurality of second positions corresponding to the plurality of first positions may be determined in the target 3D tomographic image, gray values of the plurality of second positions may be determined. More descriptions regarding the determining of the plurality of second positions and the gray values of the plurality of second positions may be found elsewhere in the present disclosure (e.g., operation 740 and the description thereof).

In 1060, as described in connection with operation 730 and operation 740, when a count of the at least one target 3D tomographic image is larger than 1, for each of the at least one target 3D tomographic image, an initial 2D image of the scanning object along the selected direction may be generated based on gray values of the plurality of second positions in the target 3D tomographic image. In some embodiments, the initial 2D image may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In 1070, a target 2D image of the scanning object may be generated by projecting at least one initial 2D image corresponding to the at least one target 3D tomographic image along the selected direction by using a maximum density projection algorithm or an average projection algorithm. In some embodiments, the target 2D image may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

The maximum density projection algorithm may refer to an algorithm used to obtain projection results (e.g., a pixel, a voxel) with maximum gray values along a projection direction in a 3D image. The average projection algorithm may refer to an algorithm used to obtain projection results (e.g., a pixel, a voxel) with average gray values along a projection direction in a 3D image. As described in connection with operation 660, each of the at least one initial 2D image is determined by projecting gray values of second positions to a bottom plane or a top plane of a corresponding target 3D tomographic image, it can be considered that the at least one initial 2D image forms a new 3D image. Accordingly, a projection can be performed on the new 3D image according to the maximum density projection algorithm or the average projection algorithm, then a 2D projection result image may be obtained, which may be designated as the target 2D image of the scanning object along the selected direction. More descriptions of determining the 2D projection result image may be found elsewhere in the present disclosure (e.g., FIG. 11 and the description thereof).

In 1080, as described in connection with operation 660, a maximum density projection image (also referred to as a "first projected image") and an average projection image (also referred to as a "second projected image") may be obtained by projecting the at least one initial 2D image along the selected direction by using the maximum density projection algorithm and the average projection algorithm, respectively. In some embodiments, the maximum density projection image and the average projection image may be obtained by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In some situations, a single projection algorithm may have certain drawbacks. For example, according to the maximum density projection algorithm, tissues with a large attenuation can be relatively clearly displayed but tissues with a low attenuation may be relatively unclearly displayed. As another example, according to the average projection algorithm, tissues with a low attenuation can be relatively clearly displayed but tissues with a large attenuation may be relatively unclearly displayed. Accordingly, in order to obtain a target 2D image with a relatively good image effect, projection result images of different projection algorithms (e.g., the maximum density projection algorithm and the average projection algorithm) may be combined.

In 1090, the target 2D image of the scanning object may be generated by weighting the maximum density projection image and the average projection image based on a first predetermined weight of the maximum density projection image and a second predetermined weight of the average projection image. In some embodiments, the target 2D image of the scanning object may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15). In some embodiments, the first predetermined weight and/or the second predetermined weight may be default settings of the medical system 100 or may be adjustable under different situations (e.g., determined according to clinical needs). For example, if it is intended to obtain a target 2D image in which a lesion (e.g., a calcified tissue) has a relatively strong contrast, the first predetermined weight may be set as a relatively large value; if it is intended to obtain a target 2D image with a relatively soft display, the second predetermined weight may be set as a relatively large value.

In some embodiments, the maximum density projection image and the average projection image may be weighted according to formula (3) below:

$$\text{Volume} = W_1 * I_{MIP} + W_2 * I_{Average} \quad (3),$$

where Volume refers to the target 2D image, $I_{MIP}$ refers to the maximum density projection image, $I_{Average}$ refers to the average projection image, $W_1$ refers to the first predetermined weight of the maximum density projection image, and $W_2$ refers to the fourth predetermined weight of the average projection image.

According to process 1000, the target 3D gradient image corresponding to the target 3D tomographic image may be generated by performing the 3D convolution, which enhances intra-layer edge information in each of multiple 2D tomographic images and increases an interlayer correlation among the multiple 2D tomographic images, so that gradient information (e.g., gradient values) in the target 3D gradient image can reflect edge features of tissue structures such as a lesion in the target 3D tomographic image, thereby increasing an amount of information characterizing tissue structures crossing fault layers in the target 2D image. Further, the target 2D image of the scanning object may be generated by projecting the at least one initial 2D image using the maximum density projection algorithm or the average projection algorithm, which increases a generation speed of the target 2D image. Still further, the target 2D image of the scanning object may be generated by weighting the maximum density projection image obtained based on the maximum density projection algorithm and the average projection image obtained based on the average projection algorithm, which makes that an imaging effect of the obtained target 2D image can satisfy various clinical needs.

It should be noted that the above description regarding the process 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
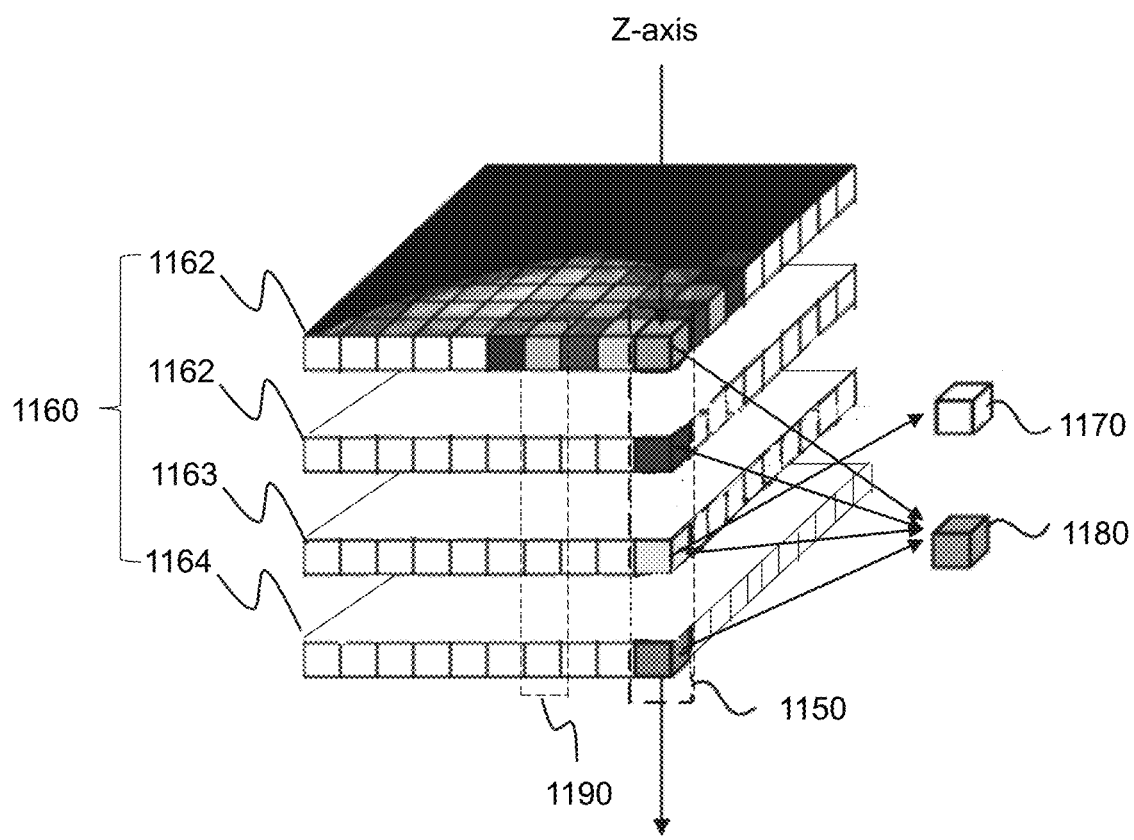
FIG. 11 is a schematic diagram illustrating exemplary operations for determining a 2D projection result image according to some embodiments of the present disclosure.

FIG. 11 is a schematic diagram illustrating exemplary operations for determining a 2D projection result image according to some embodiments of the present disclosure. As described in connection with FIG. 10, the maximum density projection algorithm and the average projection algorithm may be used to obtain projection results (e.g., a pixel, a voxel) with maximum gray values and average gray values along a projection direction in a 3D image, respectively.

As illustrated in FIG. 11, it is assumed that z-axis is the selected direction, when a count (e.g., 4) of the at least one target 3D tomographic image is larger than 1, a plurality (e.g., 4) of initial 2D images 1160 (e.g., 1161, 1162, 1163, 1164) corresponding to a plurality (e.g., 4) of target 3D tomographic images may be stacked along the selected direction, that is, it can be considered that the plurality of initial 2D images form a new 3D image. For a column 1150 including a plurality (e.g., 4) of voxels (or pixels) in the plurality of initial 2D images 1160 (e.g., 1161, 1162, 1163, 1164), a voxel (e.g., a voxel in 1163) (or a pixel) with a maximum gray value may be selected from the plurality of voxels in the column 1150 as a projection result 1170 corresponding to the maximum density projection algorithm; a voxel with an average value of gray values of the plurality of voxels (or pixels) in the column 1150 may be determined as a projection result 1180 corresponding to the average projection algorithm. Further, in a similar manner, for other columns (e.g., 1190) along the selected direction, other projection results corresponding to the maximum density projection algorithm or the average projection algorithm may be obtained.

In some embodiments, a 2D projection result image of the plurality (e.g., 10, 4) of initial 2D images may be generated based on a plurality of projection results corresponding to a plurality of columns. For example, a 2D projection result image may be generated by projecting the plurality of projection results along the selected direction.

Embodiment 4

Figure 12:
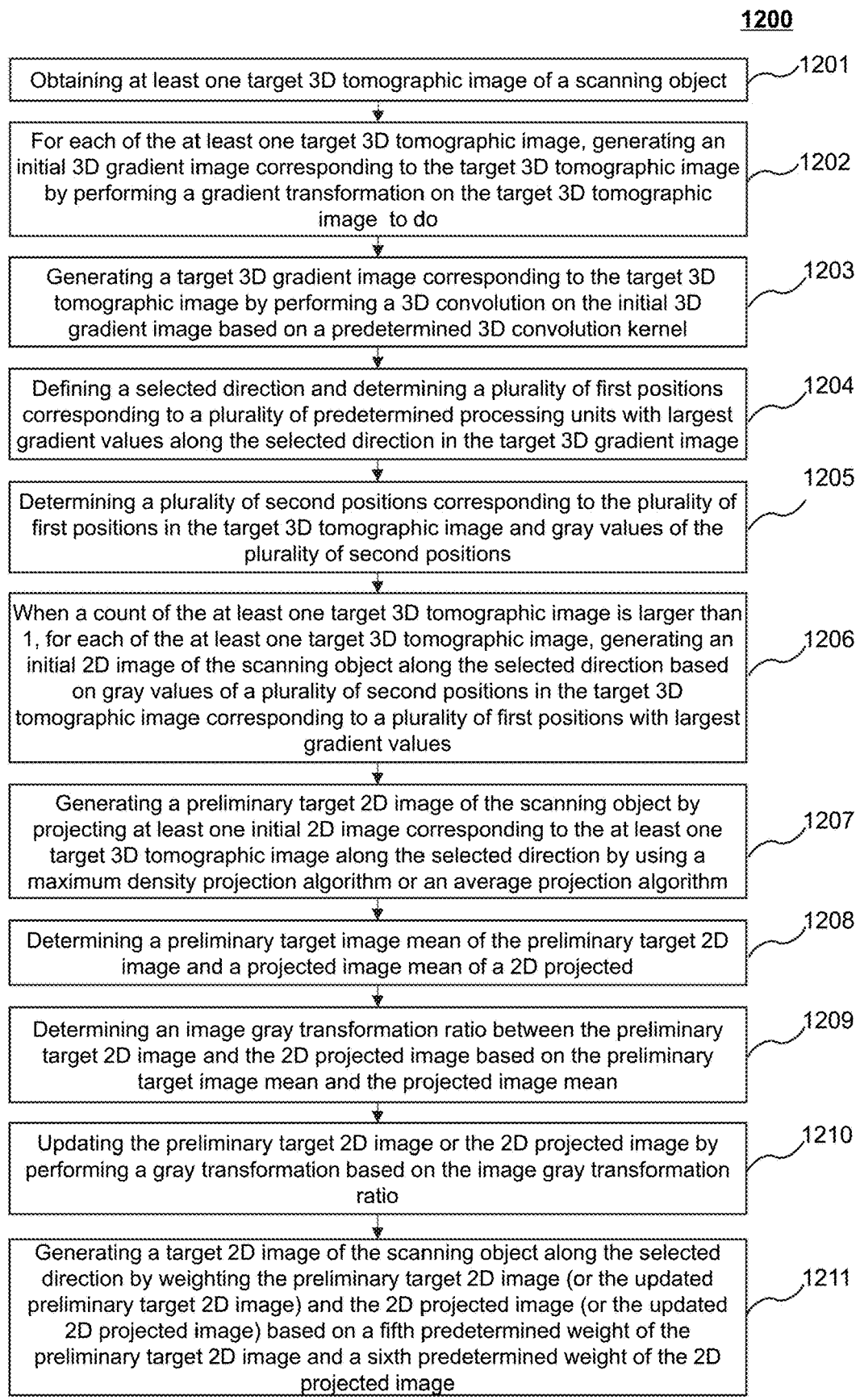
FIG. 12 is a flowchart illustrating an exemplary process for image processing according to some embodiments of the present disclosure.

FIG. 12 is a flowchart illustrating an exemplary process for image processing according to some embodiments of the present disclosure. In some embodiments, process 1200 may be executed by the medical system 100. For example, the process 1200 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing device 1500 (e.g., one or more modules illustrated in FIG. 15) may execute the set of instructions and may accordingly be directed to perform the process 1200. The operations of the illustrated process presented below are intended to be illustrative. In some embodiments, the process 1200 may be accomplished with one or more additional operations not described and/or without one or more of the operations discussed. Additionally, the order of the operations of process 1200 illustrated in FIG. 12 and described below is not intended to be limiting.

In 1201, at least one target 3D tomographic image of a scanning object may be obtained. More descriptions regarding the obtaining of the at least one target 3D tomographic image may be found elsewhere in the present disclosure (e.g., operation 710 and the description thereof).

In 1202, for each of the at least one target 3D tomographic image, an initial 3D gradient image corresponding to the target 3D tomographic image may be generated by performing a gradient transformation on the target 3D tomographic image. More descriptions regarding the generating of the initial 3D gradient image may be found elsewhere in the present disclosure (e.g., operation 1020 and the description thereof).

In 1203, a target 3D gradient image corresponding to the target 3D tomographic image may be generated by performing a 3D convolution on the initial 3D gradient image based on a predetermined 3D convolution kernel. More descriptions regarding the generating of the target 3D gradient image may be found elsewhere in the present disclosure (e.g., operation 1030 and the description thereof).

In 1204, a selected direction may be defined and a plurality of first positions corresponding to a plurality of predetermined processing units with largest gradient values along the selected direction in the target 3D gradient image may be determined. More descriptions regarding the determining of the plurality of first positions may be found elsewhere in the present disclosure (e.g., operation 730 and the description thereof).

In 1205, a plurality of second positions corresponding to the plurality of first positions may be determined in the target 3D tomographic image, gray values of the plurality of second positions may be determined. More descriptions regarding the determining of t the plurality of second positions and the gray values of the plurality of second positions may be found elsewhere in the present disclosure (e.g., operation 740 and the description thereof).

In 1206, when a count of the at least one target 3D tomographic image is larger than 1, for each of the at least one target 3D tomographic image, an initial 2D image of the scanning object along the selected direction may be generated based on gray values of a plurality of second positions in the target 3D tomographic image corresponding to a plurality of first positions with largest gradient values. More descriptions regarding the generating of the initial 2D image may be found elsewhere in the present disclosure (e.g., operation 1060 and the description thereof).

In 1207, a preliminary target 2D image of the scanning object may be generated by projecting at least one initial 2D image corresponding to the at least one target 3D tomographic image along the selected direction by using a maximum density projection algorithm or an average projection algorithm. In some embodiments, the initial preliminary target 2D image may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

The maximum density projection algorithm may refer to an algorithm used to obtain projection results (e.g., a pixel, a voxel) with maximum gray values along a projection direction in a 3D image. The average projection algorithm may refer to an algorithm used to obtain projection results (e.g., a pixel, a voxel) with average gray values along a projection direction in a 3D image. As described in connection with operation 660, each of the at least one initial 2D image is determined by projecting gray values of second positions to a bottom plane or a top plane of a corresponding target 3D tomographic image, it can be considered that the at least one initial 2D image forms a new 3D image. Accordingly, a projection can be performed on the new 3D image according to the maximum density projection algorithm or the average projection algorithm, then a 2D projection result image may be obtained, which may be designated as the target 2D image of the scanning object along the selected direction.

In 1208, a preliminary target image mean of the preliminary target 2D image and a projected image mean of a 2D projected image may be determined. In some embodiments, the preliminary target image mean of the preliminary target 2D image and the projected image mean of the 2D projected image may be determined by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In 1209, an image gray transformation ratio between the preliminary target 2D image and the 2D projected image may be determined based on the preliminary target image mean and the projected image mean. In some embodiments, the image gray transformation ratio may be determined by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In some embodiments, a ratio of the preliminary target image mean to the projected image mean or a ratio of the projected image mean to the preliminary target image mean may be determined as the image gray transformation ratio between the preliminary target 2D image and the 2D projected image.

In 1210, the preliminary target 2D image or the 2D projected image may be updated by performing a gray transformation based on the image gray transformation ratio. In some embodiments, the preliminary target 2D image or the 2D projected image may be updated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In some embodiments, when the image gray transformation ratio is the ratio of the preliminary target image mean to the projected image mean, that is, a denominator of the ratio corresponds to the projected image mean, the image gray transformation ratio may be applied to the 2D projected image; whereas, when the image gray transformation ratio is the ratio of the projected image mean to the preliminary target image mean, that is, the denominator of the ratio corresponds to the preliminary target image mean, the image gray transformation ratio may be applied to the preliminary target 2D image.

For example, the gray transformation may be performed on the 2D projected image according to formula (4) below:

$$\frac{Mean_I}{Mean_P} * I_{PRO}, \tag{4}$$

where $\text{Mean}_I$ refers to the preliminary target image mean, $\text{Mean}_P$ refers to the projected image mean, $$\frac{\text{Mean}_I}{\text{Mean}_P}$$

refers to the image gray transformation ratio, and $I_{PRO}$ refers to the 2D projected image.

As another example, the gray transformation may be performed on the preliminary target 2D image according to formula (5) below:

$$\frac{\text{Mean}_P}{\text{Mean}_I} * I_{INI}, \quad (5)$$

where $\text{Mean}_I$ refers to the preliminary target image mean, $\text{Mean}_P$ refers to the projected image mean, $$\frac{\text{Mean}_P}{\text{Mean}_I}$$

refers to the image gray transformation ratio, and $I_{INI}$ refers to the preliminary target 2D image.

In 1211, a target 2D image of the scanning object along the selected direction may be generated by weighting the preliminary target 2D image (or the updated preliminary target 2D image) and the 2D projected image (or the updated 2D projected image) based on a fifth predetermined weight of the preliminary target 2D image and a sixth predetermined weight of the 2D projected image. In some embodiments, the target 2D image may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15). The fifth predetermined weight and/or the sixth predetermined weight be default settings of the medical system 100 or may be adjustable under different situations (e.g., determined according to clinical needs). For example, if it is intended to obtain a target 2D image in which a lesion (e.g., a calcified tissue) has a relatively strong contrast, the fifth predetermined weight may be set as a relatively large value; if it is intended to obtain a target 2D image with a relatively soft display, the sixth predetermined weight may be set as a relatively large value.

For example, the preliminary target 2D image and the updated 2D projected image may be weighted according to formula (6) below:

$$\text{Volume} = W_5 * I_{INI} + W_6 \frac{\text{Mean}_I}{\text{Mean}_P} * I_{PRO}, \quad (6)$$

where Volume refers to the target 2D image, $I_{INI}$ refers to the preliminary target 2D image, $$\frac{\text{Mean}_I}{\text{Mean}_P} * I_{PRO}$$

refers to the updated 2D projected image, $W_5$ refers to the fifth predetermined weight of the initial 2D image, $W_6$ refers to the sixth predetermined weight of the updated 2D projected image, and a sum of $W_5$ and $W_6$ is 1.

According to process 1000, the target 3D gradient image corresponding to the target 3D tomographic image may be generated by performing the 3D convolution, which enhances intra-layer edge information in each of multiple 2D tomographic images and increases an interlayer correlation among the multiple 2D tomographic images, so that gradient information (e.g., gradient values) in the target 3D gradient image can reflect edge features of tissue structures such as a lesion in the target 3D tomographic image, thereby increasing an amount of information characterizing tissue structures crossing fault layers in the target 2D image. Further, a preliminary target 2D image of the scanning object may be generated by projecting the at least one initial 2D image using the maximum density projection algorithm or the average projection algorithm, which increases a generation speed of the preliminary target 2D image. Still further, a preliminary target image mean of the preliminary target 2D image and a projected image mean of a 2D projected image may be determined, an image gray transformation ratio between the preliminary target 2D image and the 2D projected image may be determined based on the preliminary target image mean and the projected image mean, and the preliminary target 2D image or the 2D projected image may be updated by performing a gray transformation based on the image gray transformation ratio, which improves image quality of the generated target 2D image.

It should be noted that the above description regarding the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Embodiment 5

Figure 13:
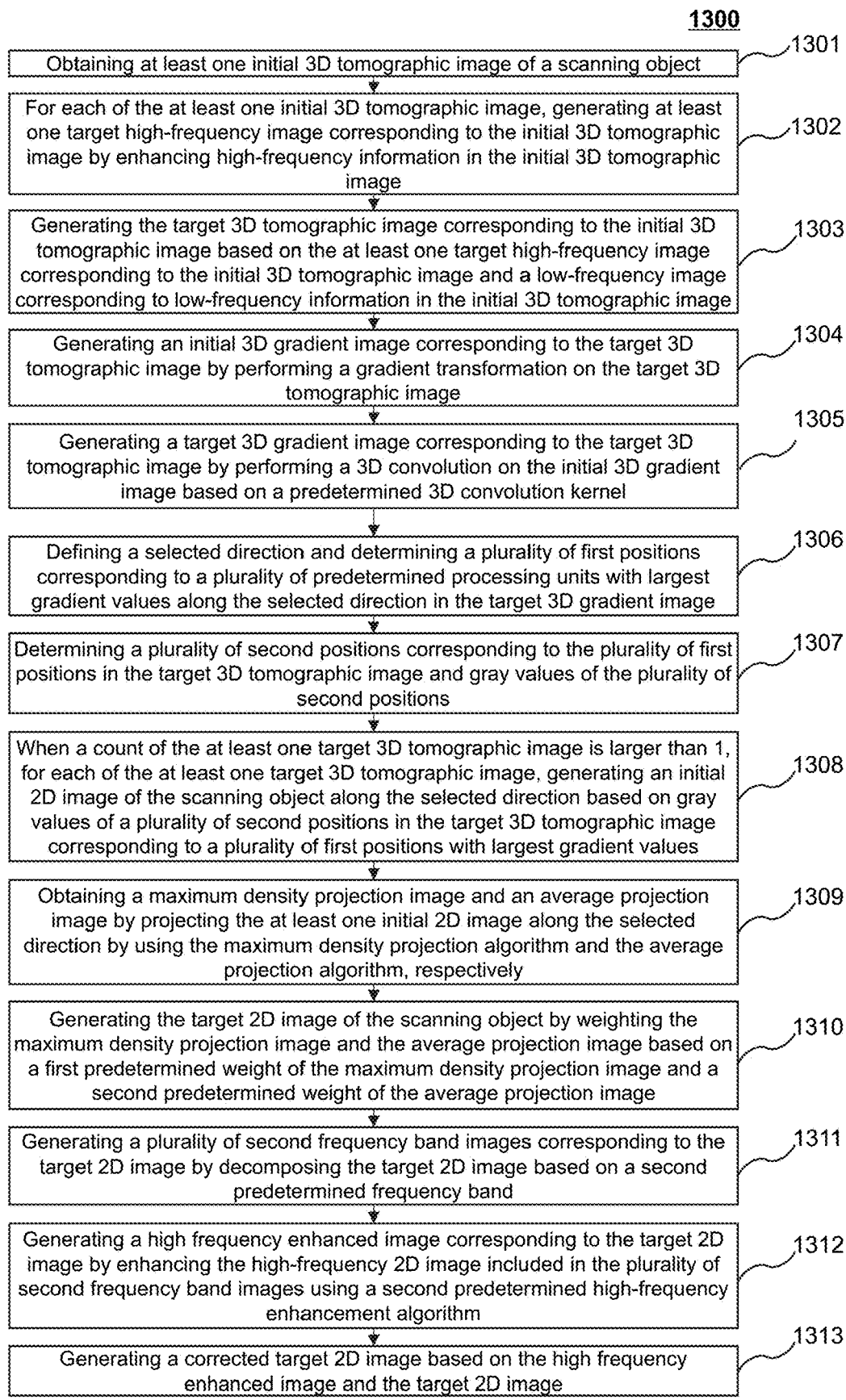
FIG. 13 is a flowchart illustrating an exemplary process for image processing according to some embodiments of the present disclosure.

FIG. 13 is a flowchart illustrating an exemplary process for image processing according to some embodiments of the present disclosure. In some embodiments, process 1300 may be executed by the medical system 100. For example, the process 1300 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing device 1500 (e.g., one or more modules illustrated in FIG. 15) may execute the set of instructions and may accordingly be directed to perform the process 1300. The operations of the illustrated process presented below are intended to be illustrative. In some embodiments, the process 1300 may be accomplished with one or more additional operations not described and/or without one or more of the operations discussed. Additionally, the order of the operations of process 1300 illustrated in FIG. 13 and described below is not intended to be limiting.

In 1301, at least one initial 3D tomographic image of a scanning object may be obtained. In some embodiments, the at least one initial 3D tomographic image may be obtained by the processing device 120 (e.g., the obtaining module 410 illustrated in FIG. 4) (e.g., the interface circuits of the processor 210) or the image processing device 1500 (e.g., the target 3D tomographic image obtaining module 1510 illustrated in FIG. 15).

The initial 3D tomographic image may refer to an image obtained by performing a 3D reconstruction on scanning data obtained by scanning the scanning object. The initial 3D tomographic image may be obtained by scanning the scanning object or obtained from an external storage medium. In some embodiments, the initial 3D tomographic image may be used to generate a target 3D tomographic image corresponding to the initial 3D tomographic image.

In 1302, for each of the at least one initial 3D tomographic image, at least one target high-frequency image corresponding to the initial 3D tomographic image may be generated by enhancing high-frequency information in the initial 3D tomographic image. In some embodiments, the at least one target high-frequency image corresponding to the initial 3D tomographic image may be generated by the processing device 120 (e.g., the processing module 430 illustrated in FIG. 4) (e.g., the processing circuits of the processor 210) or the image processing device 1500 (e.g., the target 3D tomographic image obtaining module 1510 illustrated in FIG. 15).

In order to highlight detail information in the target 3D tomographic image obtained based on the initial 3D tomographic image, thereby retaining more image information in a target 2D image generated based on the target 3D tomographic image, the at least one target high-frequency image with enhanced detail information may be generated by performing a high-frequency enhancement processing on the initial 3D tomographic image before a gradient transformation is performed on the target 3D tomographic image. Specifically, the high-frequency information may be extracted from the initial 3D tomographic image. Further, the at least one target high-frequency image may be generated by enhancing the extracted high-frequency information.

In some embodiments, a plurality of first frequency band images corresponding to the initial 3D tomographic image may be generated by decomposing the initial 3D tomographic image based on a first predetermined frequency band. The plurality of first frequency band images may include a low-frequency image and at least one initial high-frequency image. As used herein, the first predetermined frequency band may include a preset count of frequency bands and a frequency range corresponding to each frequency band. For example, the first predetermined frequency band may include 1 low-frequency band and 9 high-frequency bands. Further, the at least one target high-frequency image corresponding to the initial 3D tomographic image may be generated by enhancing the at least one initial high-frequency image using a first predetermined high-frequency enhancement algorithm. The first predetermined high-frequency enhancement algorithm may be a single algorithm with different enhancement coefficients or may include different algorithms.

In some embodiments, different details (e.g., small edge features of capillaries, thick edge features of a glandular tissue) in an initial 3D tomographic image correspond to different high-frequency bands and enhancement degrees corresponding to the different details may be different, therefore, in order to obtain a better high-frequency enhancement effect, a first predetermined frequency band including a plurality of high-frequency bands and a first predetermined high-frequency enhancement algorithm with different enhancement intensities may be set to perform the high-frequency enhancement processing on the initial 3D tomographic image. Specifically, a plurality of first frequency band images (which include 1 low-frequency image corresponding to 1 low-frequency band and 9 initial high-frequency images corresponding to 9 high-frequency bands) corresponding to the initial 3D tomographic image may be obtained by decomposing the initial 3D tomographic image based on the first predetermined frequency band. Further, 9 enhanced initial high-frequency images may be obtained by enhancing the 9 initial high-frequency images using a first predetermined high-frequency enhancement algorithm (e.g., a high-frequency enhancement algorithm with different enhancement coefficients corresponding to different high-frequency bands), which may be regarded as 9 target high-frequency images corresponding to the initial 3D tomographic image.

In 1303, the target 3D tomographic image corresponding to the initial 3D tomographic image may be generated based on the at least one target high-frequency image corresponding to the initial 3D tomographic image and a low-frequency image corresponding to low-frequency information in the initial 3D tomographic image. In some embodiments, the target 3D tomographic image corresponding to the initial 3D tomographic image may be generated by the processing device 120 (e.g., the processing module 430 illustrated in FIG. 4) (e.g., the processing circuits of the processor 210) or the image processing device 1500 (e.g., the target 3D tomographic image obtaining module 1510 illustrated in FIG. 15).

In some embodiments, the target 3D tomographic image corresponding to the initial 3D tomographic image may be generated by fusing the at least one target high-frequency image and the low-frequency image.

In 1304, an initial 3D gradient image corresponding to the target 3D tomographic image may be generated by performing a gradient transformation on the target 3D tomographic image. More descriptions regarding the generating of the initial 3D gradient image may be found elsewhere in the present disclosure (e.g., operation 1020 and the description thereof).

In 1305, a target 3D gradient image corresponding to the target 3D tomographic image may be generated by performing a 3D convolution on the initial 3D gradient image based on a predetermined 3D convolution kernel. More descriptions regarding the generating of the target 3D gradient image may be found elsewhere in the present disclosure (e.g., operation 1030 and the description thereof).

In 1306, a selected direction may be defined and a plurality of first positions corresponding to a plurality of predetermined processing units with largest gradient values along the selected direction in the target 3D gradient image may be determined. More descriptions regarding the determining of the plurality of first positions may be found elsewhere in the present disclosure (e.g., operation 730 and the description thereof).

In 1307, a plurality of second positions corresponding to the plurality of first positions may be determined in the target 3D tomographic image, gray values of the plurality of second positions may be determined. More descriptions regarding the determining of the plurality of second positions and the gray values of the plurality of second positions may be found elsewhere in the present disclosure (e.g., operation 740 and the description thereof).

In 1308, when a count of the at least one target 3D tomographic image is larger than 1, for each of the at least one target 3D tomographic image, an initial 2D image of the scanning object along the selected direction may be generated based on gray values of a plurality of second positions in the target 3D tomographic image corresponding to a plurality of first positions with largest gradient values. More descriptions regarding the generating of the initial 2D image may be found elsewhere in the present disclosure (e.g., operation 1060 and the description thereof).

In 1309, a maximum density projection image and an average projection image may be obtained by projecting the at least one initial 2D image along the selected direction by using the maximum density projection algorithm and the average projection algorithm, respectively. More descriptions regarding the obtaining of the maximum density projection image and the average projection image may be found elsewhere in the present disclosure (e.g., operation 1080 and the description thereof).

In 1310, the target 2D image of the scanning object may be generated by weighting the maximum density projection image and the average projection image based on a first predetermined weight of the maximum density projection image and a second predetermined weight of the average projection image. More descriptions regarding the generating of the target 2D image may be found elsewhere in the present disclosure (e.g., operation 1090 and the description thereof).

In 1311, a plurality of second frequency band images corresponding to the target 2D image may be generated by decomposing the target 2D image based on a second predetermined frequency band. In some embodiments, the plurality of second frequency band images may include a low-frequency 2D image and a high-frequency 2D image. In some embodiments, the plurality of second frequency band images may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In some embodiments, the second predetermined frequency band may include frequency bands (e.g., a low-frequency band and a high-frequency band) used to enhance the target 2D image. In some embodiments, the second predetermined frequency band may correspond to the first predetermined frequency band.

As described above, after the gradient transformation is performed on the target tomographic image and gray values of positions corresponding to largest gradient values are extracted, not all detail information in the target 3D tomographic image are retained. In order to highlight the detail information in the generated target 2D image, an enhancement needs to be performed on the target 2D image. Specifically, the low-frequency 2D image corresponding to the low-frequency band in the second predetermined frequency band and the high-frequency 2D image corresponding to the high-frequency band in the second predetermined frequency band may be obtained by decomposing the target 2D image based on the second predetermined frequency band to obtain.

In 1312, a high frequency enhanced image corresponding to the target 2D image may be generated by enhancing the high-frequency 2D image included in the plurality of second frequency band images using a second predetermined high-frequency enhancement algorithm. In some embodiments, the high frequency enhanced image may be generated by the processing device 120 (e.g., the processing module 430 illustrated in FIG. 4) (e.g., the processing circuits of the processor 210) or the image processing device 1500 (e.g., the target 2D image generation module 1540 illustrated in FIG. 15).

In some embodiments, the second preset frequency enhancement algorithm may be the same as or different from the first predetermined high-frequency enhancement algorithm.

In 1313, a corrected target 2D image may be generated based on the high frequency enhanced image and the target 2D image.

In some embodiments, the corrected target 2D image may be generated based on the high frequency enhanced image and the target 2D image according to formula (7) below:

$$\text{Volume}' = \text{Volume} + \tau * \text{Volume}_H \quad (7)$$

where Volume' refers to the corrected target 2D image, Volume refers to the target 2D image, $\text{Volume}_H$ refers to the high frequency enhanced image, and $\tau$ refers to a predetermined constant coefficient and a value range of $\tau$ is 0-1. A value of $\tau$ may be determined according to clinical needs. For example, the larger the value of $\tau$ is, the sharper the detail information in the corrected target 2D image may be.

According to process 1300, the target 3D tomographic image may be generated based on the target high-frequency image generated by enhancing high-frequency information in the initial 3D tomographic image and a low-frequency image corresponding to low-frequency information in the initial 3D tomographic image, which enhances different details in the initial 3D tomographic image and highlights detail information in the target 3D tomographic image, thereby improving image quality of the target 2D image. Further, a plurality of second frequency band images corresponding to the target 2D image may be generated by decomposing the target 2D image based on a second predetermined frequency band, a high frequency enhanced image corresponding to the target 2D image may be generated by enhancing the high-frequency 2D image included in the plurality of second frequency band images using a second predetermined high-frequency enhancement algorithm, and a corrected target 2D image may be generated based on the high frequency enhanced image and the target 2D image, which further enhances detail information in the target 2D image, thereby further improving the image quality of the target 2D image.

It should be noted that the above description regarding the process 1300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Embodiment 6

Figure 14:
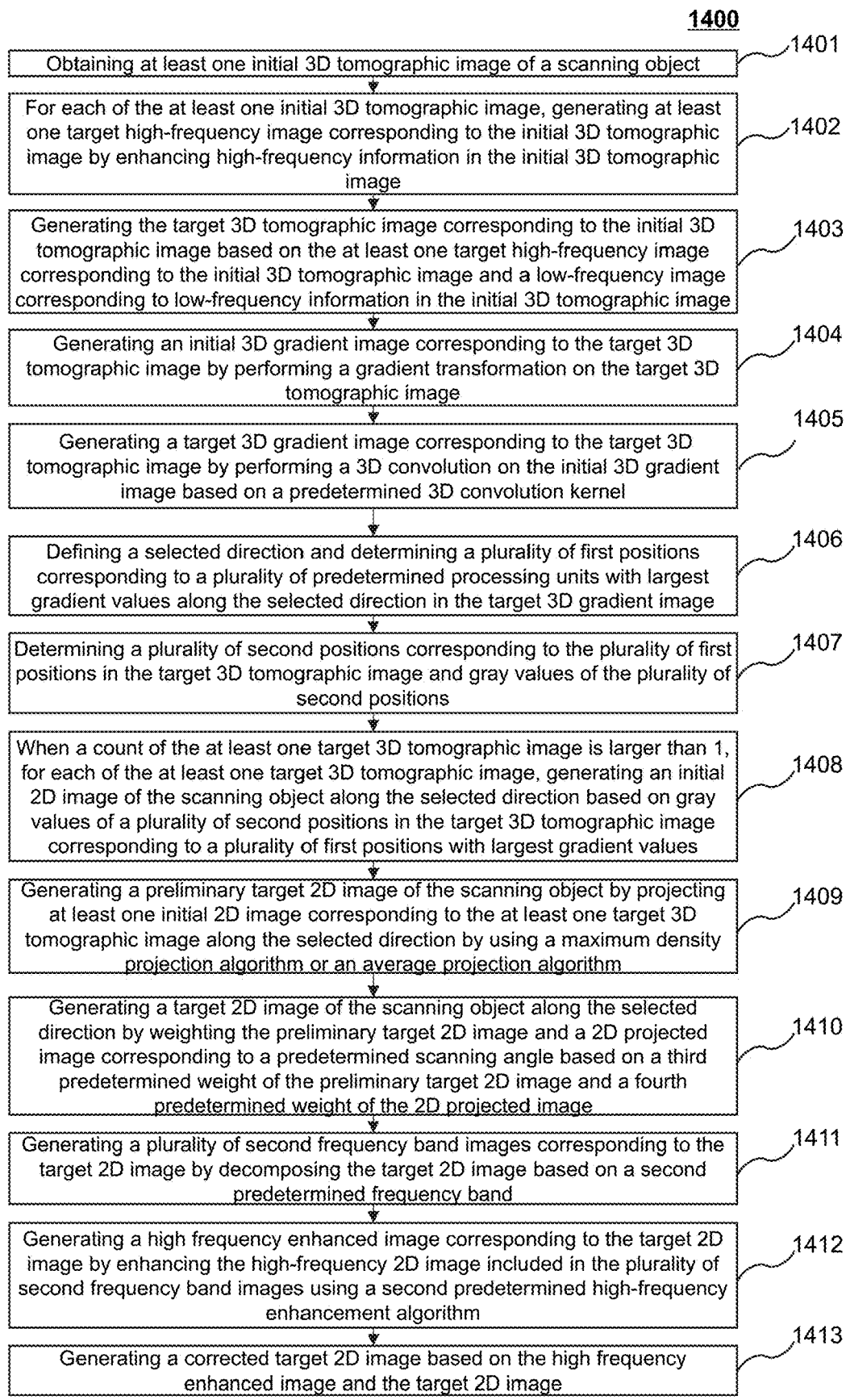
FIG. 14 is a flowchart illustrating an exemplary process for image processing according to some embodiments of the present disclosure.

FIG. 14 is a flowchart illustrating an exemplary process for image processing according to some embodiments of the present disclosure. In some embodiments, process 1400 may be executed by the medical system 100. For example, the process 1400 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and an image processing device 1500 (e.g., one or more modules illustrated in FIG. 15) may execute the set of instructions and may accordingly be directed to perform the process 1400. The operations of the illustrated process presented below are intended to be illustrative. In some embodiments, the process 1400 may be accomplished with one or more additional operations not described and/or without one or more of the operations discussed. Additionally, the order of the operations of process 1400 illustrated in FIG. 13 and described below is not intended to be limiting.

In 1401, at least one initial 3D tomographic image of a scanning object may be obtained. More descriptions regarding the obtaining of the at least one initial 3D tomographic image may be found elsewhere in the present disclosure (e.g., operation 1301 and the description thereof).

In 1402, for each of the at least one initial 3D tomographic image, at least one target high-frequency image corresponding to the initial 3D tomographic image may be generated by enhancing high-frequency information in the initial 3D tomographic image. More descriptions regarding the generating of the at least one target high-frequency image may be found elsewhere in the present disclosure (e.g., operation 1302 and the description thereof).

In 1403, the target 3D tomographic image corresponding to the initial 3D tomographic image may be generated based on the at least one target high-frequency image corresponding to the initial 3D tomographic image and a low-frequency image corresponding to low-frequency information in the initial 3D tomographic image. More descriptions regarding the generating of the target 3D tomographic image may be found elsewhere in the present disclosure (e.g., operation 1303 and the description thereof).

In 1404, an initial 3D gradient image corresponding to the target 3D tomographic image may be generated by performing a gradient transformation on the target 3D tomographic image. More descriptions regarding the generating of the initial 3D gradient image may be found elsewhere in the present disclosure (e.g., operation 1020 and the description thereof).

In 1405, a target 3D gradient image corresponding to the target 3D tomographic image may be generated by performing a 3D convolution on the initial 3D gradient image based on a predetermined 3D convolution kernel. More descriptions regarding the generating of the target 3D gradient image may be found elsewhere in the present disclosure (e.g., operation 1030 and the description thereof).

In 1406, a selected direction may be defined and a plurality of first positions corresponding to a plurality of predetermined processing units with largest gradient values along the selected direction in the target 3D gradient image may be determined. More descriptions regarding the determining of the plurality of first positions may be found elsewhere in the present disclosure (e.g., operation 730 and the description thereof).

In 1407, a plurality of second positions corresponding to the plurality of first positions may be determined in the target 3D tomographic image, gray values of the plurality of second positions may be determined. More descriptions regarding the determining of the plurality of second positions and the gray values of the plurality of second positions may be found elsewhere in the present disclosure (e.g., operation 740 and the description thereof).

In 1408, when a count of the at least one target 3D tomographic image is larger than 1, for each of the at least one target 3D tomographic image, an initial 2D image of the scanning object along the selected direction may be generated based on gray values of a plurality of second positions in the target 3D tomographic image corresponding to a plurality of first positions with largest gradient values. More descriptions regarding the generating of the transition 2D image may be found elsewhere in the present disclosure (e.g., operation 1060 and the description thereof).

In 1409, a preliminary target 2D image of the scanning object may be generated by projecting at least one initial 2D image corresponding to the at least one target 3D tomographic image along the selected direction by using a maximum density projection algorithm or an average projection algorithm. More descriptions regarding the generating of the preliminary target 2D image may be found elsewhere in the present disclosure (e.g., operation 1207 and the description thereof).

In 1410, a target 2D image of the scanning object along the selected direction may be generated by weighting the preliminary target 2D image and a 2D projected image corresponding to a predetermined scanning angle based on a third predetermined weight of the preliminary target 2D image and a fourth predetermined weight of the 2D projected image. More descriptions regarding the generating of the target 2D image may be found elsewhere in the present disclosure (e.g., operation 950 and the description thereof).

In 1411, a plurality of second frequency band images corresponding to the target 2D image may be generated by decomposing the target 2D image based on a second predetermined frequency band. More descriptions regarding the generating of the plurality of second frequency band images may be found elsewhere in the present disclosure (e.g., operation 1311 and the description thereof).

In 1412, a high frequency enhanced image corresponding to the target 2D image may be generated by enhancing the high-frequency 2D image included in the plurality of second frequency band images using a second predetermined high-frequency enhancement algorithm. More descriptions regarding the generating of the high frequency enhanced image may be found elsewhere in the present disclosure (e.g., operation 1312 and the description thereof).

In 1413, a corrected target 2D image may be generated based on the high frequency enhanced image and the target 2D image. More descriptions regarding the generating of the corrected target 2D image may be found elsewhere in the present disclosure (e.g., operation 1313 and the description thereof).

According to process 1400, the target 3D tomographic image may be generated based on the target high-frequency image generated by enhancing high-frequency information in the initial 3D tomographic image and a low-frequency image corresponding to low-frequency information in the initial 3D tomographic image, which enhances different details in the initial 3D tomographic image and highlights detail information in the target 3D tomographic image, thereby improving image quality of the target 2D image. Further, a plurality of second frequency band images corresponding to the target 2D image may be generated by decomposing the target 2D image based on a second predetermined frequency band, a high frequency enhanced image corresponding to the target 2D image may be generated by enhancing the high-frequency 2D image included in the plurality of second frequency band images using a second predetermined high-frequency enhancement algorithm, and a corrected target 2D image may be generated based on the high frequency enhanced image and the target 2D image, which further enhances detailed information in the target 2D image, thereby further improving the image quality of the target 2D image.

It should be noted that the above description regarding the process 1400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Embodiment 7

Figure 15:
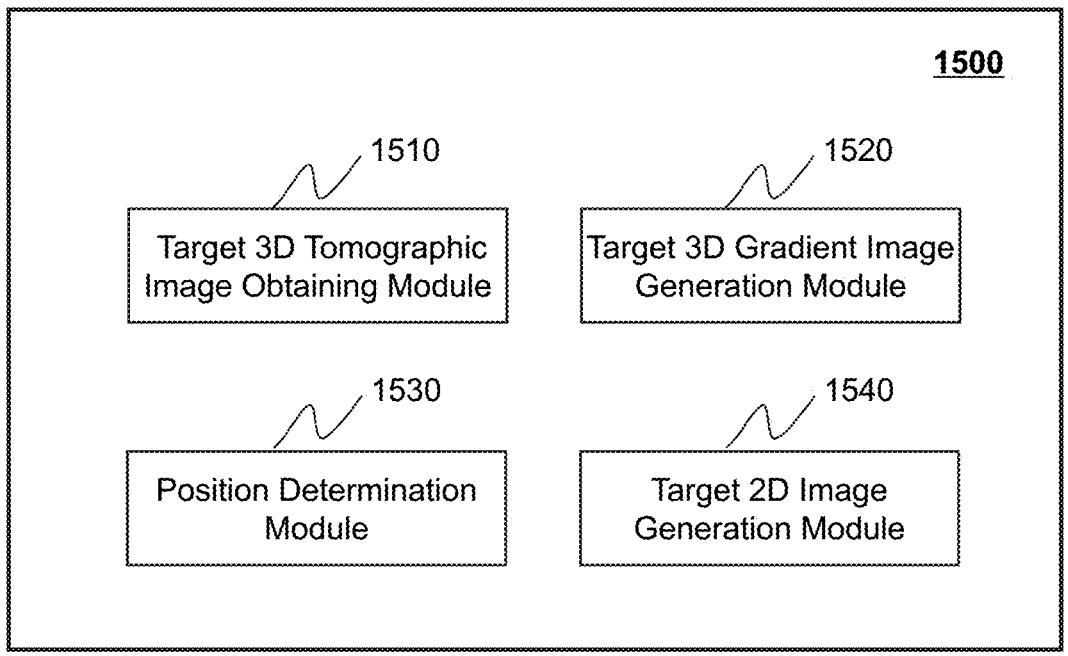
FIG. 15 is a block diagram illustrating an exemplary image processing device according to some embodiments of the present disclosure.

FIG. 15 is a block diagram illustrating an exemplary image processing device according to some embodiments of the present disclosure. The image processing device 1500 may be implemented on the computing device 200 (e.g., the processor 210) illustrated in FIG. 2 or the mobile device 300 illustrated in FIG. 3. The image processing device 1500 may include a target 3D tomographic image obtaining module 1510, a target 3D gradient image generation module 1520, a position determination module 1530, and a target 2D image generation module 1540.

The target 3D tomographic image obtaining module 1510 may be configured to obtain at least one target 3D tomographic image of a scanning object. In some embodiments, the target 3D tomographic image obtaining module 1510 may be configured to obtain at least one initial 3D tomographic image of a scanning object. For each of the at least one initial 3D tomographic image, the target 3D tomographic image obtaining module 1510 may be configured to generate at least one target high-frequency image corresponding to the initial 3D tomographic image by enhancing high-frequency information in the initial 3D tomographic image. Further, the target 3D tomographic image obtaining module 1510 may be configured to generate the target 3D tomographic image corresponding to the initial 3D tomographic image based on the at least one target high-frequency image corresponding to the initial 3D tomographic image and a low-frequency image corresponding to low-frequency information in the initial 3D tomographic image. More descriptions regarding the obtaining of the at least one target 3D tomographic image may be found elsewhere in the present disclosure (e.g., operation 710, operation 1301, operation 1302, operation 1303, and the descriptions thereof).

The target 3D gradient image generation module 1520 may be configured to, for each of the at least one target 3D tomographic image, generate a target 3D gradient image corresponding to the target 3D tomographic image by performing a gradient transformation on the target 3D tomographic image. In some embodiments, the target 3D gradient image generation module 1520 may be configured to, for each of the at least one target 3D tomographic image, generate an initial 3D gradient image corresponding to the target 3D tomographic image by performing a gradient transformation on the target 3D tomographic image. Further, the target 3D gradient image generation module 1520 may be configured to generate a target 3D gradient image corresponding to the target 3D tomographic image by performing a 3D convolution on the initial 3D gradient image based on a predetermined 3D convolution kernel. More descriptions regarding the generating of the target 3D gradient image may be found elsewhere in the present disclosure (e.g., operation 720, operation 1020, operation 1030, and the descriptions thereof).

The position determination module 1530 may be configured to define a selected direction and determine a plurality of first positions corresponding to a plurality of predetermined processing units with largest gradient values along the selected direction in the target 3D gradient image. More descriptions regarding the determining of the plurality of first positions may be found elsewhere in the present disclosure (e.g., operation 730 and the description thereof).

The target 2D image generation module 1540 may be configured to determine a plurality of second positions corresponding to the plurality of first positions in the target 3D tomographic image and gray values of the plurality of second positions, and generate an initial 2D image of the scanning object along the selected direction based on the gray values of the plurality of second positions. Further, the target 2D image generation module 1540 may be configured to generate a target 2D image of the scanning object based on at least one initial 2D image corresponding to the at least one target 3D tomographic image. In some embodiments, the target 2D image generation module 1540 may include an initial 2D image generation sub-module and a preliminary target 2D image generation sub-module. The initial 2D image generation sub-module may be configured to, when a count of the at least one target 3D tomographic image is larger than 1, for each of the at least one target 3D tomographic image, generate an initial 2D image of the scanning object along the selected direction based on gray values of a plurality of second positions in the target 3D tomographic image corresponding to a plurality of first positions with largest gradient values. The preliminary target 2D image generation sub-module may be configured to generate a preliminary target 2D image of the scanning object by projecting at least one initial 2D image corresponding to the at least one target 3D tomographic image along the selected direction. For example, the preliminary target 2D image generation sub-module may be configured to generate the preliminary target 2D image of the scanning object by projecting at least one initial 2D image corresponding to the at least one target 3D tomographic image along the selected direction by using a maximum density projection algorithm or an average projection algorithm. More descriptions regarding the generating of the initial 2D image, the target 2D image, and the preliminary target 2D image may be found elsewhere in the present disclosure (e.g., operation 740, operation 1206, operation 1207, and the descriptions thereof).

The target 2D image generation module 1540 may be configured to generate a target 2D image of the scanning object along the selected direction by weighting the preliminary target 2D image and a 2D projected image corresponding to a predetermined scanning angle based on a third predetermined weight of the preliminary target 2D image and a fourth predetermined weight of the 2D projected image. More descriptions regarding the generating of the target 2D image may be found elsewhere in the present disclosure (e.g., operation 950 and the description thereof).

The image processing device 1500 may include a gray transformation module. The gray transformation module may be configured to determine a preliminary target image mean of the preliminary target 2D image and a projected image mean of a 2D projected image. The gray transformation module may be configured to determine an image gray transformation ratio between the preliminary target 2D image and the 2D projected image based on the preliminary target image mean and the projected image mean. Further, the gray transformation module may be configured to update the preliminary target 2D image or the 2D projected image by performing a gray transformation based on the image gray transformation ratio. More descriptions regarding the updating of the initial 2D image or the 2D projected image may be found elsewhere in the present disclosure (e.g., operations 1208-1210 and the descriptions thereof).

The image processing device 1500 may include a target 2D image correction module. The target 2D image correction module may be configured to generate a plurality of second frequency band images corresponding to the target 2D image by decomposing the target 2D image based on a second predetermined frequency band. The target 2D image correction module may be configured to generate a high frequency enhanced image corresponding to the target 2D image by enhancing the high-frequency 2D image included in the plurality of second frequency band images using a second predetermined high-frequency enhancement algorithm. Further, the target 2D image correction module may be configured to generate a corrected target 2D image based on the high frequency enhanced image and the target 2D image. More descriptions regarding the generating of the corrected target 2D image may be found elsewhere in the present disclosure (e.g., operations 1311-1313 and the descriptions thereof).

The modules in the image processing device 1500 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined into a single module, and any one of the modules may be divided into two or more units. In some embodiments, the processing device 120 may include one or more additional modules.

Embodiment 8

Figure 16:
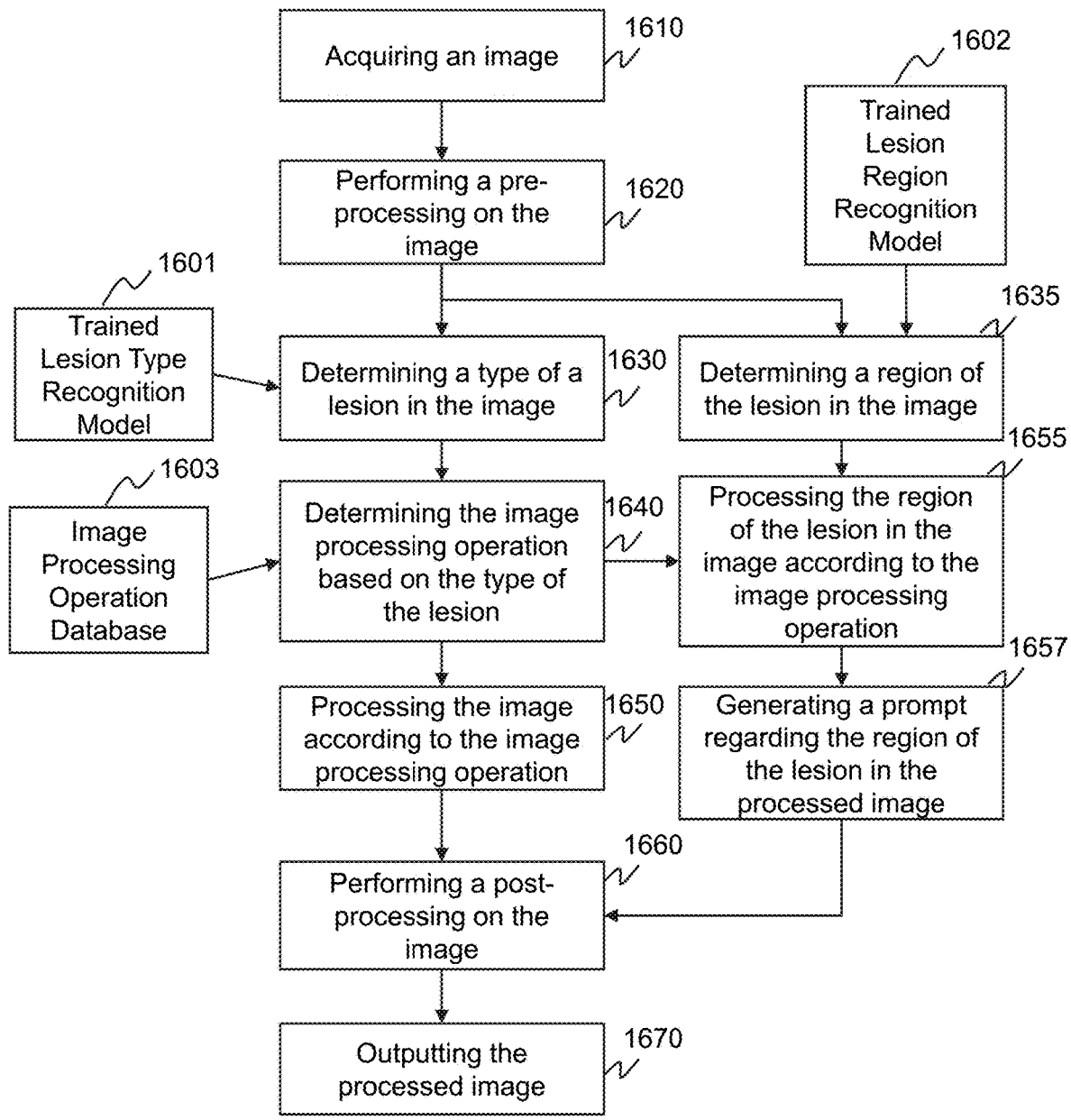
FIG. 16 is a flowchart illustrating an exemplary process for image processing according to some embodiments of the present disclosure.

FIG. 16 is a flowchart illustrating an exemplary process for image processing according to some embodiments of the present disclosure. In some embodiments, process 1600 may be executed by the medical system 100. For example, the process 1600 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing system 1700 (e.g., one or more modules illustrated in FIG. 17) may execute the set of instructions and may accordingly be directed to perform the process 1600. The operations of the illustrated process presented below are intended to be illustrative. In some embodiments, the process 1600 may be accomplished with one or more additional operations not described and/or without one or more of the operations discussed. Additionally, the order of the operations of process 1600 illustrated in FIG. 13 and described below is not intended to be limiting.

In 1610: an image (also referred to as an "initial image") may be acquired. In some embodiments, one or more images may be acquired by the processing device 120 (e.g., the obtaining module 410 illustrated in FIG. 4) (e.g., the interface circuits of the processor 210) or the image processing system 1700 (e.g., a lesion type determination module 1710 illustrated in FIG. 17).

In some embodiments, the image processing system 1700 may include a medical imaging device (e.g., the scanning device 110). The medical imaging device may acquire the image (e.g., a medical image) by scanning a target object. The medical imaging device may include but is not limited to an X-ray imaging device, a CT imaging device, a PET imaging device, an MRI imaging device, an ultrasound imaging device, or the like, or any combination thereof. The ultrasound imaging device may include a B-scan ultrasonography device, a color Doppler ultrasound device, a cardiac color ultrasound device, a 3D color ultrasound device, or the like. The target object may include the head, the chest, an arm, a palm, a thigh, and/or a calf. The acquired image may include but are not limited to an X-ray image, a CT image, a PET image, an MRI image, an ultrasound image, or the like.

In some embodiments, the image processing system 1700 may acquire an image that exists. For example, the image processing system 1700 may include a storage device, and the system may acquire (e.g., read) the image from the storage device. As another example, the image processing system 1700 may acquire the image from an external storage device (or a cloud). As yet another example, the image processing system 1700 may acquire the image through an interface. The interface may include a program interface, a data interface, a transmission interface, or the like. As another example, the image processing system 1700 may be invoked by other external devices or systems, and the image may be transferred to the image processing system 1700 when the image processing system 1700 is invoked.

In some embodiments, the image may include a 2D image or a 3D image. A format of the image may be a digital format, including but not limited to a Joint Photographic Experts Group (JPEG) image format, a (Tag Image File Format) TIFF image format, a (Graphics Interchange Format) GIF image format, an (Kodak Flash Pix) FPX image format, a (Digital Imaging and Communications in Medicine) DICOM image format, etc. The image may also be in other formats.

In 1620: a pre-processing may be performed on the image. In some embodiments, the pre-processing may be performed by the processing device 120 (e.g., the processing module 430 illustrated in FIG. 4) (e.g., the processing circuits of the processor 210) or the image processing system 1700 (e.g., an image processing module 1730 illustrated in FIG. 17).

In some embodiments, the pre-processing may include, but is not limited to, an enhancement processing, an interpolation processing, a morphological processing, a noise removal, or the like, or any combination thereof. For example, the pre-processing may be the enhancement processing, and the enhancement processing may highlight some structures or regions in the initial image. The enhancement processing may include a histogram equalization algorithm, a wavelet transform image enhancement algorithm, a partial differential equation image enhancement algorithm, a Heisen matrix enhancement algorithm, or the like, or any combination thereof. As another example, the pre-processing may be the interpolation processing, and the interpolation processing may cause voxels in the initial image to be uniform in size. As yet another example, the pre-processing may be the morphological processing, and the morphological processing may use elements with a morphological structure to process shapes in the initial image to achieve the purpose of analyzing and recognizing the target. The morphological processing method may include, but is not limited to, an expansion, a corrosion, an opening operation, a closed operation, or the like, or any combination thereof. As another example, the pre-processing may be the noise removal, and the noise removal may remove interference caused by machine noise, target motion, etc. in the initial image. The noise removal may include but is not limited to a median filtering, a mean filtering, or the like, or any combination thereof. In some embodiments, the pre-processing may also include any other reasonable processing operations, which is not limited in the present disclosure.

In 1630: a type of a lesion in the image may be determined. In some embodiments, the type of the lesion may be determined by the processing device 120 (e.g., the determination module 420 illustrated in FIG. 4) (e.g., the processing circuits of the processor 210) or the imaging processing system 1700 (e.g., the lesion type determination module 1710 illustrated in FIG. 17).

The lesion refers to a site (e.g., an organ) of the target object where a disease occurs. For example, the lesion may include the head, the chest, an arm, a palm, a thigh, a calf, a liver, a kidney, etc. In some embodiments, the type of the lesion may be used to indicate a location of a disease and/or a classification of the disease. For example, the type of the lesion may include breast cancer, breast calcification, esophageal cancer, lymphoma, uterine fibroid, brain tumor, stomach bleeding, leg fracture, pneumothorax, or the like, or any combination thereof. In some alternative embodiments, the type of the lesion may be used to merely represent the classification of the disease. For example, the type of the lesion may include a fracture, cancer, a tumor, inflammation, bleeding, etc. In some embodiments, the type of the lesion may be further subdivided according to the specific conditions of the disease. For example, the tumor may be classified as a benign tumor, a malignant tumor, or the like. In some embodiments, the type of the lesion may be further subdivided according to different stages of the disease. For example, the tumor may be further subdivided into an early tumor and an advanced tumor.

In some embodiments, when there is no lesion in the image, the lesion type determination module 1710 may determine that there is no lesion in the image. For example, the lesion type determination module 1710 may utilize a trained lesion type recognition model 1601 to determine whether there is a lesion in the image. For an image without lesion, there is no need to perform a subsequent processing operation. The following description mainly discusses a case where the image includes at least one lesion or a portion of the at least one lesion.

In some embodiments, the lesion type determination module 1710 may utilize the trained lesion type recognition model 1601 to determine the type of the lesion in the image. The trained lesion type recognition model 1601 may include a machine learning model. For example, the trained lesion type recognition model 1601 may include but is not limited to a convolutional neural network (CNN), a recurrent neural network (RNN), an RCNN (regions with CNN), a Fast-RCNN, a back propagation (BP) neural network, a K nearest neighbor algorithm (KNN), a support vector machine (SVM), or the like, or any combination thereof. In some embodiments, the lesion type determination module 1710 may use the trained lesion type recognition model 1601 to determine types of two or more lesions in an image. In this case, the lesion type recognition model 1601 may determine not only the types of the two or more lesions in the image, but also a region corresponding to each of the two or more lesions. More details about the trained lesion type recognition model 1601 may be found in FIG. 18 and the relevant description. In some embodiments, for an image or a specific region, the lesion type determination module 1710 may only determine a specific lesion type that the lesion corresponds to. In some alternative embodiments, for the image or the specific region, the lesion type determination module 1710 may determine multiple types of the lesion and a probability of each type of the lesion. For example, for an image including a tumor, the lesion type determination module 1710 may determine that the type of the lesion of the image is: a benign tumor 75%; a malignant tumor 25%.

In some alternative embodiments, the lesion type determination module 1710 may also determine the type of the lesion in the image based on determination information regarding the type of the lesion of the image that is provided by a user (such as a medical staff). In some embodiments, the user may input determination information regarding the type of the lesion through an operation terminal/a human-machine interaction interface. Specifically, the user may input determination information through a voice input, a text input, a mouse selection input, a touch screen input, or the like.

In some embodiments, the lesion type determination module 1710 may first determine an initial type of the lesion in the image using the trained lesion type recognition model 1601, and send information of the initial type of the lesion to the user for confirmation (such as by displaying or broadcasting the information to the user). The user may confirm or re-enter/select the initial type of the lesion to determine a final type of the lesion. The combination of model recognition and manual determination may improve the efficiency and accuracy of the determination on the type of the lesion. In some embodiments, determining the type of the lesion in the image based on determination information regarding the image that is provided by a user may also prevent a failure to recognize the type of the lesion through the lesion type recognition model or due to system malfunction.

In some embodiments, when the image processing system 1700 has processed the image (for example, operations 1610-1670 have been performed), but the user is not satisfied with the quality of the processed image (for example, the processing may be dissatisfactory due to a wrong judgment on the type of the lesion). The user may provide a feedback to the system and cause the system to perform a secondary processing on the image (or reprocessing the initial image). When performing the secondary processing on the image (or reprocessing the initial image), the lesion type determination module 1710 may determine the type of the lesion in the image based on the determination information regarding the type of the lesion of the image that is provided by the user.

In 1635: a region of the lesion in the image may be determined. In some embodiments, the region of the lesion may be determined by the processing device 120 (e.g., the determination module 420 illustrated in FIG. 4) (e.g., the processing circuits of the processor 210) or the image processing system 1700 (e.g., a lesion region determination module 1740 illustrated in FIG. 17). In some embodiments, the region of the lesion may be configured to reflect a region where the lesion is located in the image. The region of the lesion may be a regular or an irregular region.

In some embodiments, the lesion region determination module 1740 may use a trained lesion region recognition model 1602 to determine the region of the lesion in the image. In some embodiments, the trained lesion region recognition model 1602 may include a machine learning model. For example, the trained lesion region recognition model 1602 may include but not limited to the CNN, the RNN, the RCNN, the Fast-RCNN, the BP neural network, the KNN, the SVM, or the like, or any combination thereof. In some embodiments, the lesion region determination module 1740 may utilize the trained lesion region recognition model 1602 to determine regions of the two or more lesions in one image. In this case, the trained lesion region recognition model 1602 may determine not only the regions of the two or more lesions in the image, but also a type of each of the two or more lesions. More details about the trained lesion region recognition model 1602 may be found in FIG. 18 and relevant descriptions.

In some embodiments, the lesion region determination module 1740 may also determine the region of the lesion in the image in other ways (e.g., based on rules). For example, the lesion region determination module 1740 may determine the region of the lesion in the image based on one or more image features such as a color, a gray value, a shape, and/or a texture. In some embodiments, only one region of the lesion may be included in the image. In some alternative embodiments, two or more regions of the lesion may also be included in the image. When the image contains two or more regions of the lesion, the lesion region determination module 1740 may determine each region of the lesion in the image separately.

In some alternative embodiments, the lesion region determination module 1740 may also determine the region of the lesion in the image based on the determination information regarding the region of the lesion of the image that is provided by a user (such as a medical staff). In some embodiments, the user may label the region of the lesion in the image through the operation terminal/the human-machine interaction interface to indicate his determination on the region of the lesion. Specifically, the lesion region determination module 1740 may obtain labeled information regarding the region of the lesion that is provided by a user in various ways. For example, the lesion region determination module 1740 may select a labeled region based on a mouse operation of the user, select a labeled region based on a keyboard operation cursor of the user, select a labeled region based on a stylus or sensor pen of the user, select a labeled region based on a touch operation of the user, select a labeled region based on the a gesture operation of the user, select a labeled region based on a voice operation of the user, select a labeled region based on the a gaze operation of the user, select a labeled region based on reading brain wave of the user, or obtain a labeled region based on scanning a labeled image on other media that is provided by the user (such as a medical staff). The ways of obtaining the labeled information regarding the region of the lesion that is provided by the user may include but not limited to one or more operations described above. Alternatively or additionally, one or more of the operations may be used in combination.

In some embodiments, the lesion region determination module 1740 may first utilize the trained lesion region recognition model 1602 to determine an initial region of the lesion in the image, and send the initial region of the lesion to the user for confirmation (such as by display the initial region of the lesion to the user, prompting the user, etc.). The user may confirm or re-label/modify the initial region of the lesion to determine a final region of the lesion. The combination of the model recognition and the manual determination may improve the efficiency and accuracy of the determination of t(he region of the lesion. In some embodiments, determining the region of the lesion in the image based on determination information regarding the image that is provided by a user may also prevent the system from malfunctioning or failing to recognize the region of the lesion through the trained lesion region recognition model 1602.

In some embodiments, when the image processing system 1700 has processed the image for a first time (for example, the operations 1610-1670 have been performed), but the user is not satisfied with the processed image quality (for example, the processing may not be good due to the wrong determination on the type of the lesion), the user may feedback to the system and cause the system to perform a secondary processing on the region of the lesion of the image (or reprocessing the image). When performing the secondary processing on the region of the lesion of an image (or reprocessing the image), the lesion region determination module 1740 may determine the region of the lesion in the image based on the determination information regarding the region of the lesion in the image that is provided by a user.

In 1640: one or more image processing operations may be determined based on the type of the lesion. In some embodiments, the image processing operation(s) may be determined by the processing device 120 (e.g., the processing module 430 illustrated in FIG. 4) (e.g., the processing circuits of the processor 210) or the image processing system 1700 (e.g., the image processing operation determination module 1720 illustrated in FIG. 17). Since users (e.g., the medical staff) may have different concerns about images including different types of the lesion, different image processing operations may be set for images including different types of the lesion, making the processed images more suitable for diagnosis.

In some embodiments, the image processing operations may include a noise reduction, an enhancement, an organization balance, a thickness balance, or a look-up table (LUT) transformation, or the like, or any combination thereof. In some embodiments, processing algorithms (i.e., the noise reduction, the enhancement, the organization balance, the thickness balance, the LUT transformation) in the image processing operations may be executed randomly. In some embodiments, the image processing operations may include an execution order for the processing algorithms, and each of the processing algorithms may be used to process the image based on the execution order.

In some embodiments, the image processing system 1700 may construct an image processing operation database 1603. For example, the image processing system 1700 may determine corresponding image processing operations for different types of the lesion and store the image processing operations in the database. An image processing operation corresponding to each type of the lesion may be a preferred image processing operation for the type of the lesion that is determined through experiments. On this basis, the image processing operation determination module 1720 may invoke the corresponding image processing operation from the image processing operation database 1603 based on the type of the lesion.

In some embodiments, for an image or a specific region, when the lesion type determination module 1710 determines a variety of types of the lesion and the probability of each type of the lesion, the image processing operation determination module 1720 may utilize a trained machine learning model to determine the image processing operations based on the type of the lesion information. The trained machine learning model may include, but is not limited to a CNN, an RNN, an SVM, or the like, or any combination thereof. In some embodiments, the machine learning models may be obtained by a training operation using sample data. In some embodiments, the sample data may include multiple images, types of the lesion corresponding to each image, probabilities of each type of the lesion, and an image processing operation corresponding to each of the multiple images. For example, when labeling the type of the lesion of an image, a user (such as a medical staff) may label multiple types of the lesion and the corresponding probability of each type of the lesion. For example, for an image including a tumor, the user may label the type of the lesion of the image as: a benign tumor 75%; a malignant tumor 25%. As another example, if a processed image (such as an image labeled as including multiple types of the lesion) obtained by processing an initial image according to the image processing operation has been approved by the user, the image processing system 1700 may use the initial image and the image processing operation(s) as the sample data.

In 1650, the image may be processed according to the image processing operation. In some embodiments, the image may be processed by the processing device 120 (e.g., the processing module 430 illustrated in FIG. 4) (e.g., the processing circuits of the processor 210) or the image processing system 1700 (e.g., the image processing module 1730 illustrated in FIG. 17). In this operation, the image processing module 1730 may process the entire image according to the image processing operation(s). In some embodiments, the processing algorithms related to the image processing operation(s) may be executed randomly. In some embodiments, the image processing operation(s) may include an execution order of the processing algorithms, and each processing algorithm may be used to process the image based on the execution order.

In 1655: the region of the lesion in the image may be processed according to the image processing operation. In some embodiments, the region of the lesion may be processed by the processing device 120 (e.g., the processing module 430 illustrated in FIG. 4) (e.g., the processing circuits of the processor 210) or the image processing system 1700 (e.g., the image processing module 1730 illustrated in FIG. 17).

In some embodiments, the image processing module 1730 may only process a region within the range of the region of the lesion. In some alternative embodiments, the image processing module 1730 may process an extended region obtained by extending the region of the lesion. For example, the extended region of the region of the lesion may be a region formed after the boundary of the region of the lesion extends outward by a certain distance (such as 0.5 cm, 1 cm, 2 cm, etc.,). By processing the extended region of the lesion, a processing range may be increased to facilitate user diagnosis (in particular, when the lesion is near the edge of the region).

In some embodiments, when an image contains two or more regions of the lesion, the image processing module 1730 may adopt corresponding image processing operation(s) for each region of the lesion in the image for processing. Specifically, when the types of the lesion of the two or more regions of the lesion in the image are the same, the image processing module 1730 may utilize the same image processing operation(s) to process the two or more regions of the lesion. When the type of the lesion of the two or more regions of the lesion in the image are different, the image processing module 1730 may utilize corresponding image processing operation(s) to process each region of the lesion separately.

In 1655, the image processing module 1730 may improve the efficiency of the image processing by processing the region of the lesion in the image (rather than the entire image); and enhance a comparison between the region of the lesion and non-lesion region(s), which is convenient for user diagnosis. In some embodiments, the region of the lesion may be processed by the processing device 120 (e.g., the processing module 430 illustrated in FIG. 4) (e.g., the processing circuits of the processor 210) or the image processing system 1700 (e.g., the image processing module 1730 illustrated in FIG. 17).

In 1657: a prompt regarding the region of the lesion in the processed image may be generated. In some embodiments, the prompt regarding the region of the lesion may be generated by the processing device 120 (e.g., the processing module 430 illustrated in FIG. 4) (e.g., the processing circuits of the processor 210) or the image processing system 1700 (e.g., the image processing module 1730 illustrated in FIG. 17). In this operation, the image processing system 1700 may draw user's attention by prompting the user of the region of the lesion in the image, thereby helping the user to make a diagnosis.

In some embodiments, the image processing system 1700 may utilize a plurality of ways to prompt the user of the region of the lesion in the processed image. In some embodiments, a prompting manner may include, but is not limited to, highlighting the region of the lesion, zooming in the region of the lesion, circling the region of the lesion, using prompting signs (such as text, arrows, etc.,) to label the region of the lesion, or the like, or any combination thereof. For example, the image processing system 1700 may display a contour of the region of the lesion on the outside of the region of the lesion. As another example, the image processing system 1700 may display an arrow (pointing to the region of the lesion) and/or make a text annotation next to the region of the lesion. The text content of the text annotation may include a site of the region of the lesion, the type of the lesion, etc.

In some alternative embodiments, the image processing system 1700 may also prompt the user of the region of the lesion in the image using other manners. For example, voice prompts, flashing prompts, etc.

In some embodiments, when the image contains two or more regions of the lesion, the image processing system 1700 may generate a prompt regarding each region of the lesion in the image separately; alternatively, the image processing system 1700 may display multiple images, the image processing image may prompt the user of the at least one region of the lesion in each image.

In 1660: a post-processing may be performed on the image. In some embodiments, the post-processing may be performed by the processing device 120 (e.g., the processing module 430 illustrated in FIG. 4) (e.g., the processing circuits of the processor 210) or the image processing system 1700 (e.g., the image processing module 1740 illustrated in FIG. 17). In this operation, the image processing system 1700 may perform the post-processing on the entire image, or only on the non-lesion region(s).

In some embodiments, the post-processing may include, but is not limited to, enhancement processing, interpolation processing, morphological processing, noise removal, or the like, or any combination thereof. In some embodiments, the image processing system 1700 may only perform the pre-processing or the post-processing on the image. In some embodiments, the image processing system 1700 may also perform the pre-processing and the post-processing on the image at the same time. In some alternative embodiments, the operations of performing the pre-processing and the post-processing on the image may also be omitted.

In 1670, the processed image may be output. In some embodiments, the processed image may be output by the processing device 120 (e.g., the processing module 430 illustrated in FIG. 4) (e.g., the processing circuits of the processor 210) or the image processing system 1700 (e.g., the image processing module 1740 illustrated in FIG. 17). In this operation, the image processing system 1700 may output the processed image through printing, terminal displaying, or the like. The output image may be used for further diagnosis by the user (e.g., a medical staff) and/or medical device; or it may be provided for patients to help them understand a situation of the lesion. In some embodiments, since the output image is a specific processed image, it may facilitate the user to make a more accurate diagnosis. In some embodiments, since the output image prompts the region of the lesion, it may effectively improve the efficiency of a further diagnosis.

In some embodiments, when a user (e.g., a medical staff) is dissatisfied with the output image, the user may feedback to the image processing system 1700, and the system may perform a secondary processing on the image (or the region of the lesion) based on the feedback information that is provided by the user (or reprocessing the image). When performing a secondary processing on the image (or reprocessing the initial image), the user may feedback determination information regarding the type of the lesion and/or the region of the lesion to the system.

In some embodiments, the user may also manually adjust the output image. For example, the user may manually adjust image parameters (such as adjusting the contrast, etc.) of the image (or a region in the image). In some embodiments, the image processing system 1700 may record the image parameters after adjustment of the user, and utilize the image parameters to update the image processing operation database 1603.

It should be noted that the description of the image processing method 1600 is only for illustration and explanation, and does not limit the applicable scope of the present disclosure. For those skilled in the art, various variations and modifications can be made to the image processing method 1600 under the guidance of the present disclosure. However, those variations and modifications do not depart from the scope of the present disclosure. For example, the pre-processing operation on the image in operation 1620 may be omitted and the determination on the type of the lesion in the image may be directly performed. As another example, the post-processing operation on the image in operation 1660 may be omitted, and the processed image may be directly output. As yet another example, operations 1635, 1655, and 1657 may be omitted, and the image processing system 1700 may process the entire image. As still another example, the operation 1630 and operation 1635 may be performed simultaneously, that is, the image processing system 1700 may simultaneously determine the type of the lesion and its corresponding region of the lesion in the image.

Embodiment 9

Figure 17:
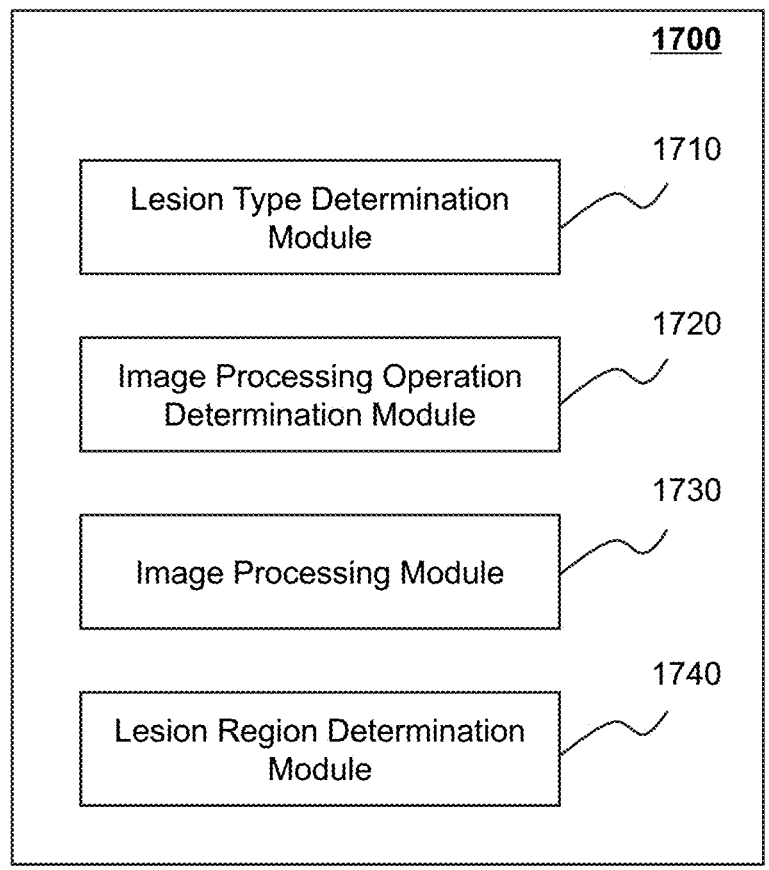
FIG. 17 is a block diagram illustrating an exemplary image processing system according to some embodiments of the present disclosure.

FIG. 17 is a block diagram illustrating an exemplary image processing system according to some embodiments of the present disclosure. As shown in FIG. 17, the image processing system 1700 may include a lesion type determination module 1710, an image processing operation determination module 1720, an image processing module 1730, and a lesion region determination module 1740.

The lesion type determination module 1710 may be configured to determine a type of the lesion in an image. For example, the lesion type determination module 1710 may utilize a trained lesion type recognition model 1601 to determine the type of the lesion in the image. As another example, the lesion type determination module 1710 may determine the type of the lesion in the image based on the determination information regarding the type of the lesion of the image that is provided by a user (such as medical personnel).

The image processing operation determination module 1720 may be configured to determine image processing operation(s) based on the type of the lesion. For example, the image processing operation determination module 1720 may invoke the corresponding image processing operation(s) from an image processing operation database 1603 based on the type of the lesion.

The image processing module 1730 may be configured to process the image according to image processing operation(s). For example, the image processing module 1730 may process an entire image according to the image processing operations. As another example, the image processing module 1730 may process the region of the lesion in the image according to the image processing operation(s). In some embodiments, when the image contains two or more regions of the lesion, the image processing module 1730 may adopt corresponding image processing operation(s) for each region of the lesion in the image for processing.

The lesion region determination module 1740 may be configured to determine the region of the lesion in the image. For example, the lesion region determination module 1740 may utilize a trained lesion region recognition model 1602 to determine the region of the lesion in the image. In some embodiments, the lesion region determination module 1740 may utilize the trained lesion region recognition model 1602 to determine two or more regions of the lesion in one image. In some embodiments, the lesion region determination module 1740 may also determine the region of the lesion in the image in other ways (e.g., based on rules). For example, the lesion region determination module 1740 may determine the region of the lesion in an image based on one or more image features such as a color, a grayscale, a shape, and a texture of various parts of the image. In some alternative embodiments, the lesion region determination module 1740 may also determine the region of the lesion in the image based on the determination information regarding the region of the lesion of the image that is provided by a user (such as medical staff).

In some embodiments, the image processing system 1700 may further include other execution modules. For example, the image processing system 1700 may further include an image acquiring module, an image pre-processing module, an image post-processing module, an image output module, and a region of the lesion prompt module, or the like, or any combination thereof.

In some embodiments, the image processing system 1700 may include a computing device, the computing device may include at least one processor, and the at least one processor may be configured to implement the various modules described above. In some embodiments, the computing device may be a single server or a server group. The server group may be centralized or distributed. In some embodiments, the computing device may be local or remote. In some embodiments, the computing device may also be implemented on a cloud platform.

In some embodiments, the image processing system 1700 may further include a medical imaging device, a network, a terminal, a storage, or the like. The medical imaging device may be configured to acquire one or more images. The medical imaging device may include but is not limited to an X-ray imaging device, a CT imaging device, a PET imaging device, an MRI imaging device, an ultrasound imaging device, or the like. In some embodiments, the network may include any suitable network capable of facilitating the exchange of information and/or data of the image processing system 1700. For example, the network may include public networks (such as the Internet), private networks (such as local area networks (LAN), wide area networks (WAN), etc.,), wired networks (such as Ethernet), wireless networks (such as 802.11 networks, WiFi networks, etc.), cellular networks, Frame relay network, virtual private network (VPN), satellite network, telephone network, router, hub, server computer, or the like, or any combination thereof. In some embodiments, the terminal may include a mobile device, a tablet computer, a laptop computer, or the like, or any combination thereof. In some embodiments, the mobile device may include a smart home device, a wearable device, a smart mobile device, a virtual reality device, a mixed reality device, or the like, or any combination thereof. In some embodiments, the storage may be connected to the network to communicate with one or more other components (e.g., computing devices, terminals, etc.,) in the image processing system 1700. One or more components in the image processing system 1700 may access data or instructions stored in the storage via the network. In some embodiments, the storage may be directly connected to or communicate with one or more other components (e.g., computing device, terminal, etc.,) in the image processing system 1700. In some embodiments, the storage may be a portion of the computing device.

It should be understood that the system and its modules shown in FIG. 17 may be implemented in various ways. For example, in some embodiments, the system and its modules may be implemented by hardware, software, or a combination of software and hardware. Among them, the hardware part may be implemented using dedicated logic; the software may be stored in a storage and implemented by an appropriate instruction executing system (e.g., a microprocessor, a dedicated design hardware, etc.,). It will be appreciated by those skilled in the art that the above methods and systems may be implemented by computer-executable instructions and/or embedding in control codes of a processor. For example, the control codes may be provided by a medium such as a disk, a CD or a DVD-ROM, a programmable memory device such as a read-only memory (e.g., firmware), or a data carrier such as an optical or electric signal carrier. The system and the module in the present disclosure may be implemented not only by a hardware circuit in a programmable hardware device in an ultra large scale integrated circuit, a gate array chip, a semiconductor such a logic chip or a transistor, a field programmable gate array, or a programmable logic device, but also by a software performed by various processors, and further also by a combination of the hardware and the software described above (e.g., firmware).

It should be noted that the above description of the image processing system and its modules are provided for convenience of description only, and the present disclosure is not limited by the scope of the illustrated embodiments. For persons having ordinary skills in the art, after understanding the principle of the system, one or more of the forementioned modules can be combined in various ways or combined to constitute a sub-system to connected to other modules without departing from the principle. For example, in some embodiments, the lesion type determination module 1710, the image processing operation determination module 1720, the image processing module 1730, and the lesion region determination module 1740 disclosed in FIG. 17 may be different modules in a system, or may be a module that implements the function of two or more modules. For example, the lesion type determination module 1710 and the lesion region determination module 1740 may be two modules, or one module with a function of determining both the type of the lesion and the region of the lesion at the same time. For example, each module may share a single storage module, or each module may also have its own storage module. All such modifications are within the protection scope of the present disclosure.

Figure 18:
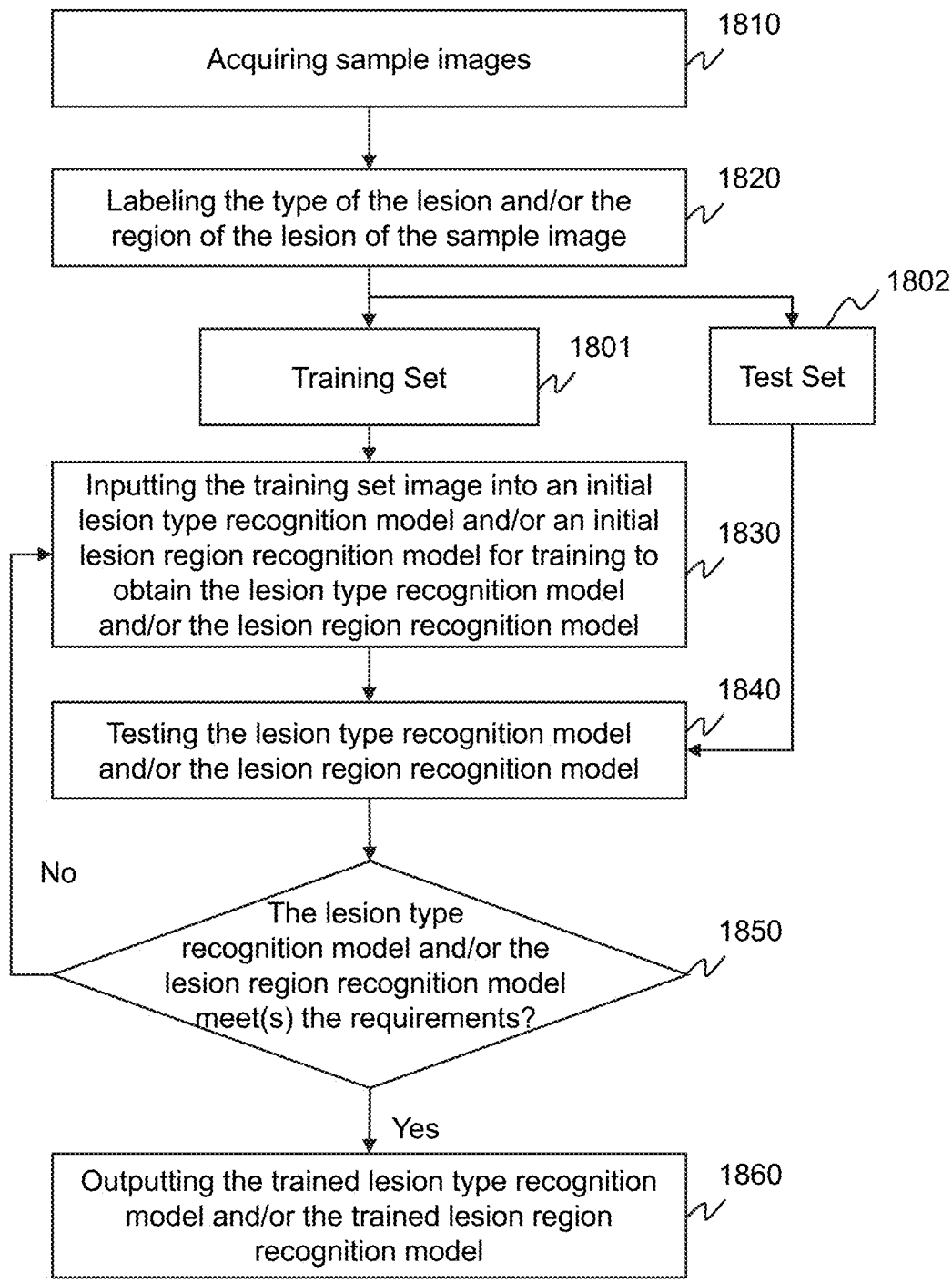
FIG. 18 is a flowchart illustrating an exemplary process for training a lesion type recognition model and/or a lesion region recognition model according to some embodiments of the present disclosure.

FIG. 18 is a flowchart illustrating an exemplary process for training a lesion type recognition model and/or a lesion region recognition model according to some embodiments of the present disclosure. In some embodiments, process 1800 may be executed by the medical system 100. For example, the process 1800 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing system 1700 (e.g., one or more modules illustrated in FIG. 17) may execute the set of instructions and may accordingly be directed to perform the process 1800. The operations of the illustrated process presented below are intended to be illustrative. In some embodiments, the process 1800 may be accomplished with one or more additional operations not described and/or without one or more of the operations discussed. Additionally, the order of the operations of process 1800 illustrated in FIG. 18 and described below is not intended to be limiting. A training process 1800 for the lesion type recognition model and/or the lesion region recognition model 1800 may be executed by the image processing system 1700.

In 1810: sample images may be acquired. In some embodiments, the sample images may be acquired by the processing device 120 (e.g., the obtaining module 410 illustrated in FIG. 4) (e.g., the interface circuits of the processor 210) or the image processing system 1700 (e.g., the lesion type determination module 1710 or the lesion region determination module 1740 illustrated in FIG. 17).

In some embodiments, the sample images may include, but not limited to, X-ray images, CT images, PET images, MRI images, ultrasound images, or the like, or any combination thereof. In some embodiments, the sample images may be obtained from institutions such as disease detection centers, hospitals, etc. In some embodiments, the sample images may be obtained from various open source databases of medical imaging. The open source databases may include but are not limited to Github, ISBI, LIDC-IDRI, DDSM MIAS, Cancer Imaging Archive, OsiriX, NITRC, etc. In some embodiments, sample images may also be obtained from volunteers and/or volunteer institutions. In some alternative embodiments, the sample images may also be obtained by other manner, which is not limited by the present disclosure.

In 1820: a type of the lesion and/or a region of the lesion of the sample image may be labeled. In some embodiments, the type of the lesion and/or the region of the lesion of the sample image may be labeled by the processing device 120 (e.g., the processing module 430 illustrated in FIG. 4) (e.g., the processing circuits of the processor 210) or the image processing system 1700 (e.g., the image processing module 1730 illustrated in FIG. 17). In this operation, a user (such as a medical staff) may label the type of the lesion and/or the region of the lesion in the sample image, and the image processing system 1700 may obtain the sample images labeled by the user.

In some embodiments, the user may label the type of the lesion through an operation terminal/a human-machine interaction interface. Specifically, the user may input lesion type determination information through the human-machine interaction interface. The manner of inputting the lesion type determination information by the user may include but not limited to voice input, text input, mouse selection input, touch screen input, etc. For example, after the user clicks on the image, the system may cause a list of types of the lesion to pop up, and the operator(i.e., the user) may select the type of the lesion corresponding to the image according to determination.

In some embodiments, the user may label the region of the lesion through the operation terminal/human-machine interaction interface. Specifically, the user may label the regions of the lesion in various ways. For example, the user may operate the mouse to select the region; the user may operate the cursor to select the labeled region through the keyboard; the user may select the region through a stylus or a sensor pen; the user may select the labeled region through a touch operation; the user may select the labeled region through a gesture operation; the user may select the labeled region based on a voice operation; the user may select the labeled regions through a gaze operation; and/or the user may select the labeled regions through brainwaves, etc. The manner for the user to label the region of the lesion may include but not limited to any combination thereof.

In some embodiments, the user may label both the type of the lesion and the region of the lesion of the sample image. For example, the user may select the region of the lesion and input the type of the lesion corresponding to the region of the lesion. In some embodiments, when an image contains two or more regions of the lesion, the user may label each region of the lesion separately and input the type of the lesion corresponding to each region of the lesion.

Figure 20A:
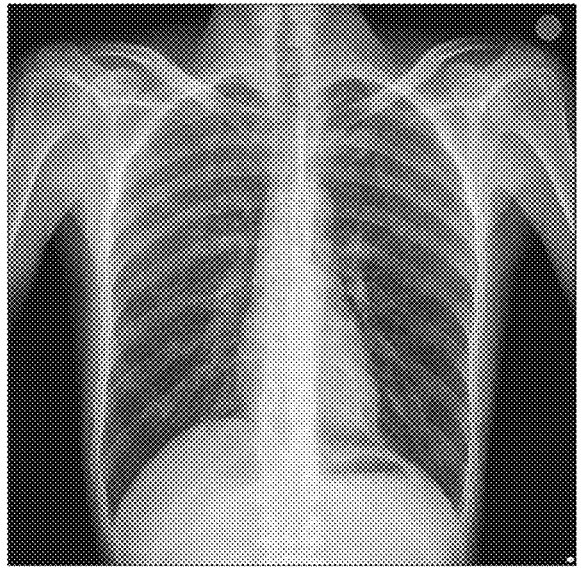
FIGS. 20A-20B are exemplary labeled and unlabeled sample images according to some embodiments of the present disclosure.
Figure 20B:
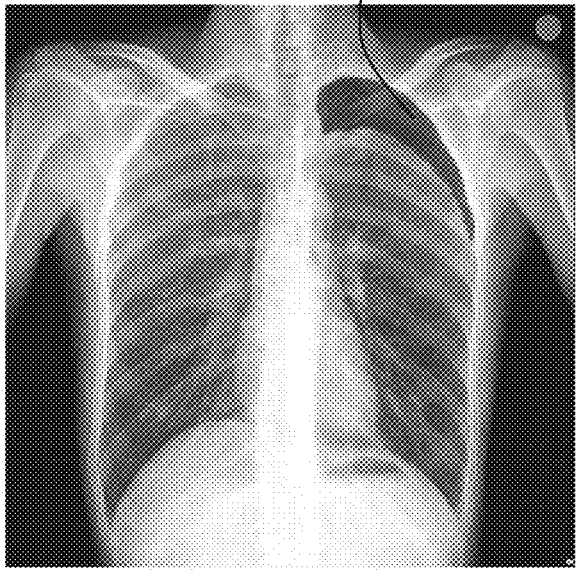
Figure 21A:
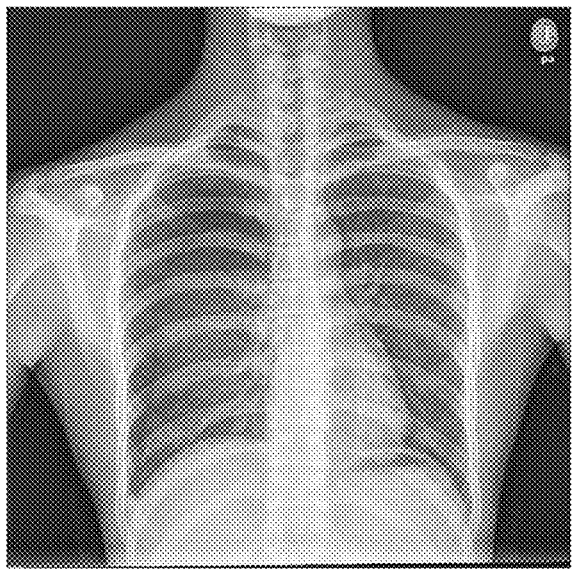
FIGS. 21A-21B are exemplary labeled and unlabeled sample images according to some other embodiments of the present disclosure.
Figure 21B:
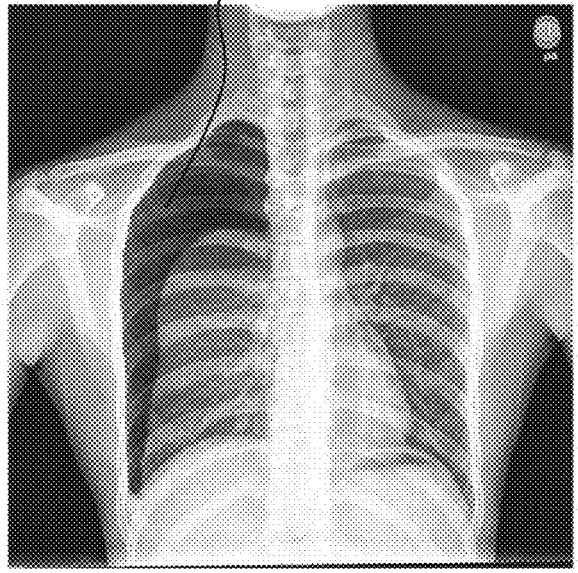

FIGS. 20A-20B are exemplary labeled and unlabeled sample images according to some embodiments of the present disclosure. FIG. 20A is an image to be labeled, and FIG. 20B is a labeled image. In this embodiment, the type of the lesion of the image may be pneumothorax, and the user may input the type of the lesion of the image through the operation terminal/the human-machine interaction interface. Additionally or alternatively, the user may label a region of the lesion 2010 corresponding to the pneumothorax through the operation terminal/human-machine interaction interface. FIGS. 21A-21B are exemplary labeled and unlabeled sample images according to some other embodiments of the present disclosure. FIG. 21A is an image to be labeled, and FIG. 21B is a labeled image. In this embodiment, the type of the lesion of the image is pneumothorax, and the user may input the type of the lesion of the image through the operation terminal/the human-machine interaction interface. Additionally or alternatively, the user may label a region of the lesion 2110 corresponding to the pneumothorax through the operation terminal/human-machine interaction interface.

In some embodiments, as shown in FIG. 18, the image processing system 1700 may divide the labeled sample images into a training set 1801 and a test set 1802. The training set 1801 may be configured to train the lesion type recognition model and/or the lesion region recognition model. The test set 1802 may be configured to test the lesion type recognition model and/or the lesion region recognition model after the training. Specifically, the image processing system 1700 may randomly divide the sample images based on a certain ratio. For example, the ratio of the count of labeled sample images in the training set to the count of labeled sample images in the test set may be 8 to 2, 9 to 1, 9.5 to 0.5, or the like.

In 1830: training set images (i.e., labeled sample images in the training set) may be inputted into an initial lesion type recognition model and/or an initial lesion region recognition model for training, and thus the lesion type recognition model and/or the lesion region recognition model may be obtained. In some embodiments, the training set images may be input by the processing device 120 (e.g., the processing module 430 illustrated in FIG. 4) (e.g., the processing circuits of the processor 210) or the image processing system 1700 (e.g., the image processing module 1730 illustrated in FIG. 17).

In some embodiments, the initial lesion type recognition model and/or the initial lesion region recognition model may include but not limited to convolutional neural networks (CNN, Convolutional Neural Networks), recurrent neural networks (RNN, Recurrent Neural Network), RCNN (regions with CNN), Fast-RCNN, BP neural network, K nearest neighbor algorithm (KNN), support vector machine (SVM), or the like, or any combination thereof. In some embodiments, the model types of the initial lesion type recognition model and the initial lesion region recognition model may be the same or different. In some embodiments, the initial lesion type recognition model and the initial lesion region recognition model may be the same model, which can be configured to recognize both a type of the lesion and a region of the lesion.

In a specific embodiment, the initial lesion type recognition model may be constructed based on a convolutional neural network (CNN) model. The CNN model may include one input node and a plurality of output nodes. During the training process, the input of the input node may be the training set 1801 or a portion thereof, and the output of the output node may be a probability that the type of the lesion of an image is a certain type of lesion. The sample images in the training set 1801 may be inputted to this initial lesion type recognition model for training, so that, a trained lesion type recognition model may be obtained.

In 1840: the lesion type recognition model and/or the lesion region recognition model may be tested. In some embodiments, the models may be tested by the processing device 120 (e.g., the processing module 430 illustrated in FIG. 4) (e.g., the processing circuits of the processor 210) or the image processing system 1700 (e.g., the lesion type determination module 1710 illustrated in FIG. 17).

In this operation, the image processing system 1700 may input the sample image data(i.e., the labeled sample images) in the test set 1802 to the trained lesion type recognition model and/or the lesion region recognition model obtained in operation 1830 for testing, and obtain output results. The image processing system 1700 may further determine whether the output result of the model is consistent with the label of the test data. For example, the image processing system 1700 may determine whether the type of the lesion recognized by the model is consistent with a labeled type of the lesion. As another example, the image processing system 1700 may determine whether the region of the lesion recognized by the model is consistent with the labeled region of the lesion. When an overlapping region of the region of the lesion recognized by the model and the labeled region of the lesion is greater than a set threshold (such as 90% of the recognized region of the lesion; 90% of the labeled region of the lesion, etc.), both the recognized region of the lesion and the labeled region of the lesion may be regarded as the same.

In 1850: whether the lesion type recognition model and/or the lesion region recognition model meet the requirements may be determined. In some embodiments, the operation 1850 may be performed by the processing device 120 (e.g., the determination module 420 illustrated in FIG. 4) (e.g., the processing circuits of the processor 210) or the image processing system 1700 (e.g., the lesion type determination module 1710 illustrated in FIG. 17).

In this operation, the image processing system 1700 may determine the accuracy of results of the test of the lesion type recognition model and/or the lesion region recognition model, and determine whether the model(s) meet the requirements based on the accuracy. Specifically, when the accuracy of the results of the test exceeds a preset threshold (such as 85%, 90%, 95%, 98%, etc.), the image processing system 1700 may determine that the trained model passes the test, and the image processing system 1700 may perform operation 1860. When the accuracy of the results of the test is lower than the preset threshold, the image processing system 1700 may determine that the trained model fails the test, and the image processing system 1700 may perform operation 1830 again.

In 1860, the trained lesion type recognition model and/or the trained lesion region recognition model may be output. In some embodiments, the trained lesion type recognition model and/or the trained lesion region recognition model may be output by the processing device 120 (e.g., the processing module 430 illustrated in FIG. 4) (e.g., the processing circuits of the processor 210) or the image processing system 1700 (e.g., the lesion type determination module 1710 and the lesion region determination module 1740 illustrated in FIG. 17).

In some embodiments, the trained model may only include the lesion type recognition model, or the lesion region recognition model. In some embodiments, the trained model may include the lesion type recognition model and the lesion region recognition model that are independent of each other. In some embodiments, the trained model may also include a comprehensive recognition model that can simultaneously recognize the type of the lesion and the region of the lesion.

In some embodiments, there may be a plurality of lesion region recognition models, and different types of the lesion may correspond to different lesion region recognition models. For example, the lesion region recognition model may include, but is not limited to, a pneumothorax region recognition model, a prostate cancer region recognition model, or the like. In some embodiments, the image processing system 1700 may first utilize a lesion type recognition model to recognize the type of the lesion in the image, and then select the corresponding lesion region recognition model to recognize the region of the lesion according to the type of the lesion.

It should be noted that the description of the model training process 1800 is only for illustration and explanation, and does not limit the applicable scope of the present disclosure. For those skilled in the art, various modifications and changes can be made to the model training process 1800 under the guidance of the present disclosure. However, those variations and modifications do not depart from the scope of the present disclosure. For example, the image processing system 1700 may divide the labeled sample images into a training set, a verification set, and a test set. After the training of the initial lesion type recognition model and/or the initial lesion region recognition model is completed, the image processing system 1700 may utilize the verification set to verify the trained model. As another example, the image processing system 1700 may periodically or non-periodically update the model based on the situation of the model during usage (such as based on user feedback on the model processing result).

Embodiment 10

Figure 19:
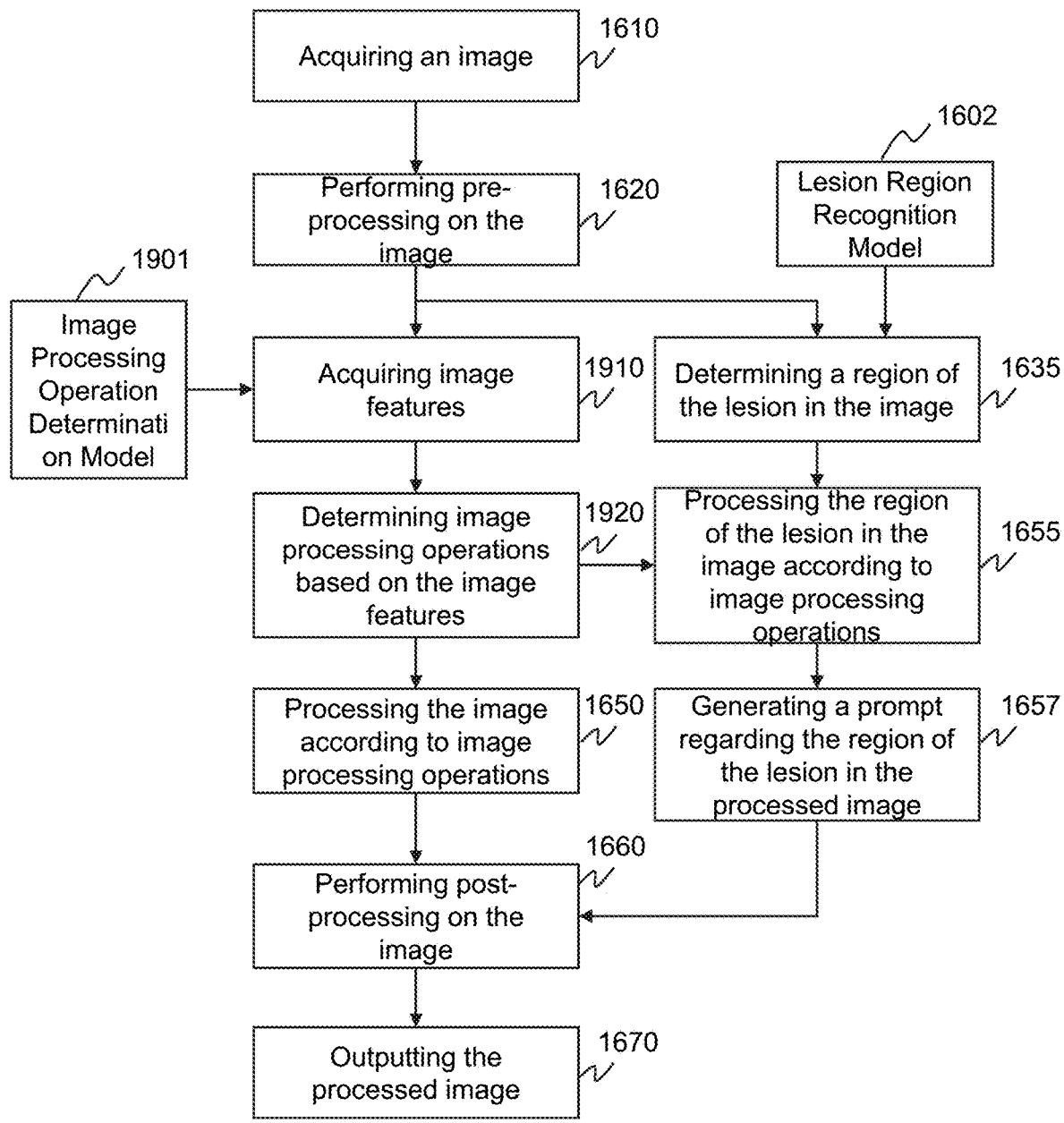
FIG. 19 is a flowchart illustrating an exemplary process for image processing according to some embodiments of the present disclosure.

FIG. 19 is a flowchart illustrating an exemplary process for image processing according to some embodiments of the present disclosure. In some embodiments, process 1900 may be executed by the medical system 100. For example, the process 1900 may be implemented as a set of instructions (e.g., an application) stored in a storage device (e.g., the storage device 150, the storage 220, and/or the storage 390). In some embodiments, the processing device 120 (e.g., the processor 210 of the computing device 200, the CPU 340 of the mobile device 300, and/or one or more modules illustrated in FIG. 4) and/or an image processing system 1700 (e.g., one or more modules illustrated in FIG. 17) may execute the set of instructions and may accordingly be directed to perform the process 1900. The operations of the illustrated process presented below are intended to be illustrative. In some embodiments, the process 1900 may be accomplished with one or more additional operations not described and/or without one or more of the operations discussed. Additionally, the order of the operations of process 1900 illustrated in FIG. 19 and described below is not intended to be limiting.

Compared with the image processing method 1600, the image processing method 1900 determines the image processing operation(s) in different manner. As shown in FIG. 19, after operation 1620 (pre-processing the image), the image processing system 1700 may perform operation 1910 to: acquire image features, and perform operation 1920 to: determine the image processing operation(s) based on the image features. In the image processing method 1900, the image processing system 1700 may directly determine the image processing operation(s) based on the features of the image (without first determining the type of the lesion of the image), which can improve the efficiency of image processing to a certain extent.

In some embodiments, the image features may include, but are not limited to, color, grayscale, contrast, shape, a texture of the image, or the like, or any combination thereof. In some embodiments, the image processing system 1700 may obtain image features through multiple feature extraction algorithms. For example, the system 1700 may extract color features of the image by color histogram, color set, color moment, color aggregation vector, color correlation graph, or the like, or any combination thereof. As another example, the image processing system 1700 may extract texture features of the image by statistical algorithms, geometric algorithms, model algorithms (such as Markov random field model algorithms, Gibbs random field model algorithms, etc.,), signal processing algorithms, or the like, or any combination thereof. As another example, the image processing system 1700 may extract the shape features of the image by a boundary feature algorithm, a Fourier shape descriptor algorithm, a geometric parameter algorithm, a shape invariant moment algorithm, or the like, or any combination of.

In 1920, the image processing operations may be determined based on the image features. In some embodiments, the image processing operations may be determined by the processing device 120 (e.g., the determination module 420 illustrated in FIG. 4) (e.g., the processing circuits of the processor 210) or the image processing system 1700 (e.g., the image processing operation determination module 1720 illustrated in FIG. 17). In some embodiments, the image processing system 1700 may utilize a trained image processing operation determination model 1901 to determine the image processing operations.

In some embodiments, the image processing operation determination model 1901 may include a machine learning model. For example, the image processing operation determination model 1901 may include, but is not limited to, CNN, RNN, RCNN, Fast-RCNN, BP neural network, KNN, SVM, or the like, or any combination thereof. In some embodiments, the image processing operation determination model 1901 may be obtained by a training operation using the sample data. In some embodiments, the sample data may include multiple images, corresponding image features, and corresponding image processing operations. For example, if a processed image (or an image after processing) obtained by processing an initial image according to the image processing operation has been approved by the user (such as a medical staff), the image processing system 1700 may use the initial image as sample data and extract image features of the initial image.

As shown in FIG. 19, other operations in the image processing method 1900 (such as operations 1610, 1620, 150, 1660, 1670, 1635, 1655, 1657) may be the same as the corresponding operations of the image processing method 1600 in FIG. 16. Please refer to FIG. 16 and relevant descriptions, which will not be repeated here.

FIGS. 22A-22B are exemplary comparison images illustrating effects of image processing methods according to some embodiments of the present disclosure. FIG. 22A is an unprocessed image related to a leg fracture. FIG. 22B is a processed image of the leg fracture that is processed by the image processing system 1700.

In this embodiment, the image processing system 1700 has processed the entire image. After the image processing system 1700 determines that the type of the lesion in the image is a fracture, the system retrieves the image processing operations corresponding to the fracture from the image processing operation database 1603, and processes the image based on the image processing operations. As shown in FIGS. 22A-22B, compared with the unprocessed image, the contrast of a region corresponding to the bone in the image is increased, and the contrast of other tissues such as muscles may be reduced, which makes the features of the fractured region clearer.

FIGS. 23A-23B are exemplary comparison images illustrating effects of image processing methods according to some other embodiments of the present disclosure. FIG. 23A is an unprocessed image related to the breast, and FIG. 23B is a processed image related to the breast obtained after an image processing on the region of the lesion by the image processing system 1700.

In this embodiment, the image processing system 1700 may process the calcified region of the image. After the image processing system 1700 determines a type of the lesion (breast calcification) and a region of the lesion (e.g., the region enlarged in the figure) in the image, the system may retrieve the image processing operations corresponding to the breast calcification from an image processing operation database 1603, and process the region of the lesion on the basis of the image processing operations. As shown in FIGS. 23A-23B, compared with the unprocessed image, a representation of calcification points of the region of the lesion is enhanced and the contrast of the region of the lesion is increased, which makes the features of the breast calcification more clear. In this embodiment, the image processing system 1700 also generates a prompt (by enlarging the representation) regarding the region of the lesion in the processed image, so that the user may make a diagnosis for the region of the lesion.

The beneficial effects that some embodiments of the present disclosure may bring include but not limited to: (1) different image processing methods may be adopted for different types of the lesion in the image; (2) the display effect of information regarding the region of the lesion in the image may be enhanced, making the region of the lesion more suitable for diagnosis; (3) users may be provided with better diagnostic information; (4) the efficiency of image processing may be improved. It should be noted that different embodiments may have different beneficial effects. In different embodiments, the possible beneficial effects may include any one of the above, or the like, or any combination thereof, or any other beneficial effects that may be obtained.

Embodiment 11

In some embodiments, the present disclosure may also provide a storage medium storing a computer program thereon. When executed by a processor, the computer program may direct the processor to perform a process (e.g., process 500, process 600, process 700, process 900, process 1000, process 1200, process 1300, process 1400, process 1600, process 1800, or process 1900) described elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image processing, comprising:
   at least one storage device including a set of instructions; and
   at least one processor in communication with the at least one storage device, wherein when executing the set of instructions, the at least one processor is directed to perform operations including:
   obtaining at least one image of an object;
   for each of the at least one image, determining a recognition result of the image, wherein the recognition result includes at least one of an image type of the image, a type of a lesion in the image, a region of the lesion in the image, or an image feature of the image; and
   processing the at least one image of the object based on at least one recognition result corresponding to the at least one image, wherein each of the at least one image is a three-dimensional (3D) tomographic image, the processing the at least one image of the object includes:
   determining at least one target gradient image based on at least one 3D tomographic image;
   generating a target two-dimensional (2D) image of the object based on the at least one 3D tomographic image and the at least one target gradient image.

2. The system of claim 1, wherein
   the generating a target two-dimensional (2D) image of the object based on the at least one 3D tomographic image and the at least one target gradient image includes:
   determining a target image of the object by preprocessing each of the at least one 3D tomographic image;
   determining, in each of the at least one target gradient image, a plurality of first positions satisfying a predetermined gradient condition along a predetermined direction;

determining, in the target image, a plurality of second positions corresponding to the plurality of first positions; and generating an initial two-dimensional (2D) image of the object based on gray values of the plurality of second positions in the target image, and generating the target 2D image of the object based on at least one initial 2D image of the object corresponding to the at least one 3D tomographic image.

3. The system of claim 2, wherein the determining the target image of the object by preprocessing each of the at least one 3D tomographic image includes:

generating at least one high-frequency image by enhancing high-frequency information in the 3D tomographic image; and generating the target image of the object based on the at least one high-frequency image and a low-frequency image corresponding to low-frequency information in the 3D tomographic image.

4. The system of claim 3, wherein the generating the at least one high-frequency image by enhancing the high-frequency information in the 3D tomographic image includes:

generating a plurality of first frequency band images by decomposing the 3D tomographic image based on a first predetermined frequency band, wherein the plurality of first frequency band images include a low-frequency image and at least one initial high-frequency image; and generating the at least one high-frequency image by enhancing the at least one initial high-frequency image in the plurality of first frequency band images.

5. The system of claim 2, wherein the determining the target gradient image includes:

generating an initial gradient image by performing a gradient transformation on the target image; and determining the target gradient image by performing a convolution processing on the initial gradient image.

6. The system of claim 2, wherein the generating the target 2D image of the object based on the at least one initial 2D image of the object includes:

generating the target 2D image of the object by projecting the at least one initial 2D image along the predetermined direction.

7. The system of claim 2, wherein the generating the target 2D image of the object based on the at least one initial 2D image of the object includes:

generating a first projected image of the object by projecting the at least one initial 2D image along the predetermined direction based on a maximum density projection algorithm;

generating a second projected image of the object by projecting the at least one initial 2D image along the predetermined direction based on an average projection algorithm; and generating the target 2D image of the object by weighting the first projected image and the second projected image based on a first predetermined weight of the first projected image and a second predetermined weight of the second projected image.

8. The system of claim 2, wherein the generating the target 2D image of the object based on the at least one initial 2D image of the object includes:

generating a preliminary target 2D image of the object by combining the at least one initial 2D image; and generating the target 2D image of the object by weighting the preliminary target 2D image and a 2D projected image based on a third predetermined weight of the preliminary target 2D image and a fourth predetermined weight of the 2D projected image.

9. The system of claim 2, wherein the operations further include:

generating a plurality of second frequency band images by decomposing the target 2D image based on a second predetermined frequency band, wherein the plurality of second frequency band images include a low-frequency 2D image and a high-frequency 2D image;

generating a high frequency enhanced image by enhancing the high-frequency 2D image in the second frequency band image; and correcting the target 2D image based on the high frequency enhanced image.

10. The system of claim 1, wherein the processing the at least one image of the object based on the at least one recognition result includes:

for each of the at least one image, determining a processing operation based on the type of the lesion in the image or the image feature of the image, wherein the processing operation includes at least one of a noise reduction, an enhancement, an organization balance, a thickness balance, or a look-up table (LUT) transformation; and processing the image based on the processing operation.

11. The system of claim 1, wherein the operations further include:

providing prompt information associated with the recognition result of the image in the processed image, the prompt information including at least one of highlighting the recognition result, zooming in the recognition result, circling the recognition result, or prompting the recognition result using a prompt indicator.

12. The system of claim 1, wherein the generating a target two-dimensional (2D) image of the object based on the at least one 3D tomographic image and the at least one target gradient image includes:

determining a target image of the object by preprocessing each of the at least one 3D tomographic image;

determining, in each of the at least one target gradient image, a plurality of first positions satisfying a predetermined gradient condition along a predetermined direction;

determining, in the target image, a plurality of second positions corresponding to the plurality of first positions; and generating the target 2D image of the object based on the plurality of second positions in each of the at least one target image.

13. A method implemented on a computing device including at least one processor, at least one storage medium, and a communication platform connected to a network, the method comprising:

obtaining at least one image of an object;

for each of the at least one image, determining a recognition result of the image, wherein the recognition result includes at least one of an image type of the image, a type of a lesion in the image, a region of the lesion in the image, or an image feature of the image; and processing the at least one image of the object based on at least one recognition result corresponding to the at least one image, wherein each of the at least one image is a three-dimensional (3D) tomographic image, the processing the at least one image of the object includes:
determining at least one target gradient image based on at least one 3D tomographic image;
generating a target two-dimensional (2D) image of the object based on the at least one 3D tomographic image and the at least one target gradient image.

14. The method of claim 13, wherein the generating a target two-dimensional (2D) image of the object based on the at least one 3D tomographic image and the at least one target gradient image includes:
determining a target image of the object by preprocessing each of the at least one 3D tomographic image;
determining, in each of the at least one target gradient image, a plurality of first positions satisfying a predetermined gradient condition along a predetermined direction;
determining, in the target image, a plurality of second positions corresponding to the plurality of first positions; and
generating an initial two-dimensional (2D) image of the object based on gray values of the plurality of second positions in the target image, and
generating the target 2D image of the object based on at least one initial 2D image of the object corresponding to the at least one 3D tomographic image.

15. The method of claim 14, wherein the determining the target gradient image includes:
generating an initial gradient image by performing a gradient transformation on the target image; and
determining the target gradient image by performing a convolution processing on the initial gradient image.

16. The method of claim 14, wherein the generating the target 2D image of the object based on the at least one initial 2D image of the object includes:
generating the target 2D image of the object by projecting the at least one initial 2D image along the predetermined direction.

17. The method of claim 14, wherein the generating the target 2D image of the object based on the at least one initial 2D image of the object includes:
generating a first projected image of the object by projecting the at least one initial 2D image along the predetermined direction based on a maximum density projection algorithm;
generating a second projected image of the object by projecting the at least one initial 2D image along the predetermined direction based on an average projection algorithm; and
generating the target 2D image of the object by weighting the first projected image and the second projected image based on a first predetermined weight of the first projected image and a second predetermined weight of the second projected image.

18. The method of claim 14, wherein the generating the target 2D image of the object based on the at least one initial 2D image of the object includes:
generating a preliminary target 2D image of the object by combining the at least one initial 2D image; and
generating the target 2D image of the object by weighting the preliminary target 2D image and a 2D projected image based on a third predetermined weight of the preliminary target 2D image and a fourth predetermined weight of the 2D projected image.

19. The method of claim 14, wherein the method further include:
generating a plurality of second frequency band images by decomposing the target 2D image based on a second predetermined frequency band, wherein the plurality of second frequency band images include a low-frequency 2D image and a high-frequency 2D image;
generating a high frequency enhanced image by enhancing the high-frequency 2D image in the second frequency band image; and
correcting the target 2D image based on the high frequency enhanced image.

20. A non-transitory computer readable medium, comprising executable instructions that, when executed by at least one processor, direct the at least one processor to perform a method, the method comprising:
obtaining at least one image of an object;
for each of the at least one image, determining a recognition result of the image, wherein the recognition result includes at least one of an image type of the image, a type of a lesion in the image, a region of the lesion in the image, or an image feature of the image; and
processing the at least one image of the object based on at least one recognition result corresponding to the at least one image, wherein each of the at least one image is a three-dimensional (3D) tomographic image, the processing the at least one image of the object includes:
determining at least one target gradient image based on at least one 3D tomographic image;
generating a target two-dimensional (2D) image of the object based on the at least one 3D tomographic image and the at least one target gradient image.

* * * * *